(12) United States Patent
Chayen et al.

(10) Patent No.: US 12,533,499 B2
(45) Date of Patent: Jan. 27, 2026

(54) DEVICES, SYSTEMS, AND METHODS FOR REVASCULARIZATION OF THE MYOCARDIUM

(71) Applicant: REVASCARDIO LTD., Ra'anana (IL)

(72) Inventors: David Shlomo Chayen, Raanana (IL); Oded Meiri, Raanana (IL); Dotan Asher Chayen, Raanana (IL); Shahaf Marmor, Raanana (IL); Chaim Zeev Aber, Raanana (IL); Eric Cohen, Raanana (IL)

(73) Assignee: REVASCARDIO LTD., Raanana (IL)

( * ) Notice: Subject to any disclaimer, the term of this patent is extended or adjusted under 35 U.S.C. 154(b) by 0 days.

(21) Appl. No.: 19/173,518

(22) Filed: Apr. 8, 2025

(65) Prior Publication Data

US 2025/0235676 A1    Jul. 24, 2025

Related U.S. Application Data

(63) Continuation of application No. 18/821,919, filed on Aug. 30, 2024, which is a continuation of application No. PCT/IB2023/051918, filed on Mar. 1, 2023.
(Continued)

(51) Int. Cl.
*A61M 27/00* (2006.01)

(52) U.S. Cl.
CPC ... *A61M 27/002* (2013.01); *A61M 2205/0216* (2013.01); *A61M 2205/0238* (2013.01);
(Continued)

(58) Field of Classification Search
CPC .. A61M 2205/0216; A61M 2205/0266; A61M 2210/125; A61B 2017/00243;
(Continued)

(56) References Cited

U.S. PATENT DOCUMENTS

| 5,135,467 A | 8/1992 | Citron |
| 6,076,529 A | 6/2000 | Vanney et al. |

(Continued)

FOREIGN PATENT DOCUMENTS

| EP | 1021141 B1 | 8/1998 |
| WO | 2012071075 A1 | 6/2011 |

(Continued)

OTHER PUBLICATIONS

International Search Report and Written Opinion for International Application No. PCT/IB2023/051918 dated Jul. 26, 2023, 18 pages.

*Primary Examiner* — Susan S Su
*Assistant Examiner* — Erin A Kim
(74) *Attorney, Agent, or Firm* — Finnegan, Henderson, Farabow, Garrett & Dunner LLP

(57) ABSTRACT

Devices, systems, and methods for revascularization of the myocardium are disclosed, such as an intravascular medical device for shunting and selectively regulating anatomical fluid flow. A tubular shunt is configured for deployment in a passageway between a first organ and a second adjacent organ and to bridge a first cavity in the first organ and a second cavity in the second organ. A stabilizer is configured to stabilize the tubular shunt in the passageway. A flow deflector extends from the tubular shunt and has a surface for deflecting flow in the second cavity.

24 Claims, 21 Drawing Sheets

Related U.S. Application Data

(60) Provisional application No. 63/378,568, filed on Oct. 6, 2022, provisional application No. 63/315,601, filed on Mar. 2, 2022.

(52) U.S. Cl.
CPC .  *A61M 2205/04* (2013.01); *A61M 2205/3331* (2013.01); *A61M 2206/20* (2013.01); *A61M 2209/088* (2013.01)

(58) Field of Classification Search
CPC .......... A61B 2017/00867; A61B 2017/00946; A61B 2017/1107; A61B 2017/1139
See application file for complete search history.

(56) References Cited

U.S. PATENT DOCUMENTS

| | | | |
|---|---|---|---|
| 6,237,607 B1 | 5/2001 | Vanney et al. | |
| 6,447,539 B1 | 9/2002 | Nelson et al. | |
| 6,916,304 B2 | 7/2005 | Eno et al. | |
| 6,929,011 B2 | 8/2005 | Knudson et al. | |
| 7,083,588 B1 | 8/2006 | Shmulewitz et al. | |
| 7,849,860 B2 | 12/2010 | Makower et al. | |
| 8,597,226 B2 | 12/2013 | Wilk et al. | |
| 10,039,905 B1 | 8/2018 | Taft et al. | |
| 2003/0125798 A1 | 7/2003 | Martin | |
| 2003/0130611 A1* | 7/2003 | Martin | A61F 2/2493 623/1.13 |
| 2005/0070993 A1* | 3/2005 | Boekstegers | A61F 2/91 623/1.25 |
| 2006/0122554 A1 | 6/2006 | Wilk | |
| 2013/0030521 A1 | 1/2013 | Nitzan et al. | |
| 2014/0194971 A1* | 7/2014 | McNamara | A61F 2/90 623/1.15 |
| 2018/0256865 A1 | 9/2018 | Finch et al. | |
| 2020/0254228 A1 | 8/2020 | Taft et al. | |
| 2020/0261705 A1 | 8/2020 | Nitzan et al. | |
| 2021/0154012 A1 | 5/2021 | Rottenberg et al. | |
| 2023/0099410 A1 | 3/2023 | Primeaux | |

FOREIGN PATENT DOCUMENTS

| | | |
|---|---|---|
| WO | 2016014821 A1 | 7/2015 |
| WO | 2020123338 A1 | 12/2019 |
| WO | 2020215090 A1 | 4/2020 |
| WO | 2021162888 A1 | 2/2021 |
| WO | 2024145497 A1 | 12/2023 |

* cited by examiner

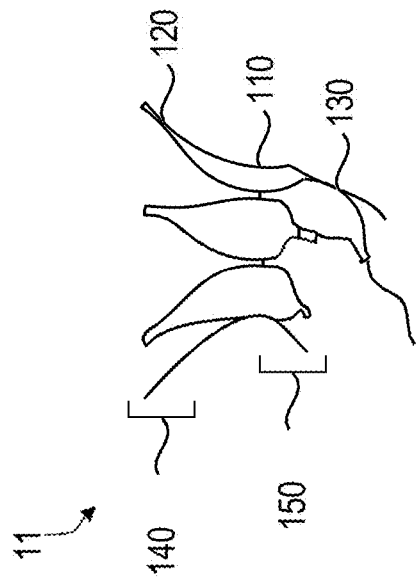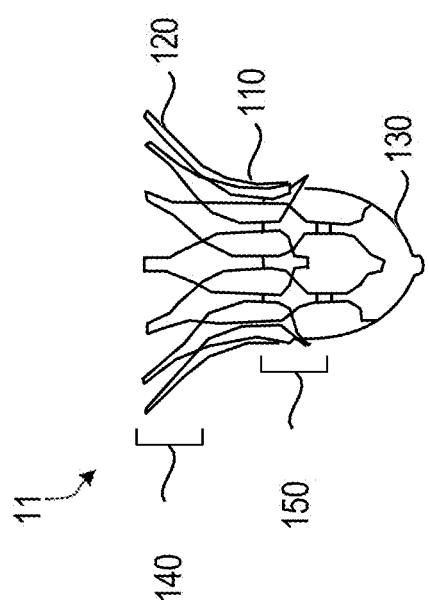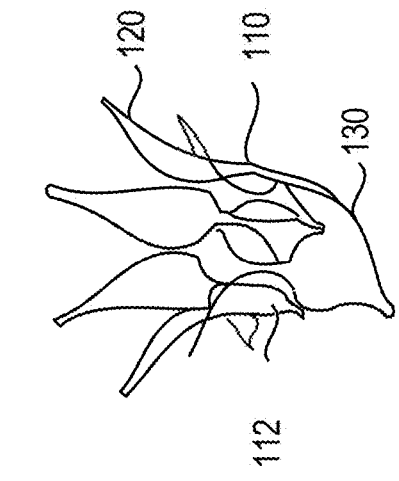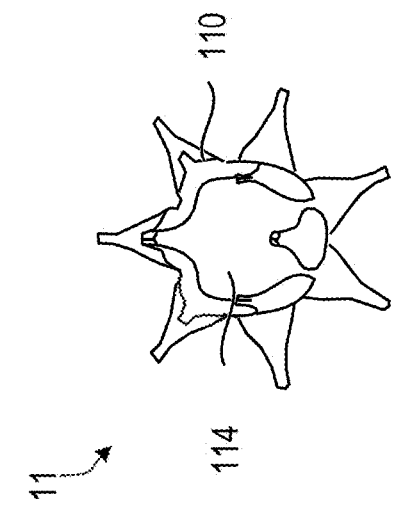

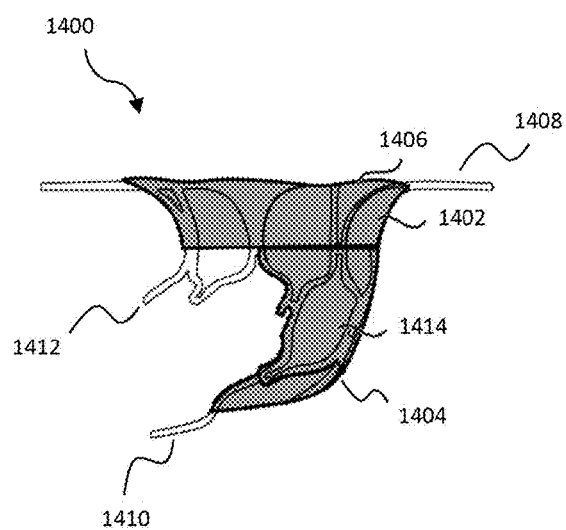
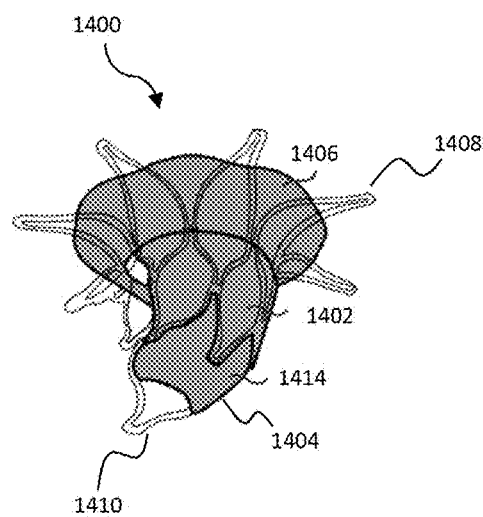
FIG. 14A  FIG. 14B

DEVICES, SYSTEMS, AND METHODS FOR REVASCULARIZATION OF THE MYOCARDIUM

CROSS-REFERENCE TO RELATED APPLICATIONS

This application is a continuation of U.S. patent application Ser. No. 18/821,919, filed Aug. 30, 2024, which is a continuation of Patent Cooperation Treaty Application No. PCT/IB2023/051918, filed Mar. 1, 2023, which is based on and claims benefit of priority of U.S. Provisional Patent Application No. 63/315,601, filed Mar. 2, 2022, and U.S. Provisional Patent Application No. 63/378,568, filed Oct. 6, 2022, the contents of all of which are incorporated herein by reference in their entireties.

TECHNICAL FIELD

The present disclosure generally relates to the field of cardiac surgery, and particularly relates to devices, systems, and methods for revascularizing the heart.

BACKGROUND

The primary function of the heart (myocardium) is to pump oxygenated blood throughout the body. The heart includes four chambers: left and right atria and left and right ventricles, as well as a series of valves, and a network of veins and arteries. In a healthy myocardium, deoxygenated blood from the body enters the right atrium through the superior and inferior vena cava. This blood is forced through the tricuspid valve and into the right ventricle, where it is then pumped to the lungs for oxygenation via the pulmonary valve and pulmonary arteries. Oxygenated blood then returns from the lungs towards the left atrium via the pulmonary veins where the oxygenated blood is then pumped into the left ventricle through the mitral valve. The left ventricle pumps this oxygenated blood through the aortic valve and into the aorta where it is then distributed throughout the body via a complex network of arterial vessels.

While the superior and inferior vena cava are primarily responsible for directing deoxygenated blood from the body and into the right atrium, the coronary sinus is primarily responsible for directing venous (i.e., deoxygenated) blood from the vasculature of heart tissue into the right atrium. This large cardiac vein arises at the junction of the great cardiac vein and oblique vein of the left ventricle and is partially situated within the posterior atrioventricular groove between the left atrium and left ventricle. Tributary veins, including the anterior interventricular vein (AIVV), great cardiac vein (GVC), and posterior interventricular vein (PIVV), each drain into the coronary sinus. The oxygen saturation (PO2) within the coronary sinus generally falls in the range of 10-15 mmHg.

When vasculature within the heart is insufficiently oxygenated, e.g., as result of coronary artery disease, atherosclerosis, and arteriosclerosis, complications including, angina, heart attack, and heart failure may arise. Various surgical techniques may be used to mitigate these complications. Angioplasty, for example, (also known as Percutaneous Coronary Interventions, Balloon Angioplasty and Coronary Artery Balloon Dilation), involves the surgical widening of a clogged or otherwise narrowed artery. Here, the surgeon delivers a catheter balloon system to the site of obstruction and inflates the balloon to widen the obstruction and improve blood flow through the artery. A stent may be inserted to prevent the artery from contracting thereby maintaining blood flow therethrough. The surgeon may also use a laser (laser angioplasty) or cutting tool (atherectomy) to vaporize or cut away any blockage.

Another method for correcting oxygen deficiency is coronary bypass surgery (also known as coronary artery bypass grafting "CABG"). Here, an open-heart procedure is used to graft a healthy blood vessel onto the heart to reroute blood around the obstructed artery. The graft may be harvested from the patient or a donor and usually originates from one or more of the leg, arm or chest, depending on the number of grafts needed. Complications and recovery time tend to be more extensive due to the invasiveness of the open heart procedure, which usually requires the surgeon to stop the heart to complete the procedure, and increases risk of infection at both the chest incision and graft incision sites.

Yet another method for correcting oxygen deficiency involves perfusion of oxygenated blood throughout the heart using of one or more surgically created holes in the left ventricle. In transmyocardial revascularization (TMR), one or more lasers are used to create multiple channels through the left ventricle to improve direct perfusion to the myocardium. The method may be beneficial where a patient is not responsive to or ineligible for coronary bypass surgery or percutaneous coronary intervention. Like TMR, percutaneous myocardial revascularization (PMR) also uses surgically created holes to enable direct myocardial perfusion; the procedure, however, tends to be less invasive.

Still other methods contemplate the use of various stent devices or grafts to direct oxygenated blood from the left ventricle to a coronary artery or providing retrograde flow of oxygenated blood from the left ventricle to the myocardium via the coronary sinus. The devices, systems and methods described herein address at least some of the drawbacks of traditional revascularization techniques. Such devices, systems and methods may shorten patient recovery time and improve patient outcomes.

SUMMARY

Embodiments consistent with the present disclosure provide devices, systems, and methods for revascularization of the myocardium.

Some embodiments include an intravascular medical device for shunting and selectively regulating anatomical fluid flow. Embodiments may include a tubular shunt configured for deployment in a passageway between a first organ and a second adjacent organ and to bridge a first cavity in the first organ and a second cavity in the second organ. Embodiments may also include a stabilizer configured to stabilize the tubular shunt in the passageway. Embodiments may also include a flow deflector extending from the tubular shunt and having a surface for deflecting flow in the second cavity. The flow deflector may be configured to extend from less than an entirety of a perimeter edge of the tubular shunt.

Some embodiments include an intravascular retrograde blood flow device comprising: a catheter; an expandable shunt compressed within the catheter to bridge an opening between a first cavity and a second cavity; an expandable flow deflector compressed within the catheter to deflect flow in the second cavity; and a flexible hinge interconnecting the expandable shunt and the expandable flow deflector, wherein the flexible hinge is configured to bend such that when the expandable shunt is positioned along a first axis of the opening and the expandable flow deflector is positioned along a second axis transverse to the first axis within the second cavity, the flexible hinge is bendable to enable transverse axial positioning of the expandable shunt and the expandable flow deflector while maintaining an interconnection between the expandable shunt and the expandable flow deflector.

Some embodiments include a medical device for directing retrograde blood flow, comprising a tube for delivery to a coronary sinus from a first direction and an expandable structure, compressed within the tube. The expandable structure includes a scaffold portion for maintaining an orifice between a coronary sinus and a heart chamber, and a flow-deflector portion configured to cause retrograde blood flow in the coronary sinus. The flow-deflector portion is configured such that after the tube is withdrawn towards the first direction, the flow-deflector portion is enabled to deploy towards a second direction, other than the first direction.

Some embodiments include an intravascular retrograde blood flow device, comprising a tubular shunt portion configured for deployment in a passageway between an organ and an adjacent blood vessel for bridging a cavity in the organ and an interior of the blood vessel, a stabilizer configured to fixate the tubular shunt portion in the passageway, and a flow deflector portion connected to a proximal end of the tubular shunt portion. The flow deflector is configured to direct blood flow, and a tether interconnects the flow deflector portion and the tubular shunt portion in a manner permitting the flow deflector portion to be positioned a predetermined distance from the tubular shunt portion in the blood vessel.

BRIEF DESCRIPTION OF THE DRAWINGS

The accompanying drawings, which are incorporated in and constitute a part of this disclosure, illustrate disclosed embodiments and, together with the description, serve to explain the disclosed embodiments. The particulars shown are by way of example and for purposes of illustrative discussion of embodiments of the present disclosure. The description taken with the drawings makes apparent to those skilled in the art how embodiments of the present disclosure may be practiced.

FIG. 1A is a front view of an example of an intravascular medical device, consistent with some embodiments of the present disclosure.

FIG. 1B is a side view of the device of FIG. 1A.

FIG. 1C is a bottom view of the device of FIG. 1A.

FIG. 1D is an isometric view of the device of FIG. 1A.

FIG. 14A is a side view of the medical device disclosed in FIG. 13.

FIG. 14B is a perspective view of the medical device of FIG. 13.

DETAILED DESCRIPTION

Figure 2:
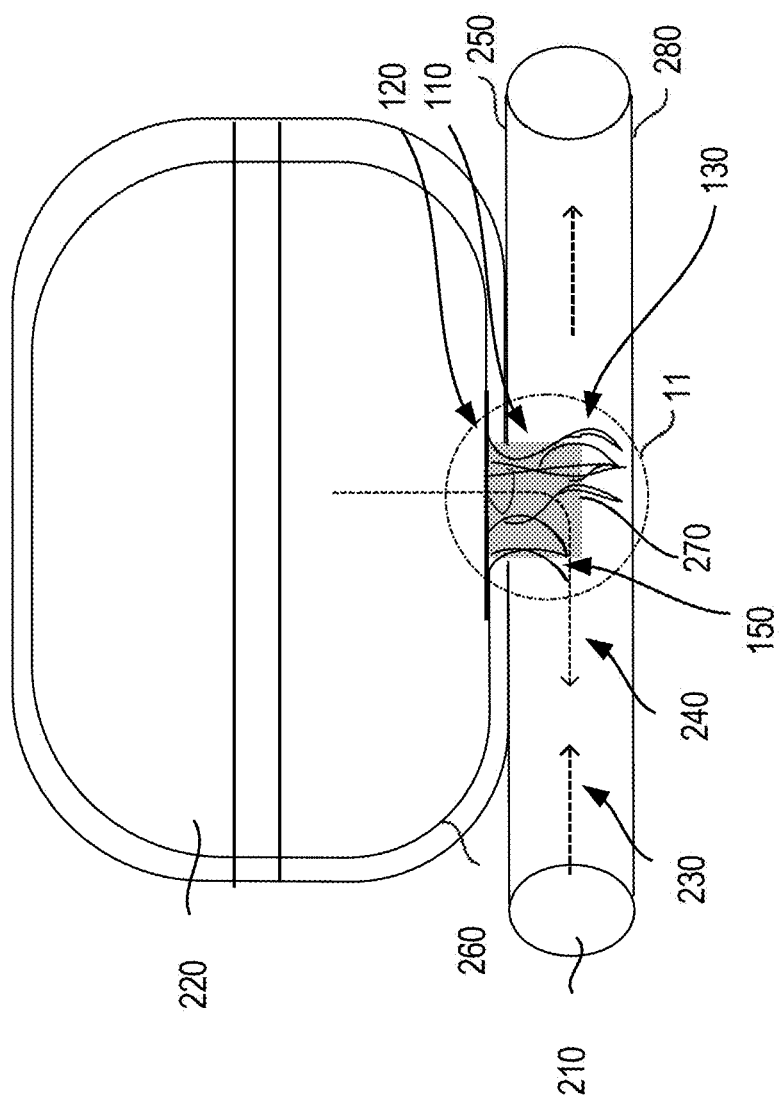
FIG. 2 is a side view of the device of FIG. 1A deployed between biological organs, consistent with some embodiments of the present disclosure.
Figure 3B:
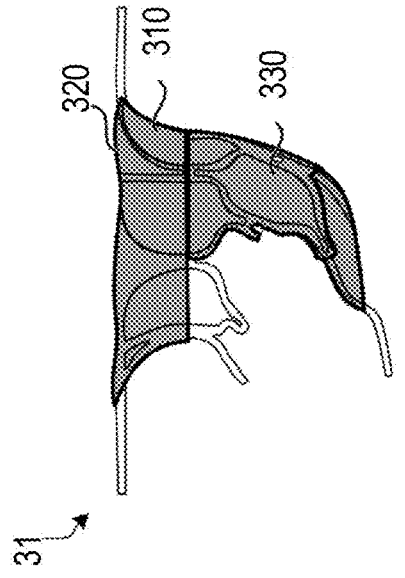
FIG. 3B is a side view of the covered device illustrated in FIG. 3A.
Figure 3D:
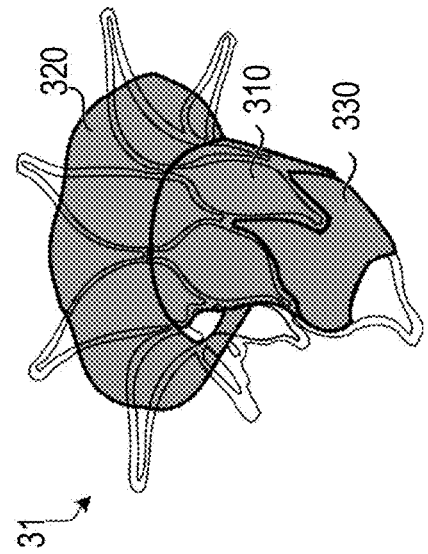
FIG. 3D is an isometric view of the covered device illustrated in FIG. 3A.
Figure 3A:
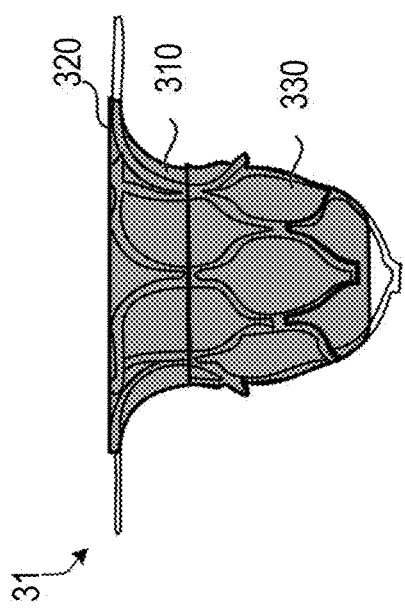
FIG. 3A is a front view of the device of FIG. 1A including a pliable covering, consistent with some embodiments of the present disclosure.
Figure 3C:
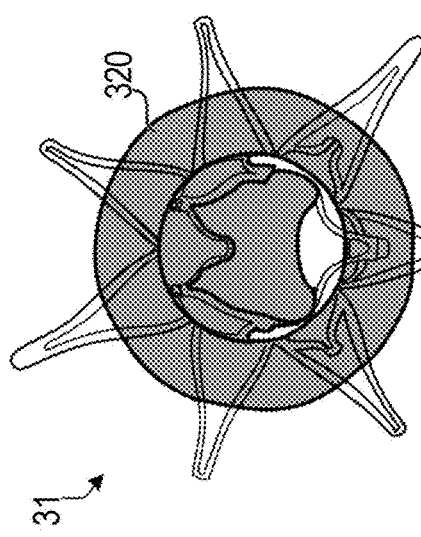
FIG. 3C is a bottom view of the covered device illustrated in FIG. 3A.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," "including," and other similar forms are intended to be equivalent in meaning and be open ended in that an item or items following any one of these words is not meant to be an exhaustive listing of such item or items or meant to be limited to only the listed item or items. It should also be noted that, as used herein and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations.

As used herein, unless specifically stated otherwise, the term "or" encompasses all possible combinations, except where infeasible. For example, if it is stated that a component can include A or B, then, unless specifically stated otherwise or infeasible, the component can include A or B, or A and B. As a second example, if it is stated that a component can include at least one of A, B, or C, then, unless specifically stated otherwise or infeasible, the component can include A, B, or C, or A and B, or A and C, or B and C, or A, B, and C.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

In the following description, various working examples are provided for illustrative purposes. However, is to be understood the present disclosure may be practiced without one or more of these details. Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated, and the interested reader is referred to the previously discussed figure(s) for a description of the like element(s).

Embodiments of the present disclosure relate to intravascular medical devices, including intravascular medical devices for shunting and selectively regulating anatomical fluid flow. As used herein, an intravascular medical device may refer to any device or instrument configured to be placed within or to operate inside a blood vessel or another biological structure or organ within a human body for a medical purpose. In disclosed embodiments, the biological structure may include a hollow anatomic feature within the body of a patient. Non-limiting examples of a biological structure include a blood vessel, a capillary, an artery, a vein, a heart chamber (e.g., left atrium, left ventricle, right atrium, right ventricle), or any other anatomical organ. An intravascular medical device may be configured to be delivered from a first location (e.g., a location outside the body) to a treatment site in a blood vessel or other biological structure. Additionally, or alternatively, in some embodiments, an intravascular medical device may be configured to cause a temporary or permanent change or transformation at a treatment site in a blood vessel. Some non-limiting examples of intravascular medical devices consistent with the present disclosure may include shunts, stents, catheters, or any other device configured to be placed within a blood vessel or other biological structure.

Embodiments of the present disclosure relate generally to medical devices, methods, and systems for shunting blood between two organs. In some embodiments, blood flow from a heart chamber may be shunted into the coronary sinus, thereby causing retrograde flow in the coronary sinus as a mechanism for treating heart disease.

As a non-limiting example, an intravascular medical device for causing retrograde coronary sinus blood flow may include a tubular shunt for bridging a heart chamber, such as the left atrium or left ventricle, and the coronary sinus to cause retrograde oxygen-rich blood flow in the coronary sinus. Oxygenated blood flowing "backwards" in the coronary sinus may result in oxygenation of heart tissue that may otherwise receive insufficient blood flow. A flow deflector positioned in the coronary sinus may aid in directing the retrograde flow, and may prevent, or at least partially impede, flow toward another biological structure, for example, the right atrium.

Consistent with embodiments of the present disclosure, the intravascular medical device may include a tubular shunt. As used herein, tubular may pertain to a structure having an outer wall or walls that define an intermediate channel, regardless of the contour of the intermediate channel. As used herein, a shunt may refer to any structure capable of bridging two biological structures, such as a heart chamber and a blood vessel. For example, the tubular shunt may be configured for deployment in a passageway between a first organ and a second adjacent organ. As used herein, deployment may pertain to the positioning or placement of the intravascular medical device in the body. Furthermore, a passageway may refer to a channel or opening that allows a fluid, such as blood, to flow through. The passageway may be formed by a pre-incised hole. Furthermore, in some embodiments, the tubular shunt may be configured to bridge a first cavity in the first organ and a second cavity in the second organ. The bridging of the first cavity in the first organ and the second cavity in the second organ may include providing a structure that allows fluid to flow between the first cavity and the second cavity. It is contemplated that the first organ and the second organ may be any biological organ such as—but not limited to—blood vessels, anatomical cavities, and/or anatomical chambers. Furthermore, a shunt may redirect the flow of bodily fluids, discussed further herein.

FIGS. 1A through 1D illustrate different views of an example of an intravascular medical device 11 for shunting and selectively regulating anatomical fluid flow, consistent with some embodiments of the present disclosure. As shown in FIGS. 1A through 1D, intravascular medical device 11 may include tubular shunt 110. Tubular shunt 110 may be tubular, or annular in shape and form a central opening 114, defining a passageway adapted to permit fluid flow from one end of the passageway to the other end of the passageway. Thus, tubular shunt 110 may be configured for deployment in a passageway between an organ (e.g., left atrium) and an adjacent blood vessel (e.g., coronary sinus) for bridging a cavity in the organ and interior, or lumen, of a blood vessel.

In some embodiments, the tubular shunt may include a tubular wall with at least one opening therein. The tubular wall may be formed of wire, wire mesh, struts, ribs, or other materials capable of scaffolding the passageway. One or more openings in the wall may be interstices between strands of wire, wire mesh, struts, ribs, or other material. For example, and as shown in FIGS. 1A through 1D, tubular shunt 110 may include a tubular wall with a series of openings 112. It is contemplated that the tubular wall may have any number of openings based on design considerations.

Furthermore, tubular shunt 110 may include central opening 114, and thus may maintain an orifice between, for example, a heart chamber (e.g., the left atrium or left ventricle) and an adjacent organ (e.g., blood vessel such as a vein, including the coronary sinus) via a pre-incised hole between the heart chamber and the adjacent organ. The pre-incised hole may have been formed as part of the implantation process before deployment of the intravascular device in the desired deployment location, or may have been formed in a prior procedure. In some embodiments, the inner diameter of central opening 114 in its expanded state may be less than 10 mm, less than 8 mm, less than 6 mm or between 10 mm and 5 mm or 7 and 9 mm.

FIG. 2 depicts a side view of an example of an intravascular medical device 11 deployed between two cavities. For example, cavity 220 may be a left atrium and cavity 210 may be a coronary sinus.

FIG. 2 is intended to represent a generalized example of adjacent organs in which embodiments of this disclosure may be deployed. Although illustrated as a larger first cavity 220 shunted to a vessel 210, it is to be understood that the depiction of FIG. 2 is exemplary only. In some embodiments, the first cavity 220 and the second cavity 210 may both be vessels, and in other embodiments, the first cavity and the second cavity may both be non-vessels. One embodiment used in this disclosure as an example is where the first cavity 220 is a left atrium and the second cavity 210 is a coronary sinus. Therefore, sometimes in this disclosure, the reference numerals 220 and 210 are referred to more generally as the first and second cavities, and other times those same reference numerals are used to refer to the example of the left atrium and the coronary sinus. It is to be understood that reference to this latter specific example is not intended to limit the disclosure of FIG. 2 to the example of a shunted left atrium to a coronary sinus. Rather, FIG. 2 is intended to broadly disclose any two cavities shunted together.

As a non-limiting example, and as shown in FIG. 2, tubular shunt 110 may be deployed, or placed, between cavity 220 and cavity 210 at a passageway 270 formed during the implantation process. Furthermore, tubular shunt 110 may bridge, for example, cavity 220 and cavity 210, in the illustrated case, an interior lumen of a vessel. In some embodiments, a pre-incised hole between cavity 220 and the cavity 210 may create passageway 270.

Tubular shunt 11 may have flexibility and structural stability to prevent deviation or damage during its intended use. In some embodiments, tubular shunt 11 may include multiple struts and connectors, and the connectors may be located along the tubal circumference of tubular shunt 11 in equal distance from one another. As previously mentioned, spaces between these struts and connectors may define openings 112. Tubular shunt 11 may be configured to enable fluid (e.g., blood) to flow from and area of higher pressure (e.g., a heart chamber) to an area of lower pressure (e.g., a vein or coronary sinus) via central opening 114. The pressure differential may be more than 1 mm Hg. In some embodiments, the shunt further includes a pressure valve configured to control or permit blood to pass at a predetermined pressure.

Tubular shunt 11 may be sized to terminate in a region of a boundary between central opening 114 or passageway 270.

For example, one end of tubular shunt 11 may terminate in a region of a boundary between central opening 114 (or passageway 270) of coronary sinus 210, such as at upper wall 250. Another end of tubular shunt 11 may terminate in a region of a boundary between central opening 114 (or passageway 270) at left atrium 220, such as at inner wall 260.

In some embodiments, tubular shunt 110 may include orientation markers to facilitate rotational orientation around central opening 114. The orientation markers may be configured to allow for control of rotational orientation of tubular shunt 110 around central opening 114. In some embodiments, the control of rotational orientation of tubular shunt 110 may define an extent of flow deflection in the second cavity (e.g., coronary sinus 210), which is discussed in further detail below with respect to flow deflector 130. Orientation markers may include, for example, tantalum markers or a particular structural design at specific locations.

Tubular shunt 110 may be configured to accommodate a range of anatomies and stabilize flow deflector portion 130 and tubular shunt 110 by having ends axially spaced apart at a length of about 0.5-5 mm or between 1-4 mm. As used herein, axially spaced apart may refer to a distance between the distal and proximal ends along a longitudinal axis of the intravascular medical device. Tubular shunt 110 may integrally connect, or interconnect, with one or more of stabilizer 120 and flow deflector 130, both of which are discussed in detail below.

In some embodiments, the intravascular medical device may include a stabilizer. As mentioned above, the stabilizer and the tubular shunt may be integrally connected, and the stabilizer may be configured to stabilize the tubular shunt in the passageway. The stabilization of the tubular shunt may include fixing the tubular shunt in a particular position or rotational orientation, or otherwise preventing the tubular shunt from migrating, moving, or rotating.

As a non-limiting example, the stabilizer may include a first flange region connected to the tubular shunt. As used herein, a flange may pertain to a projecting flat rim, collar, or rib structure on a component. A flange refers to a protruded ridge, lip, or rim, or edge that extends outward from a structure, in this instance the tubular shunt. The flange may completely or partially circumscribe the outer periphery of the shunt, or it may include a series of flange portions or regions that work together for stabilization purposes. A flange region refers to all or part of a flange.

As illustrated by way of one example in FIGS. 1A through 1D, the first flange region 140 may include a substantially flared shape having a radius of curvature. A circumference of the flare may be greater than the circumference of the shunt to prevent shunt migration. In some embodiments, the first flange region 140 may be located on a side of the tubular shunt 11 opposite the flow deflector, an example of the flow deflector being shown as 130 in FIGS. 1A through 1D and discussed in more detail further below. Additionally, or alternatively, in some embodiments, the first flange region 140 may be configured to seal (e.g., provide a tight closure) against an inner wall 260 of the first cavity (e.g., left atrium 220) upon deployment, or positioning, of the intravascular medical device 11 such that blood is restricted (either partially or completely) from passing between the first flange region 140 and the inner wall 260 of the first cavity. Furthermore, in some embodiments, the first flange region 140 may be asymmetrical in terms of the radius of curvature at different locations or length of flange.

As shown in FIGS. 1A through 1D and FIG. 2, when the first flange region 140 (as shown in FIGS. 1A through 1D)

extends into the second cavity 220 (as shown in FIG. 2), stabilizer 120 may sit flush (or relatively flush against an inner wall 260 of first cavity 220, effectively providing an anchor for intravascular medical device 11 when implanted. Thus, tubular shunt 110 may be stabilized in passageway 270. Although illustrated in FIG. 2 as assuming a flush configuration, stabilizer 120 may assume alternative configurations, such as S-shaped or C-shaped cross-sectional profiles.

Additionally, or alternatively, the tubular shunt may include a second flange region extending into the second cavity, and the second flange region may be configured to secure (e.g., fix or fasten) the tubular shunt within the passageway such that tubular shunt does not give way, become loose, or migrate. As shown in FIGS. 1A through 1D, tubular shunt 11 may include second flange region 150. As shown in FIG. 2, second flange region 150 may also have a flared shape, such that second flange region 150 extends into the second cavity 210. In some embodiments, second flange region 150 may contact an upper wall 250 of the second cavity 210 near a pre-incised hole between the first cavity 220 and the second cavity 210.

As discussed above, first flange region 140 may sit flush against inner wall 260 of first cavity 220, and second flange region 150 may sit flush against upper wall 250 of the second cavity 210. Thus, in some embodiments, the combination of first flange region 140 and second flange region 150 may stabilize tubular shunt 110 in its axial and rotational position between left atrium 210 and the coronary sinus 210, preventing movement of tubular shunt 110 in an axial direction, a rotational direction, or both.

Thus, the shunt-stabilizer combination may have an hourglass shape with a narrower waist at its mid-section and wider flanged regions 140 and 150 extending beyond a perimeter edge of the tubular shunt and into the first cavity of the first organ and the second cavity of the second organ. In some embodiments, flange region 150 may be omitted on the proximal end of the shunt, with proximal end stability being provided by the connected flow deflector, as discussed below.

Disclosed embodiments may include a flow deflector extending from the tubular shunt and having a surface for deflecting flow in the second cavity. Flow deflection involves changing a direction of flow. For example, body fluids, such as blood, may be caused to change flow from a first direction to a second direction. In some embodiments, the second direction may be opposite to the first direction. In other embodiments, the second direction may be perpendicular to the first direction. It is contemplated that the second direction may be perpendicular to, parallel to, or angled relative to the first direction. Thus, the flow deflector may include any structure that deflects, diverts, occludes, blocks, obstructs, slows, or inhibits fluid flow.

In some embodiments, the flow deflector may be partially connected or integrally connected to the tubular shunt. Furthermore, the flow deflector may be configured to extend from less than an entirety of a perimeter edge of the tubular shunt. For example, the flow deflector may extend from half the perimeter edge of the tubular shunt. In some embodiments, the flow deflector may include an internal surface integral with the tubular shunt such that there may be no clear transition between the tubular shunt and the flow deflector. (In other words, the structures of the flow deflector and the shunt act as a tether connecting the two components.) Additionally, or alternatively, in some embodiments, the flow deflector may include an external surface integral with the tubular shunt such that there is no clear transition between the tubular shunt and the flow deflector.

As shown in FIGS. 1A through 1D, intravascular medical device 11 may include flow deflector 130. Flow deflector 130 may be located at the opposite end of tubular shaft 110 from stabilizer 120. Flow deflector 130 may be configured for location in a vein, such as coronary sinus 210, in a manner such as is shown in FIG. 2. As a non-limiting example, tubular shunt 110 and flow deflector 130 may form a new junction connecting first cavity 220 and second cavity 210 after a pre-incised hole is created during the implantation process. Flow deflector 130 may be configured to deflect blood flowing in an initial direction, such as natural flow 230, through a lumen of the second cavity 210 such that the blood is deflected in a retrograde direction, or in the direction of retrograde flow 240, as shown in FIG. 2. The blood flowing in the direction of natural flow 230 may be in a deoxygenated state, and blood flowing in the direction of retrograde flow 240 may be in an oxygenated state.

Retrograde flow 240, or blood deflected in a retrograde direction, as shown in FIG. 2 may be achieved by the shunting of the first cavity 220 and the second cavity 210 via passageway 270 using tubular shunt 110, as well as through at least partial occlusion of natural flow 230. In situations where the first cavity 220 is a source of oxygen rich blood, such as when the first cavity is on the left side of the heart (left atrium or left ventricle) and the second cavity 210 is the coronary sinus, retrograde flow may support heart tissue deprived of oxygen as the result of heart disease.

As used herein, occlusion may refer to the blockage or redirecting of fluid flowing through a structure, such as blood flowing through a biological organ. For example, the occlusion of blood flowing in a first direction may include the blocking of blood flowing in the first direction or a redirecting of the blood flowing in the first direction. As another example, the occlusion of a blood vessel may include the blocking of fluid flow through or the closing of the blood vessel. Flow deflector 130 may contribute to the at least partial occlusion of natural flow 230. Furthermore, a higher pressure in left atrium than in the coronary sinus may contribute to retrograde flow 240.

Furthermore, in some embodiments, the flow deflector may include a non-tubular concavity configured to deflect flow in the second cavity. As discussed above, tubular may pertain to a structure having an outer wall or walls that define an intermediate channel, regardless of the contour of the intermediate channel. Thus, as used herein, a non-tubular concavity may pertain to a structure that may have walls that do not form a completely enclosed intermediate channel, leaving the non-tubular concavity open. For example, as shown in FIGS. 1A through 1D, flow deflector 130 may have a bowed, or bent frame. In some embodiments, the bowed frame may have a scoop configuration, where a scoop configuration may be shaped such that flow deflector 130 has a radius of curvature. The scoop configuration may include additional flexibility at the edges or lip of flow deflector 130 to accommodate a range of anatomy and patient-to-patient variance. As shown in FIG. 1A, the scoop trough of flow deflector 130 may generally be circular in shape in its cross-sectional profile. Furthermore, in some embodiments, flow deflector 130 may form a crescent shape extending from the tubular shunt, as shown in FIG. 1B.

In some embodiments, flow deflector 130 may have a scoop or arc-shaped concavity sized to cover most or all of an inner circumference of a vein, such as coronary sinus 210, such that it extends mostly or entirely across the entire cross-section in the vein. In some examples, the flow deflector may be sized to contact a perimeter of a cavity of the vein (e.g., coronary sinus) or span the cross section of the cavity of the vein (e.g., coronary sinus). For example, as shown in FIG. 2, flow deflector 270 may span the cross-section of coronary sinus 210 and contact lower wall 280 of coronary sinus 210.

In some embodiments, the scoop shape may have a minimum radius as measured from the center of tubular shunt 110, which may generally correspond to the cross-sectional height diameter of the second organ, such as a vein (e.g., coronary sinus). In some embodiments, the radius of the scoop shape may be larger than a vein radius by approximately 20%, to create fixation and seal. For example, for a 4 mm vein radius, a 5 mm scoop radius may be used. Consistent with some embodiments, the flow deflector may include a second stabilizer for engaging a wall of the coronary sinus. This second stabilizer may be in the form of a lip, flange, or a plurality of prongs. In some cases, the second stabilizer may be configured to cooperate to maintain a fluid seal.

Figure 16:
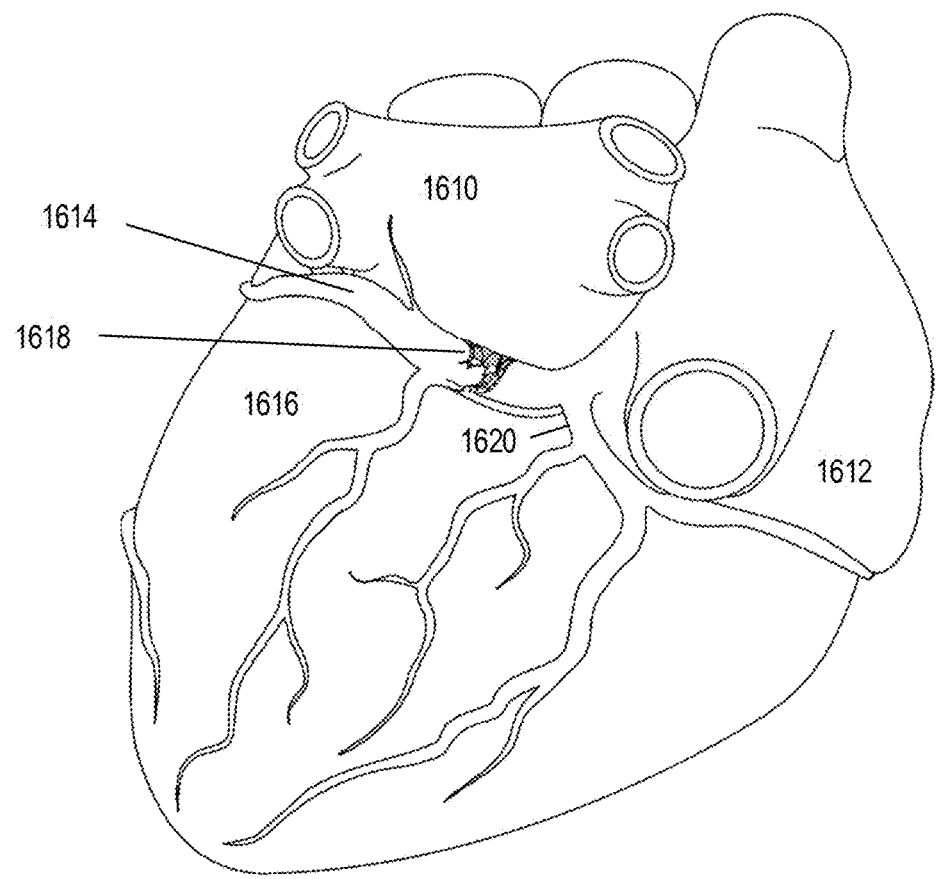
FIG. 16 is a cross-sectional view of human heart with an exemplary intravascular retrograde blood flow device deployed in the heart, consistent with some embodiments of the present disclosure.

Additionally, or alternatively, the flow deflector may include a tether configured to connect the flow deflector to the perimeter edge of the tubular shunt. A tether, as used herein, may include a cloth, metal, wire, hinge, or other fastening component that may connect flow deflector 130 to the perimeter edge of tubular shunt 110. FIG. 16 illustrates an example of tether 1624 interconnecting flow deflector portion 1620 and tubular shunt portion 1614. Disclosed embodiments may include at least one undulating flexible wire tethering the tubular shunt to the flow deflector. The undulating flexible wire may be shaped such that the flexible wire has a smoothly rising and falling form or outline. The tether may be further configured to prevent flow deflector 130 from migrating beyond a predetermined distance from tubular shunt 110. This may contribute to a flow deflector that may be adaptable to various anatomical structures (e.g., due to variation between anatomical structures of an individual and between individuals).

Additionally, or alternatively, the tubular shunt may be sized to distally terminate (e.g., end, stop, interface) at a perimeter edge of the passageway proximate the first cavity, and the flow deflector may be sized to terminate (e.g., end, stop, interface) against a wall of the second cavity opposite the passageway. As shown in FIG. 2, tubular shunt 110 may terminate at a perimeter edge of the passageway proximate the first cavity 220, for example, inner wall 260. With respect to FIG. 2, tubular shunt 110 may terminate against a wall of the second cavity opposite the passageway, for example, lower wall 280. Furthermore, flow deflector 130 may include an edge or lip configured for engaging a wall, such as lower wall 280, of second cavity 210. The distal edge or lip may be flexible and configured to flex against lower wall 280 of second cavity 210. Additionally, or alternatively, the distal edge or lip may be biased to conform to a curvature of the second cavity 210 (e.g., the coronary sinus).

In some embodiments, and as discussed above, the flow deflector may be configured to enable retrograde flow in the blood vessel. As a non-limiting example, and as shown in FIG. 2, intravascular medical device 11 may be positioned such that flow deflector 130 causes retrograde flow 240 in second cavity 210 (e.g., the coronary sinus). In some embodiments, the flow deflector may be configured to enable both natural flow 230 and retrograde flow 240 in the blood vessel by, for example, partial occlusion of natural flow 230, as described in detail further below.

Additionally, or alternatively, the flow deflector may include a tool passage therethrough. A flow deflector including a tool passage therethrough may allow various surgical tools to pass through the flow deflector, allowing for surgical operations such as—but not limited to—revision surgeries, removal of the intravascular medical device, or monitoring or resolving of conditions (e.g., pressure, plaque buildup) in the heart or blood vessels. As an example, flow deflector 130 may allow a tool, such as a cutting tool or pushing tool, a guidewire, or a trigger wire to pass through second cavity 210 to a location opposite left atrium 220. Continuing the example, the cutting tool may be used to create an incision or hole in a biological organ or between two biological organs. A pushing tool may be used to deliver a second intravascular medical device to the same location as, or a different location from, the first intravascular medical device. Examples of the tool passage include but are not limited to: a one way valve, a duck bill valve, staggered shutters or a two or more layered material with each individual layer having a slot positioned perpendicular to one another, a plug, or another temporary seal. Other approaches to a tool passage are also envisioned for use with the disclosed embodiments, such as two partially overlapping layers configured to permit manipulation such that they do not overlap as a location to pass a tool there through.

In some embodiments, the tubular shunt and the flow deflector may be integrally connected in a manner such that a rotational orientation of the tubular shunt in the passageway defines an extent of flow deflection in the second organ, where the second organ may be a blood vessel. The extent of flow may include a quantification of the properties of blood flow. For example, the extent of flow may include—but is not limited to—an amount of blood flowing through an organ, a rate of blood flowing through an organ, or a volume of blood flowing through an organ.

As shown in FIG. 2, tubular shunt 110, stabilizer 120, and flow deflector 130 may be integrally connected to form intravascular medical device 11. Upon rotation of tubular shunt 110, flow deflector 130 may also rotate in the same direction. The rotation of flow deflector 130 may result in a rotational orientation that defines the extent of flow deflection or flow occlusion (e.g., amount of blood flow, rate of blood flow, volume of blood flow) in coronary sinus 210.

The rotational orientation of flow deflector 130 may form at least a partial block in a cross-sectional area of coronary sinus 210, leading to partial or complete occlusion of blood flow in coronary sinus 210 in the direction of natural flow 230. The blood flowing in natural flow 230 may be deflected, redirected, or re-routed to left atrium 220 and retrograde flow 240 may occur.

For example, in a first rotational orientation of the tubular shunt, the flow deflector may be configured to span a width of the blood vessel to cause a first flow deflection. Furthermore, in a second rotational orientation of the tubular shunt, the flow deflector may be configured to span less than the width of the blood vessel to cause a second flow deflection. In some embodiments, the first flow deflection may be greater than the second flow deflection.

As a non-limiting example, the rotational orientation of intravascular medical device 11 in the rotational orientation shown in FIG. 2 may result in complete occlusion (e.g., 100% deflection) of the blood flowing in natural flow 230 direction through coronary sinus 210. The flow deflector may be configured to permit some blood to pass even in the full deflecting position. Thus, in the rotational orientation shown in FIG. 2, most or all blood flowing in the direction of natural flow 230 may be redirected to flow in the direction of retrograde flow 240. Furthermore, intravascular medical device 11 may be rotated around a center axis to achieve a second rotational orientation. In the second rotational orientation, depending on the degree of rotation, intravascular medical device 11 may cause partial occlusion (e.g., 90%, 70%, 60% 50% deflection or less) of the blood flowing in natural flow 230 through coronary sinus 210. Thus, in the second rotational orientation of the example, half of the blood flowing in the direction of natural flow 230 may be redirected to flow in the direction of retrograde flow 240, and the other half of the blood flowing in the direction of natural flow 230 may continue to flow in the direction of natural flow 230. As described in this example, the flow deflection (or the redirection of blood flow) caused by the rotational orientation of intravascular medical device 11 as shown in FIG. 2 may be greater than the flow deflection caused by the second rotational orientation of intravascular medical device 11.

It is contemplated that intravascular medical device 11 may be positioned in any number of rotational orientations, and each rotational orientation may result in a different degree of occlusion. Different degrees of occlusion may be desired to address varying severities of diseases and/or disorders of the heart.

In some embodiments, tubular shunt 110, stabilizer 120, and flow deflector 130 may be made from a biocompatible flexible material forming a frame or scaffold (e.g., walls having holes) to allow transition between a collapsed configuration suitable for percutaneous delivery within a delivery catheter and an expanded state, discussed in further detail below. The stiffness of the flexible material may be low enough so as not to interfere with natural contraction of the atrial chamber of the heart. The flexible material may additionally have non-uniform flexibility to improve its function within the heart. Furthermore, in some embodiments, metal outer edges, such as those of a frame or scaffold of tubular shunt 110, may be rounded to reduce trauma to the tissue in contact. Additionally, or alternatively, the flexibility of the outer edges which engage with tissue may have a higher degree of flexibility. The frame or scaffold portion of the tubular shunt may interconnect with one or both of the stabilizer and the flow deflector.

Furthermore, the flexible materials may include materials that may provide strength to resist deformation over time, have ability to expand due to pressure decrease on outer circumference, and be flexible for tolerance of a range of anatomical variance. Non-limiting examples of flexible materials may include a super elastic alloy, and/or a shape memory material, such as a shape memory alloy (SMA) such as a nickel-titanium alloy otherwise known as nitinol or NiTiCu (nickel titan copper), CuZn (copper zinc), CuZnAl (copper zinc aluminum) and/or CuAlNi (copper zinc nickel). Other suitable materials may include other biocompatible metals or stainless steels. The flexible material may be further be coated and or textured to increase biocompatibility for improved blood flow and optimal engagement with tissue in a pre-incised hole.

FIGS. 3A through 3D illustrate an example of an intravascular medical device with a pliable covering 31. As shown in FIGS. 3A through 3D, tubular shunt 110 may be covered by tubular shaft cover 310; stabilizer 120 may be covered by stabilizer cover 320; and flow deflector 130 may be covered by flow deflecting cover 330. Covers 310, 320, 330 may, alone or in any combination, form a pliable covering. When in combination, covers 310, 320, 330 may be integrated or continuous. The coverings may be stitched, glued, or otherwise affixed to the underlying frame structure.

A pliable covering, as used herein, may include a fabric cover or any flexible material that may be wrapped around a component of the intravascular medical device. In some embodiments, the pliable covering may have increased flexibility over the flexible material discussed above with respect to a frame or scaffold. The pliable covering may be at least partially impermeable to fluid. In particular, the pliable covering may be at least partially impermeable to blood flow. In some embodiments, the pliable covering may be substantially impermeable to fluid. The partial or substantial impermeability of the pliable covering to fluid may be conducive to effective deflection of the fluid flow, such as blood flow. For example, a pliable covering that is partially impermeable to blood flow may allow a portion of blood flow through the pliable covering to be blocked and redirected by the pliable covering. As another example, a pliable covering that is substantially impermeable to blood flow may allow all blood flow through the pliable covering to be blocked and redirected by the pliable covering. In some embodiments, the pliable covering may be porous. As used herein, a porous structure may include void spaces such that some materials or fluids that flow through may flow past the porous structure. It is contemplated that the void spaces may be of any size and may be a combination of sizes within a singular porous structure.

Additionally, or alternatively, the pliable covering may promote endothelialization or epithelialization on the surface or within the porous, (e.g., mesh or braided) pliable covering of the flow deflector. Non-limiting examples of compounds that may be implemented and promote endothelialization or epithelialization include, but are not limited to, growth factors such as transforming growth factor, fibroblast growth factor, epidermal growth factor, and other biological materials (e.g., tissue or tissue components). In some embodiments, the pliable covering may be configured to inhibit clotting on the surface or within the porous pliable covering of the flow deflector so that blood clot or thrombus formation is minimized in the vicinity for example, by including molecules known to reduce clotting.

In some embodiments, flow deflector 130 may include a scaffold portion as well as a flexible flow deflecting cover 330, also referred to as a pliable covering. In some examples, flow deflecting cover 330 may be located on flow deflector 130 such that flow deflector 130 and flow deflecting cover 330 are configured, upon expansion, to deflect blood flow from the heart chamber 220 in a retrograde manner within the coronary sinus 210.

Furthermore, flow deflecting cover 330 may include a fabric, mesh polymer coating; synthetic material coating; or combinations thereof. In some embodiments, flow deflecting cover 330 may be configured to extend and cover at least 50% of the scoop shape of flow deflector 130. In other embodiments, flexible flow deflecting cover 330 may be configured to extend over and cover at least 70% of the scoop shape of flow deflector 130. In yet other embodiments, flexible flow deflecting cover 330 may be configured to extend over and cover at least 90% of the scoop of flow deflector 130. Further, in some embodiments, flexible flow deflecting cover 330 may be configured to extend over and cover at least 95% of the scoop shape of flow deflector 130. In some embodiments, flow deflecting cover 330 may include a fine mesh or woven material.

The stabilizer may include a pliable covering and a plurality of arms configured to establish, upon deployment, a fluid seal (e.g., complete or partial) between a first side of the pliable covering and a wall of the first cavity.

As an example, pliable covering 320 may be configured to seal stabilizer 120 or a flange against a wall, such as inner wall 260, of the heart chamber, such as left atrium 220, upon deployment of the intravascular medical device. The fluid seal (e.g., tight closure) may prevent blood from flowing between stabilizer 120 and any adjacent structure. This may prevent intravascular medical device 11 from migrating in one or both of an axial or rotational direction. Furthermore, the fluid seal may prevent blood from flowing between stabilizer 120 and any adjacent structure to avoid, limit, minimize, or prevent increased turbulent blood flow, which may lead to weakening of the heart or blood vessel walls.

As shown in FIGS. 1A through 1D and FIGS. 3A through 3D, stabilizer 120 may include a plurality of arms, and the arms may be made from a biocompatible flexible material which may make up a frame or scaffold, as discussed previously. In some embodiments, each arm may form a relatively triangular shape. However, it is contemplated that the arms of stabilizer 120 may be any shape suitable for assisting in stabilizing tubular shunt 110. Additionally, or alternatively, the pliable covering may extend over the tubular shunt and the flow deflector.

It is contemplated that any number of covers 310, 320, 330 may be used to cover respective portions of intravascular medical device 11, and the covers 310, 320, 330 may be integrated or continuous. For example, in some embodiments, intravascular medical device with a pliable covering 31 may only include one of tubular shaft cover 310, stabilizer cover 320, or flow deflecting cover 330. It is further contemplated that any combination of covers may be included in intravascular medical device with a pliable covering 31, and the covers may be integrated into one pliable covering. Furthermore, covers 310, 320, 330 may be mesh, fabric, polymer coating, or any other synthetic material wrapped around a portion of intravascular medical device 11 and configured to limit blood flow. In some embodiments, covers 310, 320, 330 may include a fine mesh or woven material. It is contemplated that covers 310, 320, 330 may be different materials with respect to each other.

In some embodiments, the pliable covering—or covers 310, 320, 330—may be at least partially impermeably to fluid (e.g., blood). Thus, non-limiting examples of materials that may comprise the pliable covering—or covers 310, 320, 330—may include nylons, polyethylene, EPTFE, TPU and PTFE.

In some embodiments, the tubular shunt, the stabilizer, and the flow deflector may be integrally connected and expandable upon deployment through a delivery catheter. As used herein, integrally connected may pertain to the components of a structure that are united. For example, the tubular shunt, stabilizer, and flow deflector may be integrally connected due to fabrication from the same material or in the same process such as, for example, etching, micro-electro discharge machining, electroforming, diecasting, and laser cutting and welding. As another example, the tubular shunt, stabilizer, and flow deflector may be integrally connected after being combined together, or connected to each other, post-fabrication by, for example, welding.

Figure 4:
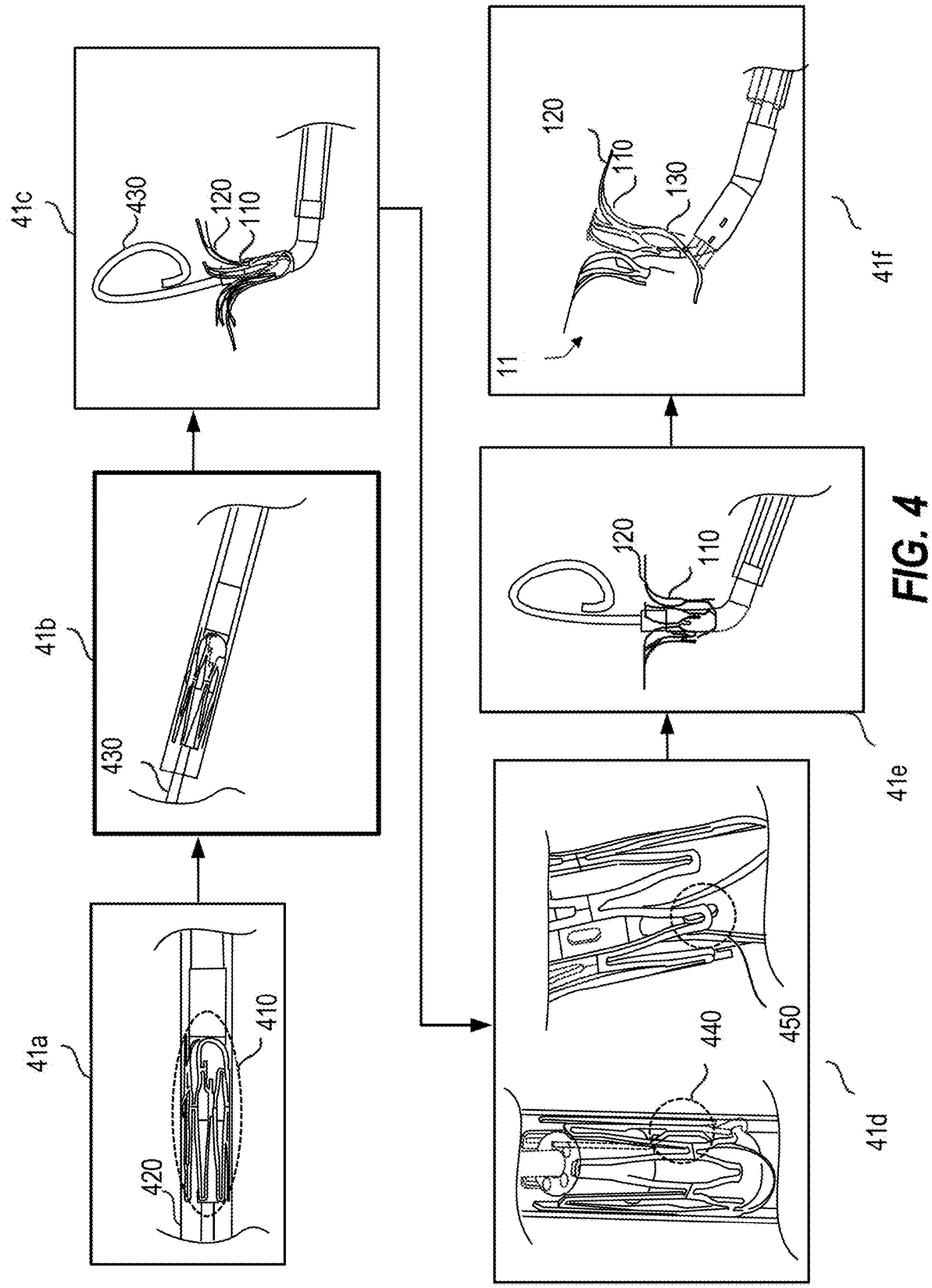
FIG. 4 graphically depicts an example process of deploying an intravascular medical device between biological organs, consistent with some embodiments of the present disclosure.

FIG. 4 illustrates an example of deployment of intravascular medical device 11 from a catheter 420, using a guide wire 430. Embodiments of the present disclosure may include a sheath, such as catheter 420, configured to contain the tubular shunt and the flow deflector in a compressed configuration. As used herein, a sheath may pertain to a structure or covering that may enclose another structure or component. The sheath, such as catheter 420, may allow intravascular medical device 11 to navigate through tortuous anatomy and avoid premature deployment within the body. As used herein, with respect to an intravascular medical device, a compressed configuration may refer to the form of the intravascular medical device when stored in, for example, a sheath such as a delivery catheter. An intravascular medical device may be compressed to a second diameter (e.g., between 2-7 mm or 2-5 mm) in a compressed configuration. The length of an intravascular medical device in a compressed configuration may be between 5-40 mm, 6-30 mm, 7-30 mm, 8-25 mm, or about 8-12 mm. Furthermore, as used herein with respect to an intravascular device, an expanded configuration may refer to the form of the intravascular medical device when deployed in the passageway or pre-incised hole, slit, or puncture. The intravascular medical device may be expanded to a first diameter in the expanded configuration, where the first diameter is larger than the second diameter of the compressed configuration.

As shown in FIG. 4 in step 41*a*, intravascular medical device 11 may be placed inside catheter 420 in a compressed configuration 410, where the intravascular medical device 11 may be compressed around or adjacent to guide wire 430. Furthermore, in the compressed configuration, the flow deflector may be configured to nest (e.g., be placed, at least partially, or enclosed) within the tubular shunt. In other embodiments of the compressed configuration, the flow deflector may be configured to run parallel and adjacent to the tubular shunt. Catheter 420 may be placed in the body of a patient, and catheter 420 may traverse through vasculature of the patient to reach a desired location of deployment.

As shown in step 41*b*, catheter 430 may be pulled back to cause expansion of the intravascular medical device 11 from its compressed configuration 410. As shown in step 41*c*, stabilizer 120 of intravascular medical device 11 may expand or unfold as catheter 420 continues to be pulled back. Step 41*d* shows examples of trigger wire mechanisms 440, 450. Trigger wire mechanisms 440, 450 may be used for selective expansion of flow deflecting portion 130 following the expansion of stabilizer 120 (which may include a flange portion) and tubular shunt 110. Upon ejection from catheter 420, trigger wire mechanism 440, 450 associated with flow deflector 130 may be pulled, releasing flow deflector 130 for further expansion.

As shown in step 41*e*, flow deflector 130 may include a catch for maintaining flow deflector 130 in at least a partially non-expanded configuration upon ejection from catheter 420. Flow deflector 130 may be configured to extend through catheter 420 in a first direction, and the trigger wire mechanism 440, 450 may be configured such that when pulled from the first direction, flow deflector 130 may expand towards a second direction (as shown in step 41*f*), opposite the first direction. When ejected (e.g., deployed, expanded) from the sheath, the tubular shunt 110 may be configured to expand into a tubular shape and the flow deflector 130 may be configured to expand into a bowed (e.g., curved, rounded, arched) form, as shown in step 41*f*.

Figure 5:
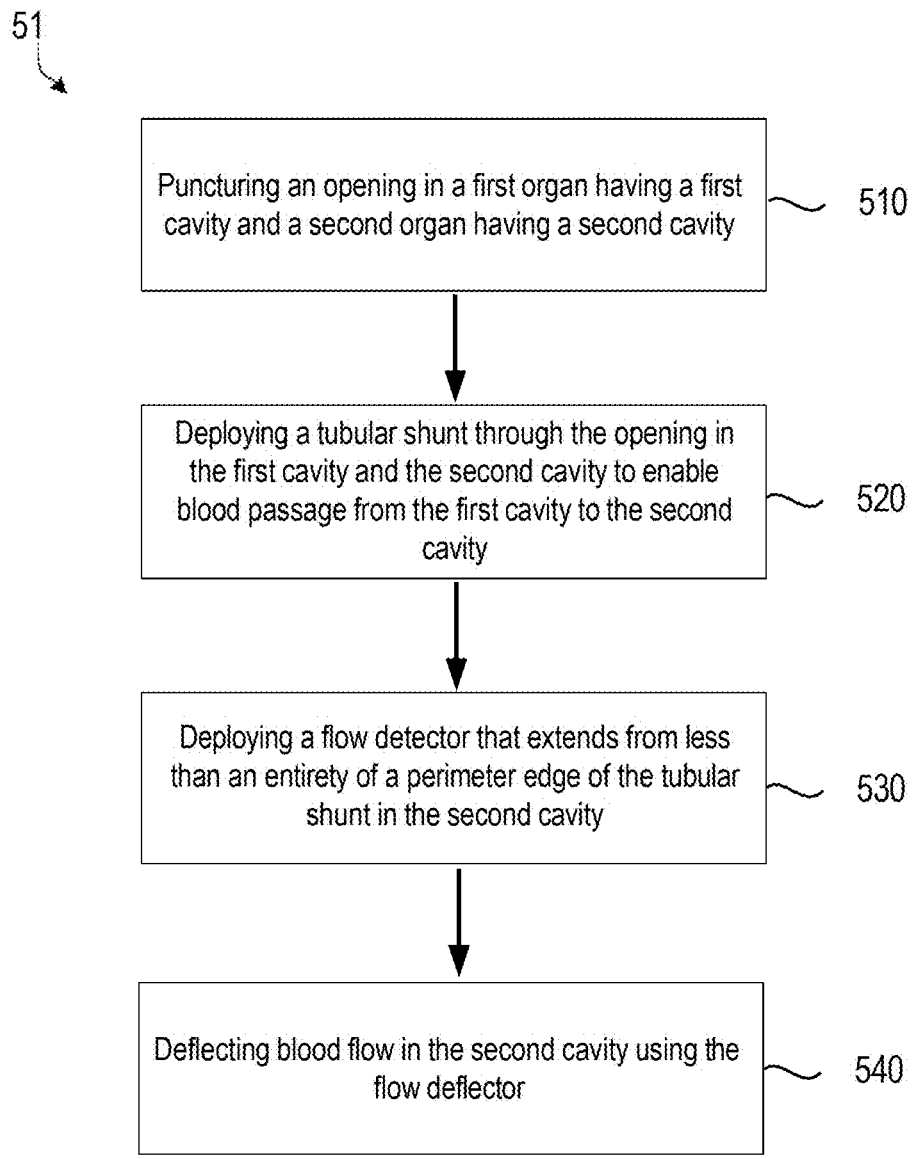
FIG. 5 is a flow chart of a process for shunting and deflecting blood flow between biological organs, consistent with some embodiments of the present disclosure.

FIG. 5 illustrates an example method 51 for shunting and deflecting blood flow between biological organs. As shown in step 510, disclosed embodiments may involve puncturing an opening in a first organ and a second organ. The first organ may have a first cavity and the second organ may have a second cavity. Puncturing may occur using a sharp tip that pierces walls of the first and second chamber prior to deployment of the shunt through the piercing. As a non-limiting example, the first organ may be a heart chamber and the second organ may be a blood vessel, and the flow deflector may be configured to cause at least partial retrograde blood flow in the blood vessel. As shown in step 520, disclosed embodiments may include deploying a tubular shunt through the opening in the first cavity and the second cavity to enable blood passage from the first cavity to the second cavity. Furthermore, as shown in step 530, some embodiments may include deploying a flow deflector that extends from less than an entirety of a perimeter edge of the tubular shunt in the second cavity. In some embodiments, and as shown in step 540, disclosed embodiments may further include deflecting blood flow in the second using the flow deflector.

Figure 6:
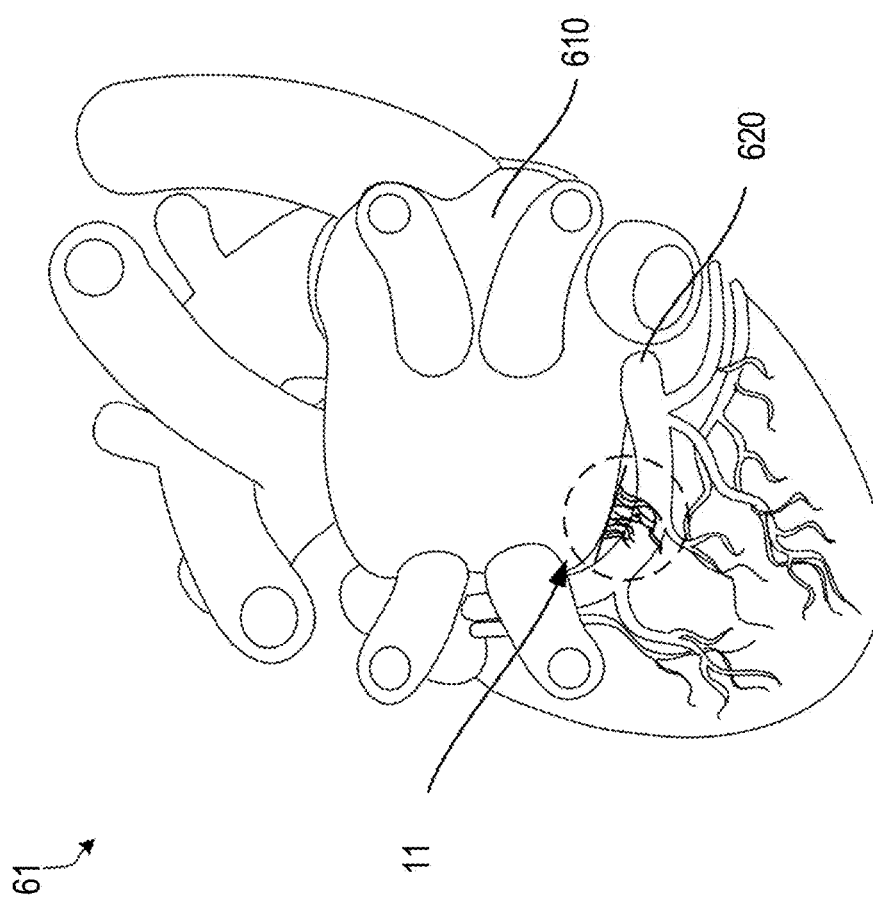
FIG. 6 illustrates an example placement of an intravascular medical device between biological organs in a heart, consistent with some embodiments of the present disclosure.

FIG. 6 illustrates an example placement of intravascular medical device 11 in a body of, for example, a patient. As shown in FIG. 6, intravascular medical device 11 may be placed, or deployed, between left atrium 620 and coronary sinus 610 in heart 61.

Some disclosed embodiments may involve systems and methods involving an expandable shunt and expandable flow deflector covered in a flexible material that at least partially restricts blood flow and deflects blood flow in a coronary sinus. Such a device may include a flexible hinge that is bendable to enable transverse axial positioning of the expandable shunt and the expandable flow deflector while maintaining an interconnection between the expandable shunt and the expandable flow deflector.

Some disclosed embodiments include an intravascular retrograde blood flow device. An intravascular retrograde blood flow device is a medical device configured to redirect or alter a natural direction of blood flow within a vessel, such that blood moves in a direction opposite to the natural flow direction in a blood vessel. For example, blood flowing in the opposite direction as the natural flow of blood in arteries or veins, including the coronary sinus, is considered retrograde blood flow. Consistent with disclosed embodiments, intravascular retrograde blood flow devices, such as the exemplary intravascular retrograde blood flow device 700 shown in FIG. 7, may be used in interventional procedures where oxygenated blood is introduced to a portion of a coronary sinus, and blood flow is reversed to revascularize coronary tissue deprived of oxygen rich blood.

Some disclosed embodiments include a catheter. A catheter may refer to any tube configured to be inserted into a body cavity, duct, or vessel. A catheter may also refer to any elongate structure that is capable of being fed, threaded, advanced, pushed, pulled, or snaked into or along a lumen of a tubular structure. Thus, a catheter may have sufficient resilience in axial tension to accommodate axial forces such as pushing and pulling. The catheter may be made of latex, silicone, Teflon, PVC, vinyl, red rubber, or any other suitable biocompatible material. The catheter may be sized to retain expandable structures therein for intravascular delivery to a desired location, as discussed further herein.

Some disclosed embodiments include an expandable shunt compressed within the catheter and configured to bridge an opening between a first cavity of a first organ and a second cavity of a second organ. A shunt refers to any device, structure, or component configured to maintain an opening whether temporarily or permanently between a first cavity of a first organ and a second cavity of a second organ such that blood may flow through to redirect flow of body fluids. For example, a shunt may include a central opening or passageway around a tubular body such that it may be deployed in a pre-incised hole to bridge two organs to enable biological fluid, such as blood to travel across the bridge. The expandable shunt portion may have a central opening or a passageway between a first organ (e.g., a heart chamber such as the left atrium or ventricle) and a second adjacent organ (e.g., blood vessel such as a vein including the coronary sinus). An expandable shunt refers to a shunt that is extendable, protractible, stretchable, flexible, malleable, pliable, springy, yielding, moldable, or otherwise able to be made larger or more extensive. An expandable shunt may be made of a metal such as stainless steel or nitinol, or a polymer material. An expandable shunt may be configured with antimicrobial, anti-coagulating, and/or anti-scarring properties. The expandable shunt may be delivered to a cavity, vessel, opening, or passageway in a compressed state and then expand radially to its full size once it is in place or once it is at a desired location. In some embodiments the expandable shunt may be configured to monitor and regulate the rate of blood flow there through. One form of an expandable shunt 702 may include a mesh-like or strutted structure having a series of struts or wire segments that are connected to form a tubular frame. The struts may be arranged in various patterns. For example, expandable shunt 702 may be composed of a series of connected curved struts arranged in a tubular configuration. The struts of expandable shunt 702 may be flexible, allowing the shunt to conform to the curvature of a cavity, vessel, opening, or passageway while maintaining its structure. Compression of the shunt within a catheter offers a minimally invasive approach to delivering and bridging an opening between a first cavity of a first organ and a second cavity of a second organ, reducing a risk of complications associated with more invasive surgical procedures. That is, a compressed expandable shunt can be intravascularly delivered to a cavity, vessel, opening, or passageway, and then expanded to provide the necessary bridging, while minimizing the trauma and discomfort associated with traditional surgical techniques.

A cavity of an organ may refer to any hollow space within an organ or structure of the body. In one example, the organ may be a left or right heart atrium and the cavity may be an associated left or right atrial chamber. As another example, the organ may be a coronary sinus and the cavity may be a lumen of the coronary sinus. An opening may refer to an aperture, crevice, cut, orifice, perforation, recess, slot, gap, slit, hole, or any other space that allows access to a cavity. The opening may be preexisting or may be formed as part of a shunting procedure. For example, the opening may be an aperture formed between the left atrium and the coronary sinus. In some examples, the opening may be tubular, either as the result of a tubular incision or as the result of the stretching of a non-tubular incision to accommodate a tubular shunt. An opening between a first cavity of a first organ and a second cavity of a second organ may be bridged by a shunt inserted into an aperture, cut, orifice, hole, or any other perforation formed between the first cavity and the second cavity. For example, the expandable shunt 702 may scaffold an opening between a first cavity of a first organ and a second cavity of a second organ maintaining a bridge between the first cavity and the second cavity.

Some disclosed embodiments include an expandable flow deflector compressed within the catheter and configured to deflect flow in the second cavity. As discussed herein, a flow deflector includes a structure that when deployed at a prescribed location, deflects, diverts, occludes, blocks, obstructs, slows, or inhibits fluid flow. For example, the flow deflector 704 of an intravascular retrograde flow device 700 may be configured, upon expansion, to deflect blood channeled from a heart chamber, such as the left atrium, into the coronary sinus via the shunt. The channeled flow, rich in oxygen, is deflected in a retrograde manner to enable heart tissue otherwise deprived of sufficient oxygen to receive the oxygenated blood. The flow deflector is expandable in that it has a first compressed orientation when within the catheter and assumes a second expanded configuration after release from the catheter. In some instances, as described herein release from the catheter alone enables flow deflector expansion, and in other instances at least some of the expansion occurs following a subsequent triggering action. The flow deflector may be made of a metal such as stainless steel or nitinol, or a polymer material. The expandable flow deflector may be inserted into a cavity, vessel, opening, or passageway in a compressed state and then expand to its full size once it is in place or once it is at a desired location. As with the shunt, the expandable flow deflector 704 may be made of a mesh-like or strutted structure having a series of wire segments or struts that are connected to form a frame. The struts may be arranged in various patterns and may be flexible, allowing the flow deflector to conform to the curvature of a cavity, vessel, opening, or passageway while maintaining its structure. The expandable flow deflector 704 may have struts arranged in the same manner as expandable shunt 702 or another pattern. The struts or wires of expandable flow deflector 704 may also be interconnected with the struts or wires of expandable shunt 702 as part of a single frame structure. The expandable flow deflector's compression within the catheter offers a minimally invasive approach to deflecting flow in the second cavity, reducing the risk of complications associated with more invasive approaches to implantation. That is, the compressed expandable flow deflector can be easily inserted into a cavity, vessel, opening, or passageway, and then expanded to provide the necessary flow deflection, while minimizing the trauma and discomfort associated with traditional surgical techniques.

Some disclosed embodiments include a flexible hinge interconnecting the expandable shunt and the expandable flow deflector, wherein the flexible hinge is configured to bend such that when the expandable shunt is positioned along a first axis of the opening and the expandable flow deflector is positioned along a second axis transverse to the first axis within the second cavity, the flexible hinge is bendable to enable transverse axial positioning of the expandable shunt and the expandable flow deflector while maintaining an interconnection between the expandable shunt and the expandable flow deflector. A flexible hinge refers to any structure or joint that allows for movement between two components or structures while maintaining a certain degree of flexibility. The flexible hinge interconnects the expandable shunt and the expandable flow deflector by extending between and being attached to the two components. Typically, the flexible hinge interconnects the expandable shunt frame and the expandable flow deflector frame by extending between and being attached to the two components. A flexible hinge may include two sides that are connected by an axis, articulation, elbow, hook, pin, joint, juncture, link, spring, swivel, or any other structure which allows for rotation or bending between the two sides. In one example, the flexible hinge is a bendable connection, such as a wire, that extends between and connects the expandable shunt and the expandable flow deflector. A flexible hinge is desirable to allow for a range of motion, while allowing for bending and flexing without breaking. A flexible hinge may also be a section of the intravascular retrograde blood flow device that is designed to bend, flex, or rotate, allowing the intravascular retrograde blood flow device to conform to the natural curves and bends of blood vessels or other structures within the body. The flexible hinge may be made of a flexible biocompatible material, such as wire, flexible metal struts, silicone, polymer, fabric, or any combination of the forgoing. The hinge may self-adjust to the anatomy or may be constructed to enable a surgeon to adjust the angle or position of the expandable flow deflector to ensure that fluid is directed to the correct location. Similarly, the flexible hinge may allow the expandable shunt or expandable flow deflector to be positioned at an optimal angle or position for maximum fluid flow control. For example, expandable flow deflector 704 and expandable shunt 702 may be connected by a flexible hinge 706 in the form of a wire.

Flexible hinge 706 may be connected to any part of the expandable flow deflector 704 and expandable shunt 702 to interconnect the two structures. Expandable flow deflector 704 is be configured to deflect blood for example, by including an expandable frame at least partially covered by a flexible flow-deflecting cover. In some embodiments, the expandable flow deflector is partially connected to a perimeter edge of the expandable shunt via the flexible hinge. A perimeter edge of the expandable shunt refers to an outermost boundary or border of the expandable shunt. For example, the expandable shunt may have a generally tubular body ending with a distal and proximal perimeter edge. In some embodiments, the expandable flow deflector is connected to a proximal perimeter edge of the expandable shunt via the flexible hinge. It may be desirable to connect the expandable flow deflector to the perimeter edge of the expandable shunt in order to prevent interference with fluid flow within other areas of the intravascular retrograde blood flow device, such as an inner lumen of the expandable shunt. In the example shown in FIG. 7, flexible hinge 706 contacts expandable flow deflector 704 and expandable shunt 702 at a proximal perimeter edge 720. In other examples, flexible hinge 706 may be connected to expandable flow deflector 704 or expandable shunt 702 at another location, such as a wall of expandable flow deflector 704 or expandable shunt 702.

Bending of the flexible hinge may refer to any arching, bowing, curving, twisting, veering, warping, or any other change in direction, angle, or orientation of the flexible hinge. In one example, the hinge bends in one direction or plane, like a piece of paper being flexed. This may be useful to change direction in or navigate tight spaces within the body, such as blood vessels. In another example, the hinge bends at an angle, allowing the expandable shunt and the expandable flow deflector to be positioned at a specific angle or orientation. Angular bending may be desirable for insertion at a particular angle to access a specific area of the body. In another example, the hinge rotates around an axis, which can be useful to navigate curved or winding pathways within the body. This type of bending can also be used to change the direction of the intravascular retrograde blood flow device without having to remove it and reposition it. In another example, the hinge may implement a combination of these bending modes to provide greater flexibility and maneuverability. For example, a flexible hinge may be configured to bend at an angle and also twist around an axis, providing both directional control and the ability to navigate winding pathways.

Figure 7:
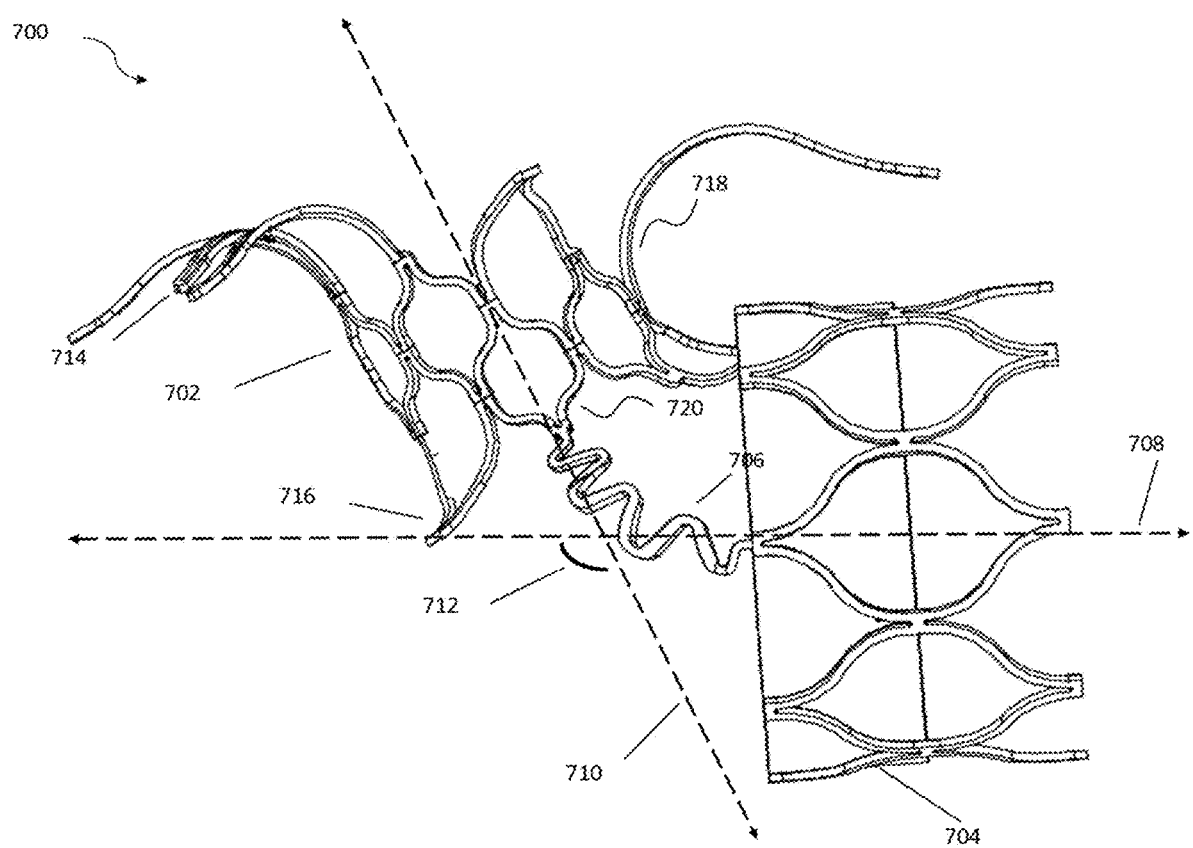
FIG. 7 is a side view of an exemplary expandable frame with a drum-like flow deflector frame, consistent with some embodiments of the present disclosure.

In some embodiments, the flexible hinge includes a tether. A tether refers to any device or structure that interconnects the shunt and flow deflector but that limits or restricts a longitudinal distance therebetween. For example, a tether may include a wire, spring, flexible material, strut, braid, thread, coil, chord, rope, string, fabric material, or any other structure for interconnecting the shunt and the flow deflector. FIG. 7 provides one example of a tether in the form of wire 706 connecting the expandable flow deflector 704 and expandable shunt 702. Tether 706 may be configured to secure and limit the migration of the expandable shunt or the expandable flow deflector within a cavity or passageway. In some examples, the tether 706 may include a wire, such as a metal linkage between the expandable shunt and the expandable flow deflector.

In some embodiments, the tether has an undulating shape. An undulating shape refers to a shape that resembles a wave, zig-zag or any other pattern that rises and falls. By way of one example, tether 706 in FIG. 7 has an undulating shape. An undulating shape of the tether 706 allows it to provide a secure and flexible connection between the expandable flow deflector 704 and expandable shunt 702. The curved shape of the tether 706 provides a natural flexibility that allows it to bend and adjust to a patient's anatomy and/or the movement of a heart chamber or blood vessel during heart pumping, while still maintaining a secure connection. An undulating shape of the tether 706 can also help to reduce the risk of damage to a heart chamber, blood vessel, or surrounding tissues by distributing the stress and pressure of the intravascular device 700 more evenly.

Figure 11:
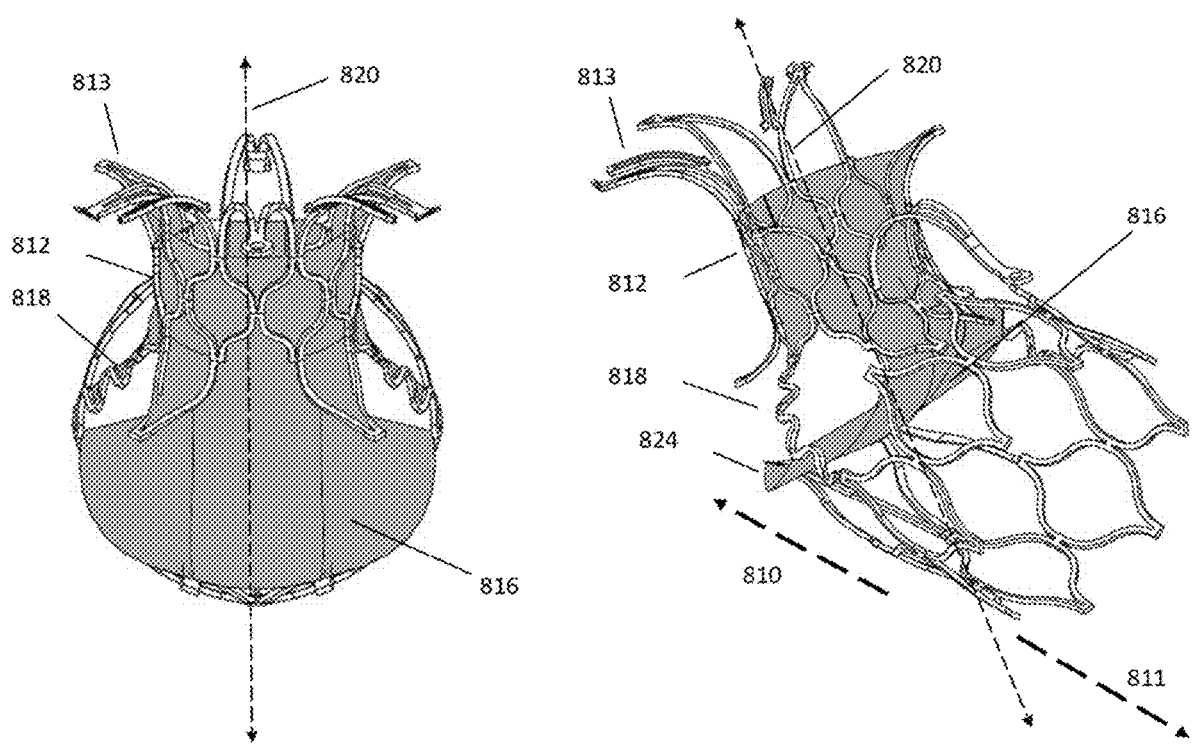
FIG. 11 illustrates additional views of the expandable frame of FIG. 8B, in accordance with some embodiments of this disclosure.

FIG. 8 shows other examples of a flexible hinge connecting an expandable shunt and an expandable flow deflector. In FIG. 8A, flexible hinge 808 is an undulating wire than connects a perimeter edge of expandable flow deflector 804 to expandable shunt 802. Similarly, in FIG. 8B, flexible hinge 818 is an undulating wire than connects a perimeter edge of expandable flow deflector 814 to expandable shunt 812. FIG. 11 illustrates additional views of the expandable frame of FIG. 8B. However, the flexible hinge may also be a part of an interconnecting structure between the expandable shunt and the expandable flow deflector. For example, FIG. 8C shows an expandable shunt 822 connected to an expandable flow deflector 824 via a flexible hinge 828. In this example, hinge 828 may be an extension of expandable shunt 822 and expandable flow deflector 824. Alternatively, hinge 828 may be an interconnection between the expandable shunt 822 and expandable flow deflector 824, so long as relative flexure between the two components is permitted. Hinge 828 may also be an interconnection between the cover 826 that extends over the expandable shunt 822 and expandable flow deflector frame 824. FIG. 8D shows another example of an expandable shunt 832 and expandable flow deflector frame 834 connected at a flexible hinge 838 formed by a fabric cover 836 attached to expandable flow deflector frame 834 and expandable shunt 832.

In some embodiments, the one or more flexible hinges include two flexible hinges extending from opposing sides of the shunt circumference. The circumference in this context relates to a circumference of tubular shunt located on the proximal side of the tube. It may be desirable to include two flexible hinges extending from opposing sides of the shunt circumference to add more structural stability to the connection between the expandable shunt and the expandable flow deflector when blood flow is particularly strong. Furthermore, including two flexible hinges on opposing sides may aid in distributing pressure more evenly. In addition, the positioning of two opposing hinges located at two ends of a diameter of the proximal circumference promotes minimal interference to the retrograde blood flow and possible additional stabilization against the wall. In some examples, the flexible hinges can include three or more flexible hinges extending from a perimeter edge of the expandable shunt. This may be desirable to add further structural support to the connection between the expandable shunt and the expandable flow deflector. The hinges may all share the same or similar structures, or may have differing structures, depending on desired design.

A first axis of the opening refers to a direction of a passageway that generally extends between two cavities. The passageway, and hence the axis, may be generally straight or may be curved. In other words, in the context used herein, the axis need not be straight if it follows a curved rather than a straight passageway. For example, a first axis 710 runs along the passageway that extends between two cavities bridged by expandable shunt 702. First axis 710 follows the path of the passageway in which expandable shunt 702 sits, so it may be straight as shown in FIG. 7, or curved. Similarly, a second axis within the second cavity refers to a pathway that generally extends in a direction of the second cavity (e.g., in some disclosed embodiments, a coronary sinus.) The pathway through the second cavity may be generally straight or curved in an area of interest, and hence the second axis, may likewise be generally straight or may be curved. In some examples, the second axis may follow the contours of the walls of the second cavity. For example, a second axis 708 runs along a longitudinal direction of the second cavity into which expandable flow deflector 704 expands. Second axis 708 follows the longitudinal direction of the second cavity into which expandable flow deflector 704 expands, so it may be straight as shown in FIG. 7, or curved. Additionally, the first axis 710 and second axis 708 may be dynamic, meaning that each axis may change as the passageway or second cavity change in shape, including bodily movement such as venous, arterial, or heart chamber expansion and contraction.

The second axis may be transverse to the first axis, meaning that the first axis and the second axis cross each other (i.e., they are non-parallel such that they intersect each other.) The angle of intersection may be at least, in part, a function of an individual's anatomy and an orientation of the passageway with respect to the first and second cavities. In some examples, an incident angle between the transverse first and second axes at a location of intersection may be between 90 and 160 degrees, 100 and 120 degrees, 90 and 30 degrees, or even 20 and 160 degrees. Again, the angle can be greater or lesser (even acute) depending on the specific implementation and anatomy at issue.

By way of example with reference to FIG. 7, a first axis 712 is transverse to a second axis 708. The angle of intersection 712 is the location where the two axes are transverse to each other. As illustrated, angle 712 is orthogonal, but it could likewise be obtuse or even acute, depending on specifics of the case.

When the expandable shunt and the expandable flow deflector are positioned such that their axes cross (regardless of the angle of intersection), the two components are said to assume an orientation with transverse axial positioning. By way of example, an interconnection between the expandable shunt 702 and the expandable flow deflector 704 is maintained when there is transverse axial positioning, meaning that the expandable shunt 702 and the expandable flow deflector 704 remain connected, such as by hinge 706, even when the two components have axes that cross each other (again, regardless of the crossing angle 712). The two components may remain connected in any one of many ways—such as through a tether, hinge, interconnection, scaffold, or other bendable, flexible, or rotatable connection between them. Such a structure thereby maintains the interconnection between the expandable shunt 702 and the expandable flow deflector 704.

In some embodiments, the expandable flow deflector includes an expandable frame covered by a flexible flow-deflecting cover, and wherein the expandable frame is configured to fixate, upon expansion, against a wall of the second cavity, such that the fixation aids in stabilizing the expandable shunt in the opening. An expandable frame refers to any shaped structure or component that is adjustable in size. The expandable frame may include a series of interconnected struts or wires that are capable of expanding to a predetermined size and shape when deployed within the second cavity, such as a blood vessel. The exact configuration of the expandable frame may vary depending on the specific design of the expandable flow deflector. In one example, the expandable frame includes a central hub or anchor point, from which a series of struts or wires extend radially outward. In some examples, the expandable frame includes a tubular series of struts or wires. In other examples, the expandable frame includes a tubular scaffold. In some examples, as the expandable frame expands, the struts or wires exert outward force against the vessel wall, creating a stable support structure that helps to anchor the flow deflector in place. In some examples, the expandable frame may be configured to expand to a predetermined diameter, length, or shape. In addition to providing a stable support structure, the expandable frame may also serve as a mechanism for adjusting the position of the expandable flow deflector within the blood vessel. For example, the expandable frame may include one or more struts or wires that extend from the expandable frame to the expandable shunt, serving as a flexible hinge interconnecting the expandable frame and the expandable shunt to allow for transverse axial positioning of the expandable shunt and the expandable flow deflector. Non-limiting examples of materials for the expandable frame may include a super elastic alloy, and/or a shape memory material, such as a shape memory alloy (SMA) such as a nickel-titanium alloy otherwise known as nitinol or NiTiCu (nickel titan copper), CuZn (copper zinc), CuZnAl (copper zinc aluminum) and/or CuAlNi (copper zinc nickel). Other suitable materials may include other metals, stainless steels, or polymers. The expandable frame may be further be coated and or textured to increase biocompatibility for improved blood flow and optimal engagement with tissue.

FIG. 7 illustrates an exemplary expanded configuration of a retrograde intravascular blood flow device 700. In the example of FIG. 7, an intravascular retrograde blood flow device 700 includes the frame of an expandable shunt 702 and the frame of an expandable flow deflector 704. The frames of the expandable shunt 702 and expandable flow deflector 704 are connected via a flexible hinge composed of a tether 706. The tether 706 is configured to bend such that when the expandable shunt 702 is positioned along a first axis 710 of the opening and the frame of the expandable flow deflector 704 is positioned along a second axis 708 transverse to the first axis 710 within the second cavity, the flexible hinge 706 is bendable to enable transverse axial positioning of the frames of the expandable shunt 702 and the expandable flow deflector 704 while maintaining an interconnection between the frames of the expandable shunt 702 and the expandable flow deflector 704. The second axis 708 is transverse to the first axis 710 at an angle 712. In this example, the angle 712 is greater than 90 degrees to allow for the expandable shunt 702 to accommodate to an angle and shape of the opening between the first cavity and the second cavity. The tether 706 in this example includes an undulating shape that provides a natural flexibility that allows it to bend and adjust to movement during the retrograde blood flow procedure, while still maintaining a secure connection between the expandable shunt 702 and expandable flow deflector 704.

A flexible flow-deflecting cover may extend over all or part of the frame. Such a cover may include any shield, housing, fabric, sheet, casing, coating, sheath, or other material. The cover may serve as a barrier for redirecting blood flow within a cavity, such as a blood vessel. The cover may have temporary or permanent limited permeability to fluid and specifically blood. In some examples, the cover is substantially impermeable to blood. The flexible flow-deflecting cover may provide a flexible and durable surface that can redirect blood flow while minimizing the risk of vessel damage or irritation. In some embodiments, the flexible flow-deflecting cover may be configured to promote endothelialization (e.g., promote growth factors such as transforming growth factor, fibroblast growth factor, epidermal growth factor). In some embodiments, the flexible flow-deflecting cover may be configured to inhibit or limit endothelialization. In some embodiments, the flexible flow-deflecting cover may be configured to inhibit or limit endothelialization and/or thrombosis. The flexible flow-deflecting cover may be made of a biocompatible material, such as silicone or a polymer blend. In some examples, the flexible flow-deflecting cover includes a series of flexible, overlapping panels or sheets that are capable of bending and flexing in response to changes in blood flow. In some examples, as blood flows through the vessel, the flexible panels of the flexible flow-deflecting cover may adjust and bend, directing the flow of blood away from one direction and towards another, such that retrograde blood flow is achieved. The flexible flow-deflecting cover, together with the frame, may be configured to self-expand, meaning that upon deployment within the vessel using a catheter or similar delivery system, the structure expands to the appropriate size and shape. Alternatively, the structure may be designed to be manually adjusted and secured in place using a series of clips or other mechanical fasteners. FIG. 8 shows examples of different configurations of a flexible flow-deflecting cover, such as a cylindrical cover 806, a concave cover 816, or a scoop-shaped cover 826.

Fixating the expandable frame, upon expansion, against a wall of the second cavity may ensure that it remains securely in place against the wall of the second cavity, providing stable support and preventing the intravascular retrograde blood flow device from moving or dislodging during use. The expandable frame may be fixated against a wall of a second cavity, such as a blood vessel, in various ways. In one embodiment, the expandable frame exerts a friction force against the wall of the second cavity, enabling stabilization through a friction fit. The frame may include prongs, protruding wires, protruding struts, or other contours that aid in retention through friction. In other examples, a series of hooks or barbs located on the expandable frame may be anchored against the vessel wall. These hooks or barbs may be configured to grip the vessel wall securely without causing damage, and may be adjusted or repositioned as needed to achieve the desired level of fixation. In some embodiments, wires, struts, hooks, barbs, prongs or other retention elements may be configured to be adjusted or tightened as needed to achieve the desired level of fixation, and/or may be released if the intravascular retrograde blood flow device needs to be repositioned or removed. In some examples, the expandable frame may be coated with a bio-adhesive material that helps to anchor it to the vessel wall. Stabilizing the expandable shunt in the opening refers to ensuring that the expandable shunt does not migrate out of the opening. The fixation of the expandable frame against a wall of the second cavity aids in stabilizing the expandable shunt in the opening because the expandable shunt is connected to the secured expandable flow deflector via the flexible hinge. Thus, once the expandable frame is fixated against a wall of the second cavity, the expandable shunt may be at least partially secured in place in the opening because the connecting hinge prevents the expandable shunt from migrating away from the opening. Stabilizing or fixating elements on the shunt itself may cooperate with the stabilization/fixation elements on the flow deflector to stabilize the retrograde flow deflection device.

Figure 8A:
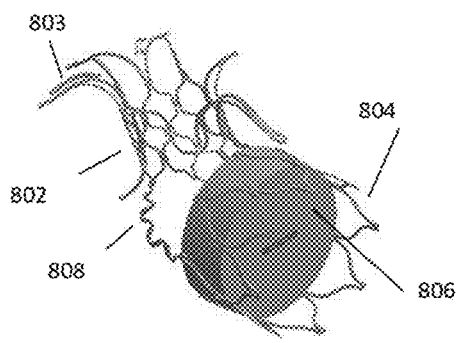
FIG. 8A is a perspective view of the expandable frame of FIG. 6.1 illustrating a drum-like covering with the drum-like flow deflector frame.

In some embodiments, in an expanded configuration, the expandable frame includes a cylindrical portion and the flow deflecting cover extends across the circular base of the cylindrical portion in a manner forming a planar flow deflecting surface. As used herein, the term cylindrical refers to a tubular shape generally in the shape of an associated passageway, regardless of whether the shape is a perfect cylinder in geometrical terms. Thus, a cylindrical portion may refer to a portion of the expandable frame that has a circular or oval cross-section along at least a portion of its length. In some examples, the cylindrical portion extends along an entire length of the expandable frame. In other examples, the cylindrical portion extends along only a part of a length of the expandable frame. The cylindrical portion of an expandable frame in an intravascular device may provide several benefits, including adaptability, anchoring, compression, and durability. The cylindrical portion of the expandable frame may be configured to be flexible and conformable to the shape of the vessel wall, allowing it to adapt to changes in vessel diameter, curvature, or irregularities especially relevant in vivo. This allows the device to be more effective in redirecting fluid flow, reducing the risk of complications and promoting better clinical outcomes. As previously discussed, the cylindrical portion of the expandable frame may be equipped with protruding elements that aid in anchoring against the vessel wall. These protrusions may reduce the risk of device migration or dislodgement and may improve the long-term efficacy of the device. The cylindrical portion of the expandable frame may be configured to be compressed to a smaller diameter, allowing the device to be delivered through the catheter. This minimizes the size of a surgical access site and reduces the risk of complications associated with larger incisions. A planar flow deflecting surface refers to a surface having a circular, oval, or otherwise rounded shape, for forming a structure in the cavity (e.g., blood vessel) against which blood flow is redirected. In some embodiments, the planar flow deflecting surface may be formed of a flexible material or fabric wrapped across at least an opening of a cylindrical frame. In other embodiments, the flexible material may cover the entire opening or a substantial portion of the inner surface of the cylindrical frame. Thus, at least one end of the planar flow deflecting surface may be formed as a cover that is stretched over cross-sectional end of the cylinder and secured along at least a portion of the length of the cylinder. The planar surface and cross-sectional positioning of the surface may be desirable for redirecting flow because it may form a closer seal to the vessel walls, acting as a plug. In some embodiments, there may be no seal or a partial seal, and some blood may be permitted to flow past the flow deflector, while other blood is deflected. FIG. 8A shows an example of an expandable frame including a cylindrical portion 804 and a flow deflecting cover 806 that extends over the cylindrical portion 804 in a manner forming a planar flow deflecting surface 806.

Figure 8B:
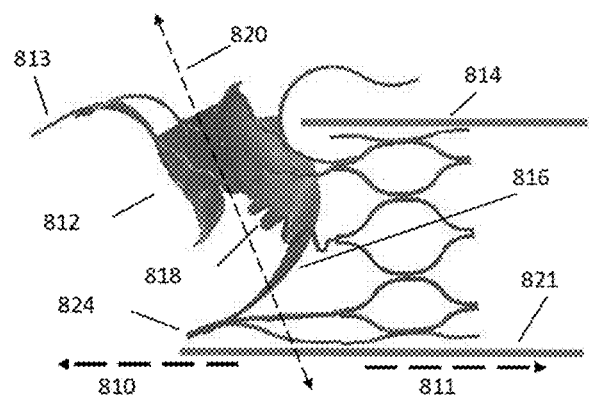
FIG. 8B is a side view of another expandable frame having a concave flow deflector covering consistent with some embodiments of the present disclosure.

In some embodiments, in an expanded configuration, the expandable frame includes a deflector support and the flow deflecting cover extends over the deflector support in a manner forming a concave flow deflecting surface. A deflector support refers to any component or group of components configured to provide structural integrity to a flow deflecting surface. The frame itself may have a concave curvature, or it may simply be configured to support a surface that is concave. The concavity, may be scooped, dished, cupped, dented, dimpled, dipped, hollow, incurvate, round, sunken or swooped. Such a concave surface may aid in directing fluid flow. In other examples, the deflector support may have one or more of a semicircle, quadrant, sector, segment, arc, or chord shape. In other examples, the deflector support may have one or more of a circular, oval, elliptical, parabolic, or hyperbolic shape. In some embodiments, the concave flow deflector surface may be smooth and continuous, with a gradually changing curvature that conforms to the shape of the vessel. In other embodiments, the flow deflector may not be concave, or may have differing degrees of concavity, depending on design considerations. The surface may also include additional features, such as raised or textured areas that create additional turbulence or eddies in the flow of blood. FIG. 8B shows an example of an expandable frame including a deflector support 814 with the flow deflecting cover 816 extending over the deflector support 814 in a manner forming a concave flow deflecting surface 816. The flow deflecting cover 816 may also extend over other portions of the intravascular blood flow device, such as the expandable shunt 812. The flow deflecting cover 816 may also be shaped to conform to the edges of the expandable shunt 812, deflector support 814, and the flexible hinge 818 connecting the expandable shunt 812 and deflector support 814.

A scoop-shaped flow deflecting surface may include a broad, shallow opening at one end that gradually tapers down to a narrower point at the other end. In some embodiments, the concave portion may include a curved or arched frame, often made of metal or other supportive materials. The frame may be configured to be bowed, meaning that it is intentionally curved or bent outward, away from the center of the flow deflector. In some cases, the frame may have ribs, struts, or wires that are arched or which cooperate to form an arch. The arch may be shallow or extreme. A shallow curve may provide only a slight bowing effect, while a deep arch may have a more pronounced curvature with a greater degree of bowing. The bowed shape of the frame may provide additional strength and stability, as it is able to distribute the load and stresses of the structure more evenly. In some embodiments, the flow deflector forms a crescent shape extending from the shunt portion. In some embodiments, a trough of the scoop is circular in shape in its cross-sectional profile. The scoop shape may be sized to cover a full cross section of the cavity or vein, such as a coronary sinus.

Figure 8C:
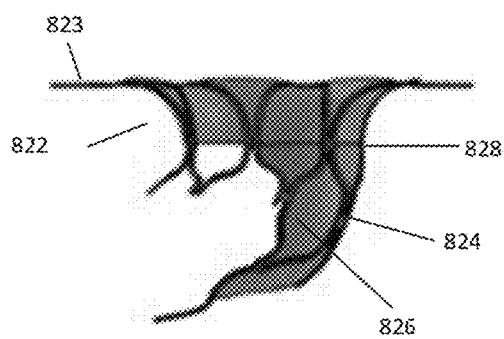
FIG. 8C is a side view of an alternative expandable frame with an integrated shunt portion and flow deflector portion, consistent with some embodiments of the present disclosure.

FIG. 8C shows an example of an expandable frame including a concave portion 824, with the flow-deflecting cover 826 extending over the concave portion 824 in a manner forming a scoop-shaped flow deflecting surface 826. In this example, flow deflecting cover 816 may also extend over other portions of the intravascular blood flow device, such as the expandable shunt 822.

In some embodiments, in an expanded configuration, the expandable frame includes an extension extending from the expandable frame beyond an intersection of the first axis with a wall of the second cavity, and wherein the extension engages the wall of the second cavity. An extension refers to a portion that extends beyond an intersection location. The extension may include an appendage, arm, branch, distension, elongation, protraction, wing, lip, or any other portion of the expandable frame that extends beyond the axis intersection location. It may be desirable to provide an extension extending from the expandable frame beyond an intersection of the first axis with a wall of the second cavity to ensure that the normal flow of blood is redirected away from the opening and in a retrograde direction in the second cavity. FIG. 8B illustrates an example of extension 824 extending beyond the intersection of the first axis 820 with a wall 821 of the second cavity.

In some embodiments, the extension extends in a direction contrary to a normal direction of fluid flow. A direction contrary to a normal direction of fluid flow refers to any direction that is opposite, transverse, reverse, or otherwise unlike the normal direction of fluid flow. It may be desirable to provide the extension extending in a direction contrary to a normal direction of fluid flow to guide the fluid in a retrograde direction.

In some embodiments, the flexible flow-deflecting cover is substantially impermeable to blood. As used herein, the term "substantially impermeable to blood" refers to any material or device that is capable of preventing the passage of blood therethrough. Substantially impermeability to blood enables the cover to deflect blood as opposed to permitting blood passage. Impermeability may also reduce complications that may arise from an absorptive material within the bloodstream. The flexible flow-deflecting cover may be used in some embodiments disclosed herein to prevent the normal flow of blood from the left atrium to the right atrium via the coronary sinus by blocking the passage of blood through the cover that is substantially impermeable to blood.

In some embodiments, the flexible flow-deflecting cover includes a tool passage configured to minimize blood flow therethrough. A tool passage may refer to a channel or opening in the flexible flow-deflecting cover through which instruments or tools can be inserted and used to manipulate the intravascular retrograde blood flow device or to perform procedures within a blood vessel or bodily cavity. The tool passage may be configured to accommodate the size and shape of the instruments that will be used, such as guidewires and balloons. The width of the tool passage may be sized to allow for easy insertion and removal of the instrument, but not so wide as to compromise the integrity of the flexible flow-deflecting cover or increases the risk of blood leakage in the normal direction. For example, to minimize normal flow, the tool passage may be configured with a covering flap. Additionally, or alternatively, the tool passage may be a slit or multiple slits in a multi-layer cover such that the individual cover layers can be mechanically manipulated to allows passage but provide a substantially impermeable blood barrier in its natural state. The tool passage may be positioned in, centered on, or arranged in a non-central location of a planar surface, concavity, or other surface of the flexible flow-deflecting cover. Coatings or materials may form part of the covering to resist bacterial growth and other microorganisms on or around the tool passage.

Figure 10:
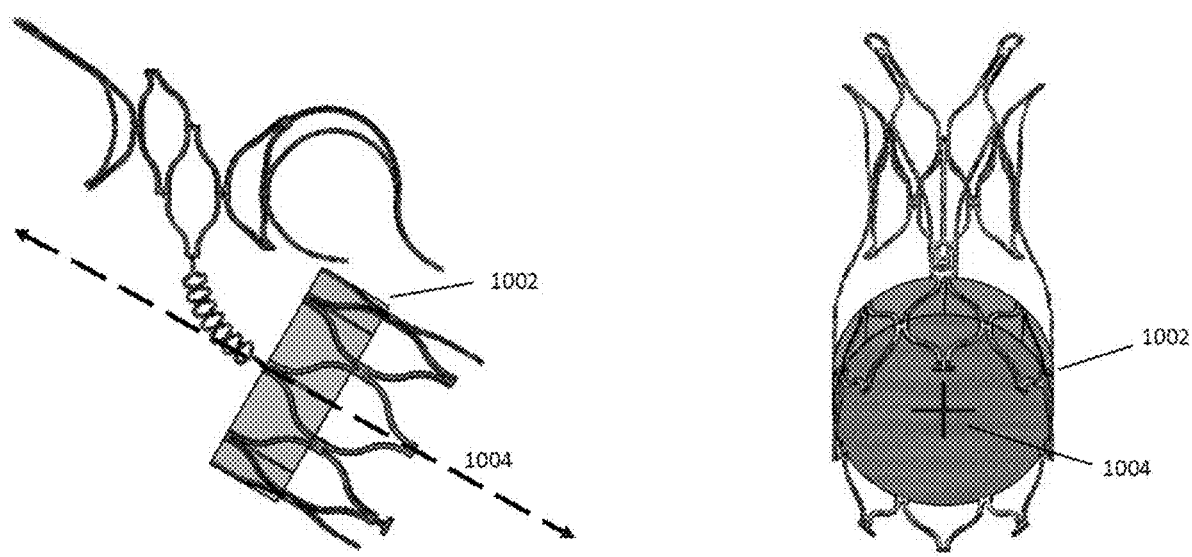
FIG. 10 illustrates different views of an example of a flow deflecting portion including a tool passage, in accordance with some embodiments of this disclosure.

FIG. 10 illustrates different views of an example of a flow deflector 1002 including a tool passage 1004, in accordance with some embodiments of this disclosure. Examples of a tool passage, such as tool passage 1004, include: a one way valve, a duck bill valve, staggered shutters or a two or more layered material with each individual layer having a slot positioned 30-150 or about 90 degrees from another layer, a plug, or another suitable seal. The example shown in FIG. 10 illustrates a tool passage 1004 made up of a two or more layered material with each individual layer having a slot positioned 90 degrees from the other layer. Other approaches to a tool passage are also envisioned for use with the disclosed embodiments, such as two partially overlapping layers configured to permit manipulation such that they do not overlap as a location to pass a tool therethrough. The cover may be a biocompatible, resilient, flexible, and substantially a liquid-tight cover. Examples include but are not limited to: a biocompatible material, mesh-like material, a cloth-like material, a fabric, a plastic or silicone, a biological material, a collagen, or biological tissue. In some examples, the cover may be configured to trap, block, or catch material that is at least about 5, 10, 15, 20, 25, 30, 35, 40, 90, and 100 micrometers in length or diameter. Optionally, the cover may be elastic or have a degree of elasticity. The cover may be bound to the scaffold by, for example, one or more stitches, welding, glue, a coating, or soldering. In other examples, the flow deflector may include a flexible distal edge for removal under the flow deflector, such that removal of the tool minimally interferes with flow deflection. For example, the distal edge 1410 of flow deflector 1404 in FIGS. 14A and 14B is flexible and contains an open tool passage therein to allow for the removal of a tool with minimal interference to flow deflection.

In some embodiments, the flexible flow-deflecting cover includes at least one of a mesh, a fabric, a polymer coating, or a synthetic material coating. A coating may refer to a layer of material that is applied to or that forms part of the surface of the flexible flow-deflecting frame or cover to deflect blood or provide additional structural support and protection. For example, the flow deflecting frame may be coated by multiple layers of a sprayed polymer forming a coating having a blood restricted permeability. A mesh coating may be made up of a network of interlocking fibers or filaments that form a tight, strong, and flexible web. The mesh coating may be made of biocompatible materials such as polyurethane, silicone, or polyethylene terephthalate (PET). These materials are flexible and durable, making them ideal for use in intravascular devices that need to be able to withstand the rigors of blood flow and movement within the body. The mesh coating may be applied to a surface of the flexible flow-deflecting cover using a variety of techniques such as spraying, dip coating, sewing, welding or electrospinning. A fabric coating may refer to a cloth or textile configured to extend over or encase a surface of the flexible flow-deflecting cover. The fabric coating may be made of biocompatible materials such as nylon, polyester, or polyurethane, which are flexible, durable, and safe for use in the body. The fabric coating may be applied to the surface of the intravascular device using a variety of techniques such as dip coating, spray coating, or laminating. In some examples, the fabric coating may include micropores or surface treatments to improve the adhesion of drugs or coatings. The fabric cover may also be radiopaque, making it easier to visualize the position of the device during imaging procedures. A polymer coating may refer to a layer of polymer material applied to a surface of the flexible flow-deflecting cover. The polymer coating may be applied using a technique such as spraying, dipping, or spin coating, and may be made from a variety of different polymers, including silicone, polyurethane, or fluoropolymers. A synthetic material coating may refer to a layer of man-made material applied to a surface of the flexible flow-deflecting cover. Various types of synthetic material coatings may be used with the embodiments disclosed herein. Polyurethane coatings may be used to improve the lubricity of the flexible flow-deflecting cover. They are flexible, durable, and can provide a smooth surface for easy insertion into the body. Polyurethane coatings can also be used to add a drug delivery capability to the flexible flow-deflecting cover. Silicone coatings may be used to enhance the biocompatibility of the flexible flow-deflecting cover.

They are soft, hydrophobic, and can provide a non-stick surface. Silicone coatings may also be used to reduce friction during insertion. Hydrophilic coatings may be used to provide lubricity to the flexible flow-deflecting cover. They are designed to attract water, which reduces friction and facilitates smooth insertion into the body. Hydrophilic coatings may be made from various materials, including polymers and ceramics. Polytetrafluoroethylene (PTFE) coatings may be used in the flexible flow-deflecting cover to prevent blood clotting and promote healing. They are hydrophobic and provide a non-stick surface that reduces the risk of thrombosis. PTFE coatings may also be used to provide lubricity to the device. Bioresorbable polymer coatings may be used in the flexible flow-deflecting cover to promote healing and reduce the risk of restenosis. They are designed to gradually dissolve in the body over time, allowing the flexible flow-deflecting cover to be absorbed without leaving any permanent residue.

Some embodiments may also include a first stabilizer extending from a distal end of the expandable shunt, opposite the hinge, configured to engage with an inner wall of the first cavity to maintain the expandable shunt in the opening. A stabilizer refers to any structure or element that resists migration. For example, a stabilizer may be designed to engage with the inner wall of a cavity or opening to help secure the shunt in place. In some examples, the first stabilizer may include a flexible or semi-rigid ring on the expandable shunt. The ring may be made of various materials, such as silicone or a polymer, and may be configured to conform to the shape of the cavity in which the shunt is placed. Additionally or alternatively, the first stabilizer may include one or more flexible arms or projections that extend outward and engage with the inner wall of the cavity. These arms or projections may act as a lip that can help anchor the shunt in place, preventing it from moving or shifting due to changes in pressure or other factors. The expandable wall of the shunt itself may act as a stabilizer by exerting a frictional force against the passageway in which it is located. A locking mechanism may be used to secure the shunt in place once it has been positioned correctly. For example, the stabilizer may be a ring that locks into a given circumference once it expands to that circumference. As another example, the stabilizer may include arms that seal against the inner wall of the cavity to lock the shunt into place. In this example, the arms may include a cover, such as an extension of the flexible flow-deflecting cover, to create a liquid seal against the inner wall of the cavity.

Some embodiments, a second stabilizer includes a flange region extending from a proximal end of the expandable shunt into the second cavity configured to engage with an inner wall of the second cavity to maintain the expandable shunt in the opening. A flange region refers to a protruded ridge, lip, or rim, or edge that extends outward from the base. The flange my completely or partially circumscribe the outer periphery of the shunt, or it may include a series of flange portions that work together for stabilization purposes. A flange region may be formed of the same material as the shunt (e.g., an expandable metal) and may include a tissue engaging cover. Alternatively, the flange region may be formed from another flexible or semi-rigid material, such as silicone or a polymer. A base of the flange region may be positioned against the inner wall of the second cavity, while the projecting rim or edge extends into the second cavity to hold the medical device in place.

In some embodiments, at least one of the first stabilizer and the second stabilizer includes a plurality of prongs having inequivalent lengths. A plurality of prongs may refer to any slender or pointed extensions or projecting parts that extend from a body or base of the shunt or deflector. The prongs may be made of the same material as the frame of the shunt or the deflector, and/or may include a flexible material such as silicone or polyurethane. In use, the prongs may press against the inner wall of a heart chamber or blood vessel to stabilize the device, while limiting tissue damage. The prongs of the first or second stabilizer may aid in redistributing pressure and dampening any unwanted vibrations or movements, resulting in a smoother and more stable fixation of the intravascular retrograde blood flow device. The prongs may have inequivalent lengths meaning that at least one of the prongs is longer than another. The inequivalent lengths may aid in stabilization. For example, the prongs on one side of the stabilizer may be longer than the prongs on the other side of the stabilizer to account for a greater need for stabilization on one side. Or, prongs can alternate in length to more evenly distribute pressure. As another example, the prongs may have adjustable lengths that may be modified once introduced in the cavity or vessel to conform to the geometry of that cavity or vessel.

In some embodiments, the first stabilizer includes a plurality of outwardly extending prongs, each prong having a distal end curved in a direction facing an inner wall of the first cavity. A plurality of outwardly extending prongs refers to slender or pointed extensions or projecting parts that extend away from a central lumen of the expandable shunt and into the first cavity. Each prong may have a distal end curved in a direction facing an inner wall of the first cavity such that the tip of the prong extends away from the cavity wall, to minimize risk of wall puncture.

As an example, the expandable shunt 702 in FIG. 7 includes a first stabilizer 714 extending from a distal end 718 of the expandable shunt 702, opposite the hinge 706, for engaging with an inner wall of the first cavity to maintain the expandable shunt 702 in the opening between the first cavity and the second cavity. The expandable shunt 702 in this example includes a second stabilizer 716 comprising a flange region extending from a proximal end 720 of the expandable shunt 702 into the second cavity for engaging with an inner wall of the second cavity to maintain the expandable shunt 702 in the opening between the first cavity and the second cavity.

Figure 8D:
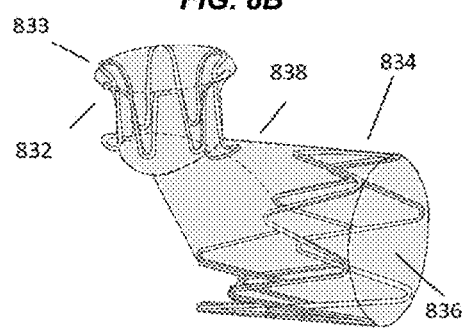
FIG. 8D is a side view of another alternative expandable frame with an integrated shunt portion and flow deflector portion, consistent with some embodiments of the present disclosure.

As another example, the expandable shunt 812 in FIG. 8A includes a first stabilizer 803 extending from a distal end of the expandable shunt 802, opposite the hinge 808, for engaging with an inner wall of the first cavity to maintain the expandable shunt 802 in the opening between the first cavity and the second cavity. FIG. 8B shows another example of an expandable shunt 812 including a first stabilizer 813 including a plurality of outward-curved prongs extending from a distal end of the expandable shunt 812, opposite the hinge 818, for engaging with an inner wall of the first cavity to maintain the expandable shunt 812 in the opening between the first cavity and the second cavity. FIG. 8B shows another example of an expandable shunt 812 including a first stabilizer 813 including a plurality of outward-curved prongs extending from a distal end of the expandable shunt 812, opposite the hinge 818, for engaging with an inner wall of the first cavity to maintain the expandable shunt 812 in the opening between the first cavity and the second cavity. FIG. 8C shows another example of an expandable shunt 822 including a first stabilizer 823 including a plurality of outward-facing prongs extending from a distal end of the expandable shunt 822, opposite the hinge 828, for engaging with an inner wall of the first cavity to maintain the expandable shunt 822 in the opening between the first cavity and the second cavity. FIG. 8D shows another example of an expandable shunt 832 including a first stabilizer 833 including a plurality of curved outward-facing projections with the flow deflecting cover 836 extending over the projections extending from a distal end of the expandable shunt 832, opposite the hinge 838, for engaging with an inner wall of the first cavity to maintain the expandable shunt 832 in the opening between the first cavity and the second cavity. In some embodiments, tubular shunt 802, 812, 822 or 832 may include orientation markers to facilitate rotational orientation around a central opening for relevant positioning of flow deflector 804, 814, 824 or 834. The orientation markers may be configured to allow for control of rotational orientation of tubular shunt 802, 812, 822 or 832 around the central opening. Orientation markers may include, for example, tantalum markers or a particular structural design at specific locations.

In some embodiments, the expandable shunt includes a tubular scaffold, and wherein the flexible flow-deflecting cover extends over the tubular scaffold. As tubular scaffold refers to a structure or matrix that maintains an orifice. The tubular scaffold may be provided to reinforce or support the structure that forms the shape and framework of the expandable shunt. Any biocompatible material, such as nitinol or stainless steel that can be compressed or collapsed to a smaller size for insertion into the body may be used for the tubular scaffold. Once the expandable shunt is in position in the opening, the tubular scaffold may then expand or inflated to its full size to create a passage for blood or other fluids to flow through. The tubular scaffold may be made up of a series of interconnected struts or wires that form a tubular shape. In some examples, the tubular scaffold may be covered with a thin membrane or graft material that helps to seal the device and prevent blood from leaking out around edges. This covering may also provide additional support to the opening or other tubular structure, helping to maintain its shape and prevent collapse or blockages.

It may be desirable for the flexible flow-deflecting cover to extend over the tubular scaffold to provide additional structural integrity to the connection between the expandable shunt and the expandable flow deflector. It may also be desirable for the flexible flow-deflecting cover to extend over the tubular scaffold to reinforce the tubular shape of the scaffold. In some examples, the flexible flow-deflecting cover may extend over the entirety of the tubular scaffold. In other examples, the flexible flow-deflecting cover may extend over only a portion of the tubular scaffold.

In some embodiments, the flexible flow-deflecting cover is further configured to permit at least some non-retrograde blood flow in the second cavity. It may be desirable to permit at least some non-retrograde blood flow in the second cavity to ensure perfusion in areas of normal blood flow while also providing perfusion in areas of the retrograde blood flow. In some examples, the flow-deflecting cover may be configured to permit some non-retrograde blood flow in the second cavity by providing an opening in the flow-deflecting cover that may be opened or exposed as required to cause the desired non-retrograde blood flow. In other examples, the flow-deflecting cover may be scoop-shaped or concave, such that changing a rotational orientation of the expandable shunt in the opening may cause the scoop or concavity of the flow-deflecting cover to block less than all blood flow in the normal blood flow direction, thereby enabling non-retrograde blood flow.

In some embodiments, the expandable flow deflector includes a lip for engaging with a wall of the second cavity to aid in forming a seal against the wall of the second cavity. Such a lip may refer to any protrusion that forms a seal against the wall of the second cavity. For example, the lip may include a raised or curved edge that protrudes from an edge or surface of the expandable flow deflector. In some examples, the lip may be located along the outer edge of the expandable flow deflector and may extend around the entire circumference of the expandable flow deflector. In other examples, the lip may extend around only a portion of the circumference of the expandable flow deflector. The lip is typically located on a distal end of the flow deflector or on the shunt end of the flow deflector. The lip may be desirable to help direct the flow of blood towards the desired retrograde direction, while also preventing the flow from leaking over the edge of the expandable flow deflector and into the normal direction of blood flow. The lip may be formed as an integral part of the expandable flow deflector or it may be attached to an edge or surface of the deflector as a separate piece. A variety of materials may be used for the lip, including polymers, metals, or biocompatible coatings. Additionally or alternatively, the lip may be formed of a frame portion covered with a fabric or other flexible material. The lip of the expandable flow deflector may aid in reducing the turbulence and recirculation of blood within the second cavity, such as a blood vessel, which can help to improve blood flow and reduce the risk of complications such as clotting or embolism. The lip may also aid in protecting the walls of the blood vessel from damage caused by the turbulent flow of blood.

In some embodiments, the expandable flow deflector includes a frame configured to initially maintain a compressed form following ejection from the catheter, and wherein the device further includes a release mechanism for enabling selective expansion of the expandable flow deflector following expansion of the expandable shunt. A compressed form refers to a smaller form of the frame prior to expansion at a target location, such as the second cavity. The compressed form is desirable to ease deployment through the vasculature. Once the compressed frame is in place at a target location, such as the second cavity, it may be expanded to its full size using various mechanisms such as inflation with a balloon, self-expansion using an expandable material that expands when no longer compressed within a structure such as a catheter, and/or expansion with a release mechanism. The expansion of the frame from the compressed form allows the expandable flow deflector to exert force against the walls of a blood vessel or cavity for structural support. A release mechanism refers to a structure or device configured to cause the expandable flow deflector to at least partially expand. In some examples, the release mechanism may include a trigger wire mechanism used for selective expansion of the expandable flow deflector following expansion of the expandable shunt. In such examples, a trigger wire, flow deflector, and shunt may be initially crimped together as a crimped system over a guide wire. After the crimped system is inserted between the left atrium and coronary sinus, an over tube of the guidewire may be pulled back to cause expansion of the crimped system. Upon ejection from the catheter, the trigger wire associated with the flow deflector may be pulled, releasing the flow deflector for further expansion. The trigger wire may extend through an opening in the flow deflector. Selective expansion of the expandable flow deflector refers to controlled expansion of one or more components of the flow deflector. For example, the release mechanism may further include a controller configured to enable control of the timing of expansion of the flow deflector.

In some embodiments, the expandable frame is configured such that when the catheter is removed in a first direction to cause release of the expandable flow deflector, the expandable frame is configured to expand in a second direction different from the first direction. Removing the catheter in a first direction to cause release of the expandable flow deflector may refer to sliding, removing, or otherwise separating the catheter from the expandable shunt and expandable flow deflector to cause an expansion of the expandable shunt and expandable flow deflector. In one example, removing the catheter in a first direction may include, after positioning the intravascular retrograde blood flow device in an opening between a left atrium and a coronary sinus, retracting the catheter in a direction away from the left atrium and towards right atrium in the coronary sinus. In this example, the retraction of the catheter causes release of the expandable flow deflector such that the expandable frame expands in a direction away from the right atrium in the coronary sinus. By expanding in a direction away from the right atrium, the expandable frame causes the expandable flow deflector to direct retrograde flow of blood that normally flows in a direction from the left atrium and towards right atrium in the coronary sinus to a direction from the left atrium and away from the right atrium in the coronary sinus. In one example, this may be achieved by providing a scoop-shaped flow deflector that expands by bending outwards from the opening between the left atrium and the coronary sinus and into a direction in the coronary sinus that is opposite to the direction in which the catheter is withdraw, i.e., towards the right atrium.

Disclosed embodiments include a method for directing intravascular retrograde blood flow. The method may include puncturing an opening between a first cavity and a second cavity prior to advancing a catheter into the opening. The method may include advancing a catheter into the opening between the first cavity and the second cavity. The method may include expelling, from the catheter in the opening, an expandable shunt compressed within the catheter and expelling from the catheter an expandable flow deflector. The flow deflector may be connected to the expandable shunt by a flexible hinge configured to bend such that when the expandable shunt is positioned along a first axis of the opening and the expandable flow deflector is positioned along a second axis transverse to the first axis within the second cavity, the flexible hinge is bendable to enable transverse axial positioning of the expandable shunt and the expandable flow deflector while maintaining an interconnection between the expandable shunt and the expandable. The method may include fixating the expandable flow deflector in the second cavity.

Figure 9:
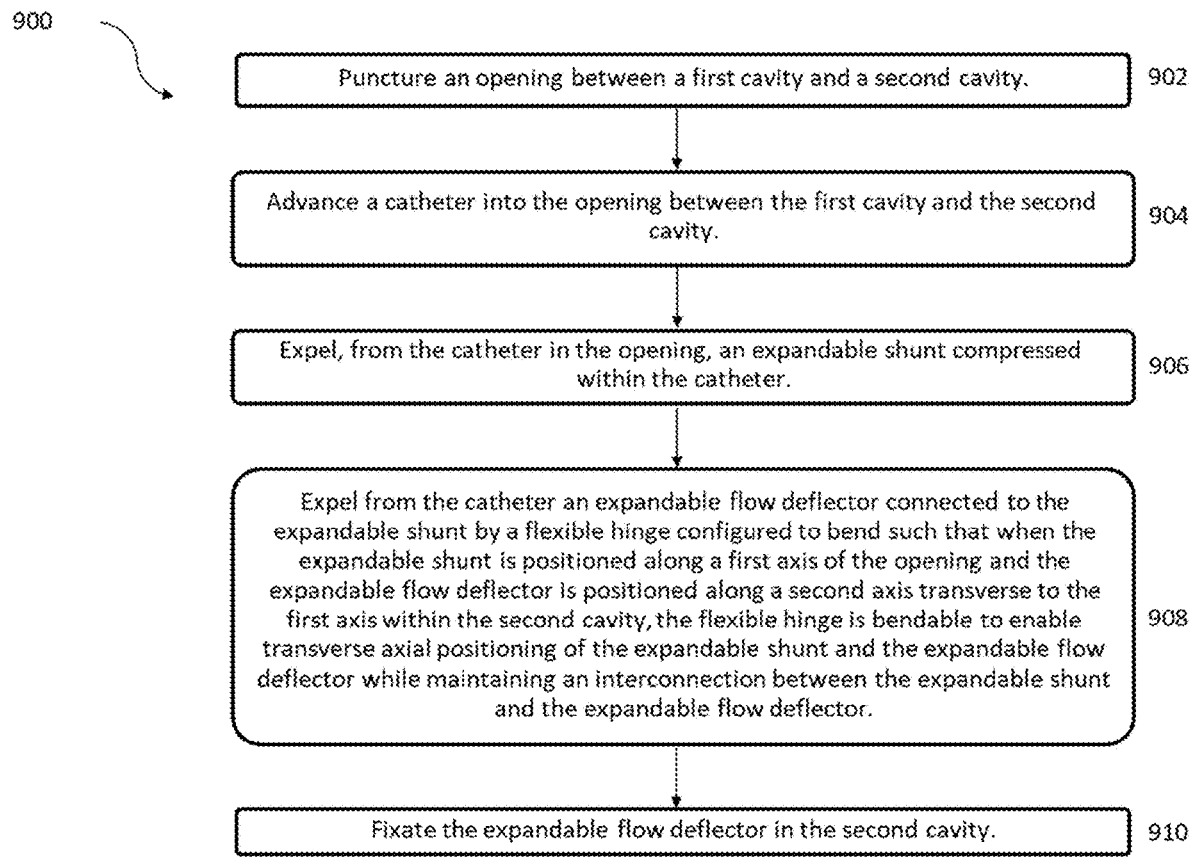
FIG. 9 is a flowchart of an exemplary method for directing intravascular retrograde blood flow, consistent with some embodiments of the present disclosure.

FIG. 9 illustrates a flowchart of a method 900 for directing intravascular retrograde blood flow, consistent with some embodiments of the present disclosure. Method 900 may include step 902 of puncturing an opening between a first cavity and a second cavity. Method 900 may include step 904 of advancing a catheter into the opening between the first cavity and the second cavity. Method 900 may include step 906 of expelling, from the catheter in the opening, an expandable shunt compressed within the catheter. Method 900 may include step 908 of expelling from the catheter an expandable flow deflector connected to the expandable shunt by a flexible hinge configured to bend such that when the expandable shunt is positioned along a first axis of the opening and the expandable flow deflector is positioned along a second axis transverse to the first axis within the second cavity, the flexible hinge is bendable to enable transverse axial positioning of the expandable shunt and the expandable flow deflector while maintaining an interconnection between the expandable shunt and the expandable flow deflector. Method 900 may include step 910 of fixating the expandable flow deflector in the second cavity.

Some disclosed embodiments include a medical device for directing retrograde blood flow. As used herein, a medical device may refer to any device or instrument configured for diagnosing and/or treating a patient. For example, some medical devices consistent with this disclosure include portions that are placed within or operate inside a blood vessel or another biological structure or organ within a human body for a medical purpose. Some medical devices consistent with the present disclosure include one or more delivery mechanisms (e.g., a catheter, sheath, and/or triggering mechanisms.) Biological structures with which disclosed embodiments may be used include, for example, those containing cavities. Non-limiting examples of such biological structures include blood vessels, capillaries, arteries, veins, heart chambers (e.g., left atrium, left ventricle, right atrium, right ventricle), or any other anatomical organ. A medical device may be configured to be delivered from a first location (e.g., a location outside the body) to a treatment site in a blood vessel or other biological structure. Additionally, or alternatively, in some embodiments, a medical device may be configured to cause a temporary or permanent change or transformation at a treatment site in a blood vessel. Some non-limiting examples of components of medical devices consistent with the present disclosure may include shunts, stents, catheters, or any other device configured to be placed within a blood vessel or other biological structure. Retrograde blood flow may include flow or movement of blood in a direction opposite to the natural flow direction in a blood vessel. For example, blood flowing in the opposite direction as the natural flow of blood in arteries or veins, including the coronary sinus, is considered retrograde blood flow. Directing retrograde blood flow may involve guiding, routing, regulating, influencing, or controlling retrograde blood flow against a natural direction of blood flow. In some embodiments, directing retrograde blood flow may involve reversing or redirecting the natural flow.

Figure 12:
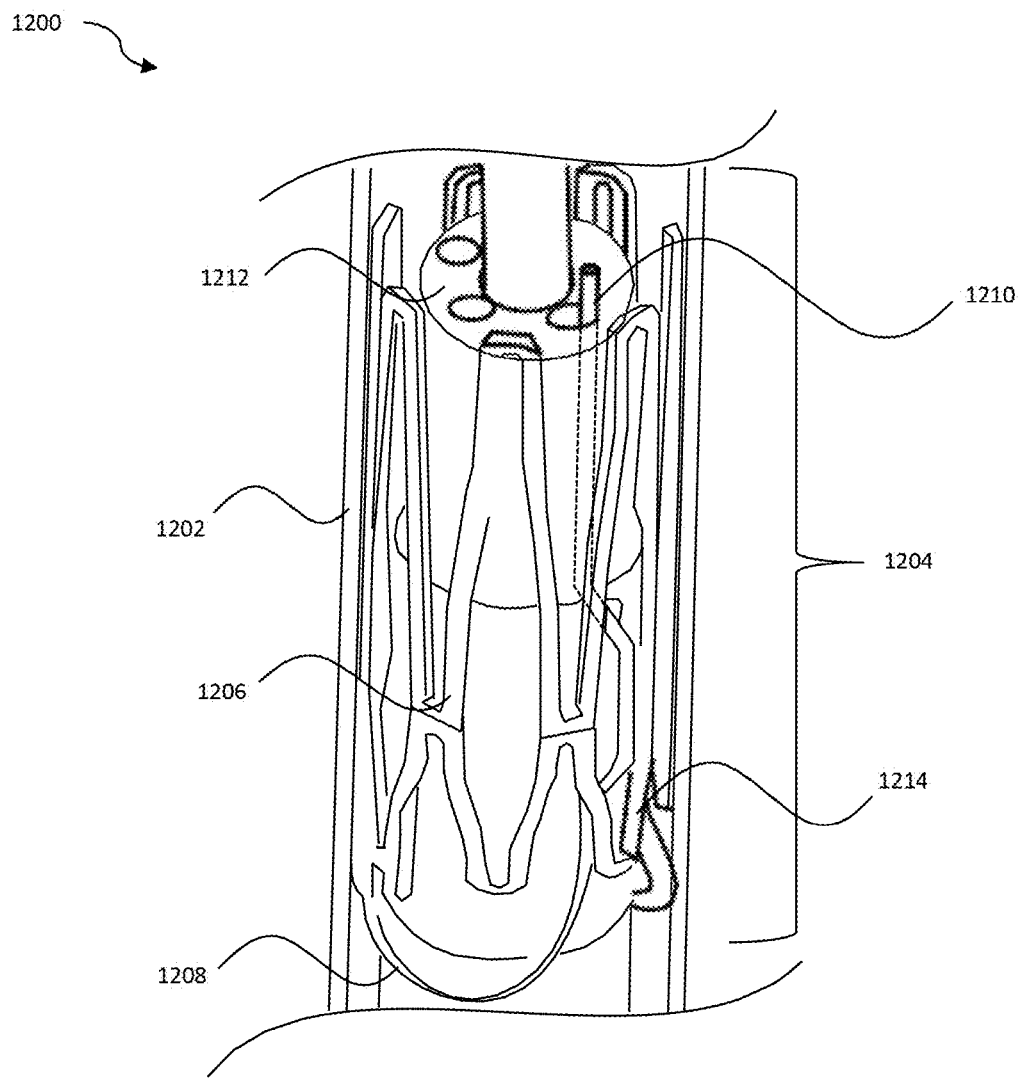
FIG. 12 is a perspective view of an exemplary medical device for directing retrograde blood flow, consistent with some embodiments of the present disclosure.
Figure 13:
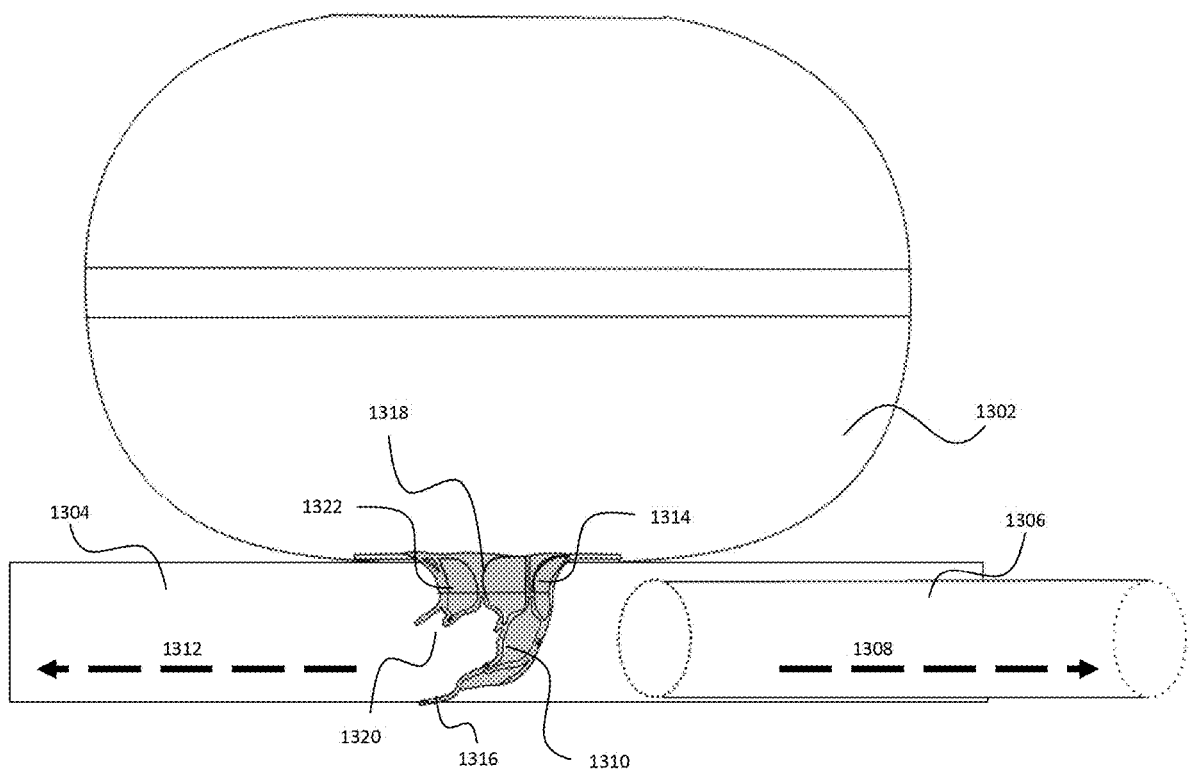
FIG. 13 is a schematic illustration of medical device deployed between a generalized depiction of a heart chamber and a coronary sinus for directing retrograde blood flow, consistent with some embodiments of the present disclosure.

Some disclosed embodiments include a tube for delivery to a coronary sinus from a first direction. A tube may include any hollow elongated conduit, such as a catheter, sheath, hollow wire, pipe, probe, cannula, or other channel structure that may be used to convey fluids. For example, a tube may include a catheter in the form of a flexible tube configured to be inserted into a body cavity, such as a coronary sinus. As an example, FIG. 12 shows a tube 1202 in the form of a catheter for insertion into a coronary sinus. Tube 1202 may include a hollow lumen configured to accommodate additional components of a medical device for directing retrograde blood flow, as shown in FIG. 12. A first direction may refer to a point to or from which an object, such as a tube, may be moved. FIG. 13 shows an example of a first direction 1308 extending between an orifice 1318 towards and from the right atrium along the coronary sinus 1304. Delivery of a tube to an orifice in a coronary sinus from a first direction may involve advancing, progressing, pushing, pulling, driving, forcing, shifting, or otherwise moving a tube to an orifice in a coronary sinus from a first direction. For example, delivery of a tube 1306 into coronary sinus 1304 may involve sliding tube 1306 into coronary sinus 1304 and into a heart chamber or specifically the left atrium via an orifice bridging the coronary sinus and the left atrium.

Some disclosed embodiments include an expandable structure, compressed within the tube. An expandable structure may refer to any structure, device, or component that is capable of enlarging or expanding from a compressed configuration. Such a device may be extendable, protractible, stretchable, dilatable, or distensible. One example of an expandable structure is a wire or mesh structure, such as a stent, that is capable of expanding to a larger diameter. Another example of an expandable structure is a folded or compressed structure that is capable of being extended or unfolded to become larger. As an example, FIG. 12 shows an expandable structure 1204, which is a compressed structure made of interconnecting struts that are configured to expand to make the expandable structure 1204 larger. Being compressed within the tube may refer to being shrunk, squeezed, contracted, cramped, crimped, narrowed, packed, pressed, reduced, folded or otherwise constricted in the tube. Compression may occur by folding at least one component of an expandable structure into, around, or along another component of the expandable structure to pack the expandable structure inside the tube. As an example, FIG. 12 shows expandable structure 1204 being compressed within tube 1202 by decreasing a distance between the struts of expandable structure 1204 to shrink expandable structure 1204 within tube 1202. For example, the expandable structure may be formed of a shape memory alloy that when released from constriction, returns to an original shape.

Some disclosed embodiments include a scaffold portion for maintaining an orifice between a coronary sinus and a heart chamber. A scaffold portion may include any frame, body, cage, enclosure, mount, outline, shell, setting, mesh, or other structure configured to maintain an opening. For example, a scaffold portion may be a tubular mesh. As another example, a scaffold portion may be a frame of connected struts arranged as a cylindrical tube. As an example, FIG. 12 shows an example of a scaffold portion 1206 compressed within tube 1202, made of a series of interconnected struts. An orifice may include an aperture, cavity, crack, hole, mouth, outlet, inlet, slit, spout, vent, aperture, perforation, cleft, cut, fissure, gap, puncture, slit, slot, space, or any other opening through which something may pass. As an example, an orifice may include an opening between two bodily cavities. FIG. 13 illustrates an example of an orifice 1318 between a heart chamber 1302 and a coronary sinus 1304.

Maintaining an orifice between a coronary sinus and a heart chamber may include preserving, protecting, retaining, supporting, sustaining, upholding, guarding, preserving, prolonging, or otherwise causing or enabling an orifice between a coronary sinus and a heart chamber to remain in an open state. For example, maintaining may involve preserving an opening between a coronary sinus and a heart chamber by lodging a scaffold portion in the opening. As an example, FIG. 13 shows a scaffold portion 1314 that maintains an opening 1318 between heart chamber 1302 and coronary sinus 1304 by being expanded within opening 1318 such that opening 1318 remains open to blood flow between heart chamber 1302 and coronary sinus 1304.

Some disclosed embodiments include a flow-deflector portion configured to cause retrograde blood flow in the coronary sinus, wherein the flow-deflector portion is configured such that the tube is withdrawn towards the first direction while the flow-deflector portion is enabled to deploy towards a second direction, other than the first direction. A flow-deflector portion includes any structure that temporarily or for a period, deflects, diverts, occludes, blocks, obstructs, slows, or inhibits fluid flow. In some embodiments, a flow-deflector portion may partially block or partially impede the flow of blood in a blood vessel. A flow-deflector portion may include any temporary or permanent, static, expandable, inflatable, or otherwise adjustable plug, disc, patch, or other mechanism for achieving deflection, as described above. For example, a flow-deflector portion may be a rigid or semi-rigid surface configured to limit or block blood flow in one direction of a coronary sinus. As another example, a flow-deflector portion may be an adjustable plug configured to obstruct a variable amount of flow in one direction of a coronary sinus. As another example, the flow deflector may be an arced or planar surface sized to cross the coronary sinus in a direction perpendicular to the coronary sinus longitudinal axis. The surface is typically at least partially impermeable to blood to occlude blood flow towards a first direction.

Some embodiments include a flow-deflector portion configured such that the tube is withdrawn towards the first direction while the flow-deflector portion is enabled to deploy towards a second direction, other than the first direction. In some embodiments, the flow-deflector portion is enabled to deploy towards a second direction, other than the first direction without affecting tube withdrawal. In some embodiments, the flow deflectors is configured with a degree of flexibility in the distal edge of the flow deflector such that it is biased to conform to a curvature of the coronary sinus. In some embodiments, a tool passage is present in the flow deflector. In some embodiments, a delay or controlled expansion of the flow deflector, enables this property.

FIG. 12 shows an example of a flow-deflector portion 1208 compressed within tube 1202. As shown in FIG. 12, flow-deflector portion 1208 may be a bendable flap extending from a distal end of scaffold portion 1206 that is folded into scaffold portion 1206 when compressed within tube 1202. FIG. 13 shows an example of a flow-deflector portion 1310 that is in it expanded form or not compressed within tube 1306. As shown in FIG. 13, flow-deflector portion 1310 may form an obstruction within coronary sinus 1304 to divert blood flow from heart chamber 1302 away from first direction 1308 or towards a second direction 1312.

In some embodiments, a distal edge of the flow-deflector portion is biased to conform to a curvature of the coronary sinus. Being biased to conform to a curvature of the coronary sinus refers to being stretched, formed, curved, bend, kinked, or otherwise shaped to contact a curved wall of the coronary sinus. Such a biased distal edge of the flow-deflector portion may allow for both improved fluid sealing to prevent leakage of blood in the normal direction of blood flow and guidance of redirected blood towards a retrograde direction. The biased distal edge may also have e to accommodate a tube which is withdrawn towards a first direction under the biased distal edge. In this case, the degree of elasticity is sufficient such that upon withdrawal of the tube, there is minimal compromise in fluid sealing to prevent leakage of blood in the normal direction of blood flow, For example, a distal edge of the flow-deflector portion may be lip-shaped to sit within a curved wall of the coronary sinus. FIG. 13 shows an example of a lip-shaped distal edge 1316 of the flow deflector 1310 that is biased to conform to a curvature of the coronary sinus 1304. As shown by example in FIGS. 14A and 14B, a distal edge 1410 of the flow deflector 1404 may include a curve that is bent outwards from a concavity of the flow deflector 1404 to provide further fixation within the coronary sinus.

A flow-deflector portion may cause retrograde blood flow in the coronary sinus by deflecting, diverting, occluding, blocking, obstructing, slowing, or inhibiting blood flow in a normal direction. For example, flow-defector portion 1310 may cause retrograde blood flow in the coronary sinus 1304 by blocking the normal flow of blood that travels from heart chamber 1302 via first direction 1308, thereby causing blood flow away from first direction 1308 in coronary sinus 1304. In some embodiments, the flow deflector portion is configured with a tube or tool passage capable of passing the tube there through, while also blocking the normal flow of blood. The tube passage may comprise any shape or structure that is adapted to allow a tool to pass after deployment without compromising a substantially liquid tight seal or flow deflection. Examples of a tool passage include but are not limited to a one way valve, a duck bill valve, staggered shutters or a two or more layered material with each individual layer having a slot positioned about 90 degrees from another layer, a hole and plug, or another suitable openable seal. Other approaches to a tool passage are also envisioned for use with the disclosed embodiments, such as two partially overlapping layers configured to permit manipulation such that they do not overlap as a location to pass a tool there through.

Withdrawing the tube towards the first direction may refer to pulling, retreating, evacuating, sliding, retracting, or otherwise removing the tube towards the first direction. Once the expandable structure is positioned at a desired location, the tube may be withdrawn towards the first direction to limit the number of objects within a body. For example, FIG. 13 shows an example of withdrawing tube 1306 towards the first direction 1308 by pulling tube 1306 through coronary sinus 1304. Deploying the flow-deflector portion towards a second direction other than the first direction may refer to expanding, opening, extending, unfolding, fanning out, spreading out, forming, or otherwise causing the flow-deflector portion to expand in a direction opposite to or otherwise different from the first direction. In some examples, deploying the flow-deflector portion is achieved by withdrawing the tube towards the first direction. In other examples, deploying the flow-deflector portion is achieved by further actuating the flow-deflector portion. As an example, FIG. 13 shows that after the tube 1306 is withdrawn towards the first direction 1308, the flow-deflector portion 1310 is enabled to deploy towards a second direction 1312, other than the first direction (in this illustrated instance, opposite the first direction).

A second direction opposite to the first direction refers to a second direction heading away from the first direction. Thus, opposite in this context, does not necessarily refer to mathematical opposites. For example, if the second direction is upstream based on natural flow in a blood vessel, the first direction may be generally downstream based on natural flow in the blood vessel. It is desirable to direct retrograde blood flow towards a second direction opposite to the first direction to enable perfusion in areas of the heart or body opposite to a normal flow of blood. For example, directing retrograde blood flow towards a second direction opposite to the first direction may involve reversing blood flow from a left atrium to a right atrium via the coronary sinus towards the posterolateral branch. As an example, FIG. 13 shows a flow deflector 1310 directing retrograde flow towards a second direction 1312 opposite to first direction 1308.

In some embodiments, the flow-deflector portion is configured to expand in the second direction in a manner sweeping away from the first direction. Sweeping away refers to moving or expending in a curve. For example, the flow-deflector portion may expand in the second direction by curving out of a folded or compressed shape to an unfolded or expanded shape away from the first direction, like a petal of a flower expands from a bud. As an example, FIG. 13 shows a flow deflector 1208 compressed within an expandable structure 1204, which may expand in the second direction by blooming outward from its folded shape.

Figure 19:
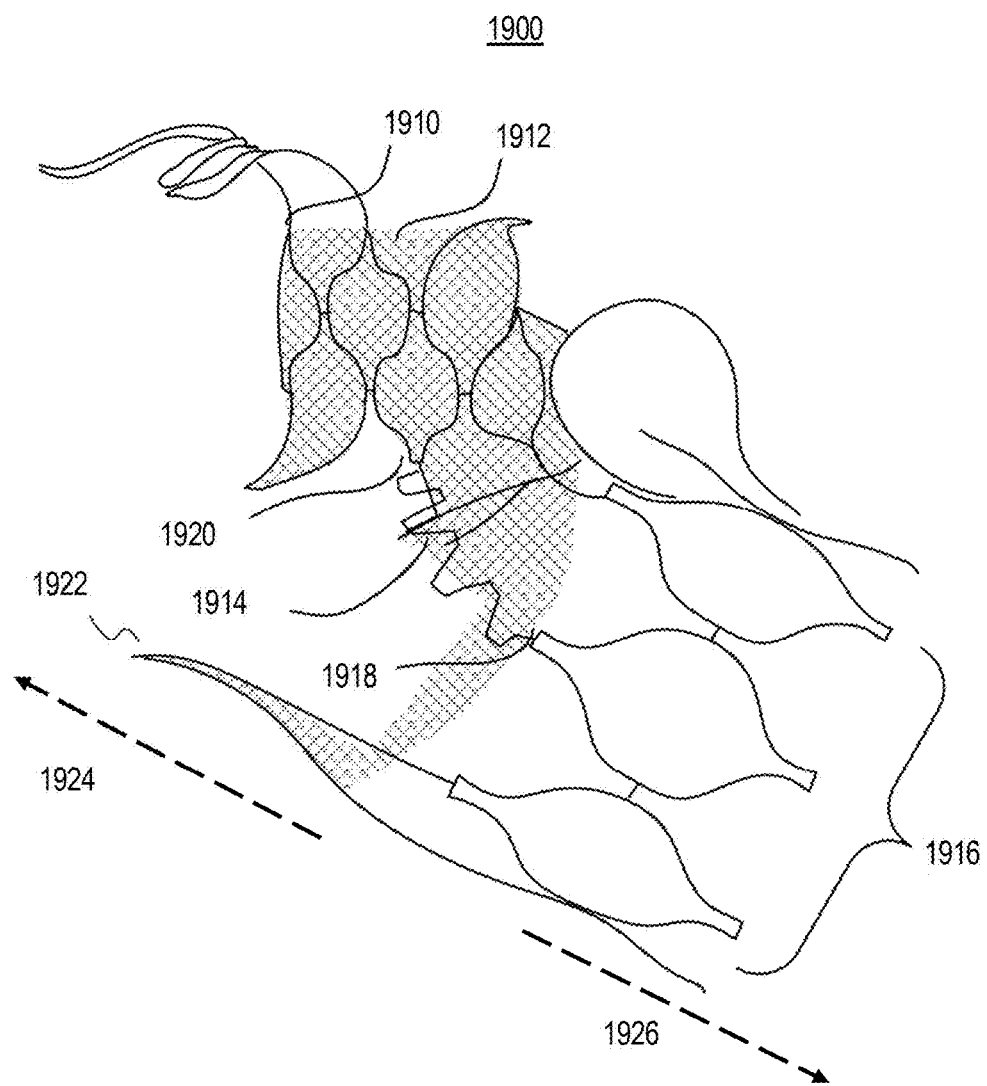
FIG. 19 is a side view of a further exemplary embodiment of an intravascular retrograde blood flow device, consistent with some embodiments of the present disclosure.

In some embodiments, the flow-deflector portion is arc-shaped, and a concavity of the arc-shape is configured to sweep away in the second direction. Arc-shaped refers to a shape that is bent, arched, bowed, crescent-like, round, or otherwise curved. For example, a flow-deflector portion may be rounded like the circumference of a portion of a circle. A concavity of the arc-shape refers to a cavity, recess, depression, hollow portion, pit, or other curved surface of the arc-shape of the flow-deflector portion. For example, a concavity of a rounded flow-deflector portion may be an inner curvature. An arc-shaped flow-deflector portion with a concavity is desirable for smooth movement of blood within the coronary sinus. As an example, flow-deflector portion 1310 in FIG. 13 is shaped as a curved petal extending from scaffold portion 1314, wherein a concavity of flow-deflector portion 1310 sweeps away in second direction 1312. In another example, flow-deflector portion 1916 in FIG. 19 is shaped as a concave sail being attached to a portion of a perimeter of the scaffold portion 1912 and extended towards a distal edge of the flow deflector, wherein a concavity of the flow-deflector portion sweeps away in second direction 1924 away from first direction 1926 within the coronary sinus. In another example, flow-deflector portion 816 is configured such that the tube is withdrawn towards the first direction 811, and the flow-deflector portion 816 is enabled to deploy in a second direction 810, other than the first direction 811. In another example, flow-deflector portion 816 is configured such that after the tube is withdrawn towards the first direction 811, the flow-deflector portion 816 is enabled to deploy in a second direction 810, other than the first direction 811.

In some embodiments, upon ejection from the tube, the flow-deflector portion is configured to partially expand. Partially expansion of the flow-deflector portion following ejection from the tube may involve a limited, controlled, local, restricted, or otherwise incomplete opening or largening of the flow-deflector portion. It may be desirable to maintain the flow deflector portion in a partially expanded state to properly align or position the scaffold portion or the flow deflector portion before the flow deflector portion is fully expanded such that it contacts wall tissue in the coronary sinus.

In some embodiments, when a trigger wire is pulled following partial expansion, the flow-deflector portion further expands. A trigger wire refers to a line, cable, thread, tube, coil, or other strand or elongated structure or combination of structures, that when actuated causes the resulting action of expanding the flow deflector (in this example, causing further expansion of a flow deflector portion already partially expanded. For example, a trigger wire may be a cable connecting two portions of the expandable structure that is configured to activate a movement of one of those portions. As an example, FIG. 12 shows a trigger wire connected to flow-deflector portion 1208 that causes flow-deflector portion 1208 to further expand when it is pulled following partial expansion caused by withdrawal of the tube in the first direction. In some embodiments, the activation may occur indirectly in that the trigger wire may be connected to other structures that when moved, cause the trigger wire to move.

In some embodiments, an inner tube is disposed within the expandable structure, wherein the trigger wire is connected on one end to the flow-deflector portion and on another end to the inner tube. An inner tube refers to any wire, cylinder, duct, pipe, conduit, or cable that sits within the expandable structure. An inner tube may be provided to provide further structural stability to a compressed state of the expandable structure when it sits within the tube. An inner tube may also be provided as a simple mechanism to fully expand components of the expandable structure without inserting additional tools within the tube during expansion. As an example, FIG. 12 shows an inner tube 1212 disposed within the expandable structure 1204, with an inner wire 1210 that is connected on one end to the flow-deflector portion 1310 and on another end to the inner tube 1212.

In some embodiments, the trigger wire is configured to release the flow-deflector portion for expansion into an expanded state when the inner tube is retracted from within the expandable structure. Retraction of the inner tube refers to any removal of the inner tube, such as pulling, sliding, or tugging the inner tube from within the expandable structure. Releasing the flow-deflector portion into an expanded state by retracting the inner tube from within the expandable structure is desirable because it avoids the insertion of additional tools within the tube to cause the expansion. For example, in FIG. 12, the trigger wire 1210 is configured to release the flow-deflector portion 1208 for expansion into an expanded state when the inner tube 1212 is retracted from within the expandable structure 1204.

In some embodiments, a mechanism is provided for delaying deployment of the flow-deflector portion until the tube is removed. A mechanism refers to any part or process used to affect a desired result, such as delaying deployment of the flow-deflector portion until the tube is removed. Delaying deployment refers to slowing, pausing, extending, or otherwise postpone a deployment of the flow-deflector portion until the tube is removed. For example, the mechanism may be a catch, such as a clasp.

In some embodiments, a catch is provided for maintaining the flow-deflector portion in at least a partially non-expanded configuration upon ejection from the tube, and a trigger wire connected to the catch and extending through the tube in the first direction, wherein the trigger wire is configured such that when pulled from the first direction, the flow-deflector portion expands in the second direction. A catch refers to a structure or component that joins two or more objects or surfaces while allowing for their separation. For example, a catch may be a clasp holding two portions of the expandable structure together, and configured to release the connection of the two portions either automatically or by a user action, such as pulling the clasp. A catch and trigger-wire configuration may be used to expand the flow-deflector portion to produce a slow and controlled release of the flow-deflector portion in the coronary sinus. FIG. 12 shows an example of a catch 1214 that maintains the flow-deflector portion 1208 in at least a partially non-expanded configuration upon ejection from the tube 1202, and a trigger wire 1210 connected to the catch and extending through the tube 1202 in the first direction, wherein the trigger wire 1210 is configured such that when pulled from the first direction, the flow-deflector portion 1208 expands in the second direction. In this example, catch 1214 is a curved strut in scaffold portion 1206 that holds flow-deflector portion 1208 in a compressed state within the tube before wire 1210 is pulled from the first direction.

In some embodiments, a controller is configured to control a timing of expansion of the flow-deflector portion. A controller refers to any mechanical or electrical component that directs or regulates a timing of expansion. Such a controller may be located on a handle for deployment outside the body outside to enable a physician to selectively trigger to the deployment of the flow deflector through a turning, twisting, pulling, pressing, or other motion that results in deployment of the flow deflector portion. Thus, a controller might include one or more of a button, dial, switch, lever, rotatable or slidable sleeve, or any other structure capable of translating physical motion by an operator to expansion of the flow deflector portion. A timing of expansion refers to a time, period, schedule, arrangement, plan, program, or other choice, judgement, or control of when the flow-deflector portion expands. Thus, a physician may delay full expansion of the flow deflector until the appropriate time. By way of another example, in some embodiments a timing of expansion may include how quickly the flow-deflector portion expands, a time to expand the flow-deflector portion, and/or a plan for partially, then fully expanding the flow-deflector portion.

In some embodiments, the expandable structure further includes a stabilizer portion on a side of the scaffold portion opposite the flow-deflector portion. A stabilizer portion refers to any structure or component configured to at least partially secure at least one portion of the expandable structure in a particular position or rotational orientation, or otherwise prevent at least one portion of the expandable structure from migrating, moving, or rotating. In some embodiments, the scaffold portion is generally annular or tubular having a distal end opposite the flow deflector as well as a distal end proximate to the flow deflector. A side of the scaffold portion opposite the flow-deflector portion refers to a location that is diametrically opposed to, remote from, opposing, or otherwise across from the flow-deflector portion. It is desirable to provide a stabilizer portion on a side of the scaffold portion opposite the flow-deflector portion to aid in securing the expandable structure on that side and/or to resist migration or movement caused by the pressure of blood flow. For example, FIGS. 14A and 14B show different views of an expandable structure 1400 that includes a stabilizer portion 1406 on a side of the scaffold portion 1402 opposite the flow-deflector portion 1404. In the example of FIGS. 14A and 14B, stabilizer portion 1406 has a circumference that broadens outwards from the scaffold portion 1402 to fix scaffold portion 1402 in the opening between the heart chamber and the coronary sinus.

In some embodiments, the stabilizer portion includes a plurality of outwardly extending prongs, each prong having a distal end curved such that upon expansion the plurality of outwardly extending prongs have at least a portion that faces in a direction of an inner wall of the heart chamber. A plurality of outwardly extending prongs refers extensions or projecting parts emanating from a central lumen of the scaffold portion and into the heart chamber. In some embodiments, a series of prongs emanate in differing directions. Depending on the number of prongs, the prongs may at least have portions that are slender and/or pointed. Each prong may have a distal end curved in a direction facing an inner wall of the heart chamber with the tip of the prong extending away from the cavity wall, to minimize risk of wall puncture. As an example, FIGS. 14A and 14B show a stabilizer portion 1406 including a plurality of outwardly extending prongs 1408, each prong 1408 having a distal end curved such that upon expansion the plurality of outwardly extending prongs face in a direction of an inner wall of the heart chamber. Alternatively, some or all prongs may have tips configured to face the wall.

In some embodiments, the scaffold portion and the flow-deflector portion are configured to be expanded following expansion of the stabilizer portion. Expansion of the stabilizer portion refers to any enlargement of the stabilizer portion, such as a transition of the stabilizer portion from a crimped or compressed shape to an uncrimped or uncompressed shape. The scaffold portion and the flow-deflector portion may expand after the stabilizer portion expands so that the stabilizer portion can first be used to fix a position of the expandable structure before expanding the remaining components w. This may reduce trauma that might otherwise be caused by having to reposition the complete expandable structure if it is initially ineffectively deployed. For example, the tube may be withdrawn in a first direction in an amount at least corresponding to the length of the stabilizer portion to cause the stabilizer portion to expand against an inner wall of the heart chamber, thereby securing the expandable structure in place. Then, the tube may be further withdrawn in the first direction to cause the scaffold portion and flow-deflector portion to expand without having to reposition these components within the opening or the coronary sinus.

Some embodiments further include at least one extension on the same side of the scaffold portion as the flow-deflector portion for contacting an inner wall of the coronary sinus to aid in stabilization. An extension refers to any appendage, arm, branch, distension, elongation, protraction, wing, lip, or any other structure. It may be desirable to provide such an extension for device stabilization purposes. For example, at least one extension may cooperate with the stabilizer on the distal end of the scaffold portion to secure the structure in place. At least one extension may be provided as a lip structure (for example, a series of prongs) that contact an upper wall portion of the coronary sinus adjacent the scaffold. Additionally or alternatively, at least one extension may include an extension extending from the flow deflector forming part of the flow deflector frame that contacts a lower portion of the coronary sinus wall. For example, FIG. 14A illustrates a series of prongs 1412 disposed on a perimeter edge on the same side of the scaffold portion 1402 as the flow-deflector portion 1404. In some embodiments, one or more prongs may be shorter in length compared to another one or more extensions. Typically, extensions along the circumference of the scaffold towards the retrograde blood flow are shorter in length compared to those positioned on the circumference of the scaffold towards the first direction (i.e., tube withdrawal direction). These prongs, which serve as extensions of the scaffold portion 1402, may be similar to prongs 1408 of stabilizer portion 1406 in that both sets of prongs emanate from opposite sides of scaffold portion 1402 and cooperate to stabilize scaffold 1402 in the passageway 1322 or cooperate to stabilize the flow deflector location within the coronary sinus as illustrated in FIG. 13. Additionally or alternatively, at least one extension may include the distal end 1410 of flow deflector portion 1404 or distal end 1922 of flow deflector 1916 in the direction towards the second direction, as long as they are configured to engage the wall of the coronary sinus. Distal end 1410 or distal end 1922 of flow deflector may be covered or uncovered with material as described herein. In some embodiments, distal end 1410 or distal end 1922 of flow deflector may be discernable as having its own unique structure, different from flow deflector portion 1404 or 1916. In other embodiments, distal end 1410 or distal end 1922 may be indistinguishable from flow deflector portion 1404 or 1916, but in such instance is still considered an extension as defined herein if distal end 1410 or 1922 engage with the wall of the coronary sinus, extending further than it might otherwise extend if the distal end merely touched the wall. In yet other embodiments, distal end 1410 or distal end 1922 may be indistinguishable from flow deflector portion 1404 or 1916, but in such instance is still considered an extension as defined herein if distal end 1410 or distal end 1922 engages with the wall of the coronary sinus with a force greater than it might otherwise if distal end 1410 or distal end 1922 merely touched the wall.

In some embodiments, the extension is located on a distal end of the flow deflector portion and is configured such that after the tube is withdrawn towards the first direction, the extension is enabled to project in the second direction. In some embodiments, where the flow deflector has more than one distal end as presented in 1916, the extension is located on a distal end of the flow deflector portion towards the second direction, for example in distal end 1922. The at least one extension may expand in the second direction to provide additional fixation of the flow-deflector portion within the coronary sinus and to act as an additional stabilizing structure within the coronary sinus. Additionally, the expansion of the extension in the second direction may further aid in directing flow in the retrograde direction away from the first direction in which the tube is withdrawn. As an example, FIG. 13 shows an extension 1320 that expands in second direction 1312 after tube 1306 is withdrawn towards first direction 1308.

In some embodiments, the at least one extension is located on a perimeter edge of the scaffold portion and is configured to expand fully before the flow-deflector portion expands fully in the coronary sinus.

Expanding fully may refer to enlarging to a maximum size. It may be desirable for the extension to expand fully before the flow-deflector portion expands fully in the coronary sinus so that the scaffold portion is stabilized before flow deflector deployment. For example, prongs 1320 may fully expand after tube 1306 is withdrawn while flow-deflector portion 1310 may only be partly released so as not to contact a wall of coronary sinus 1304. This configuration allows for device fixation and repositioning of flow-deflector portion 1310 within coronary sinus 1304 while limiting tissue damage in the wall of coronary sinus 1304.

In some embodiments, a pliable, fluid-impermeable covering is disposed over the expandable structure. A pliable, fluid-impermeable covering refers to a fabric cover or any flexible material that may be wrapped around or connected to a component of the expandable structure and that is at least partially configured to block a passage of fluid therethrough. In some embodiments, a partial or substantial impermeability of the pliable covering to fluid may be conducive to a desired direction of retrograde blood flow. For example, a pliable covering that is partially impermeable to blood flow may allow a portion of blood flow through the pliable covering to be blocked and redirected by the pliable covering. As another example, a pliable covering that is substantially impermeable to blood flow may allow all blood flow through the pliable covering to be blocked and redirected by the pliable covering. Some examples of a pliable, fluid-impermeable covering include latex, polyethylene, polyurethane, or other flexible or polymeric materials. The pliable, fluid-impermeable covering may extend over any or all portions of the expandable structure. In some instances, the pliable, fluid-impermeable covering may extend only over the flow-deflector portion. In other instances, the pliable, fluid-impermeable covering may extend over both flow-deflector portion and the scaffold portion. As an example, FIGS. 14A and 14B show a pliable, fluid-impermeable covering 1414 extending over scaffold portion 1402, flow-deflector portion 1404, and stabilizer portion 1406, which reinforces the structure of these components together.

Figure 15:
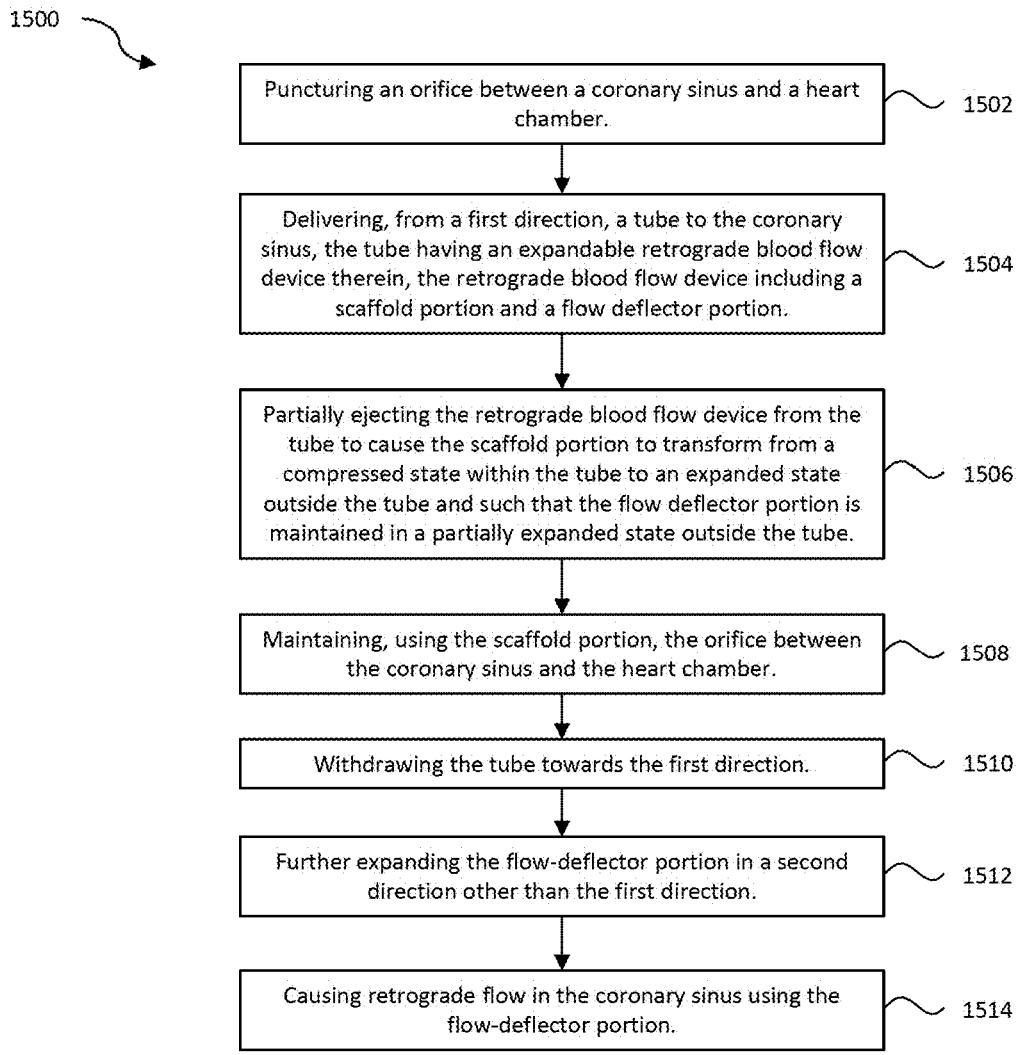
FIG. 15 is a flowchart of an exemplary method for directing retrograde blood flow, consistent with some embodiments of the present disclosure.

Some disclosed embodiments include a method for directing retrograde blood flow. FIG. 15 illustrates a flowchart of an exemplary method for directing retrograde blood flow 1500. At step 1502, method 1500 may involve puncturing an orifice between a coronary sinus and a heart chamber. Puncturing the orifice may involve penetrating, perforating, boring, cutting, lacerating, piecing, lancing, or otherwise creating an opening between a coronary sinus and a heart chamber. For example, a surgeon may use a cutting device, such as a blade, to cut a hole between a coronary sinus and a heart chamber. As another example, a cutting device, such as a sharp edge, may be provided on an end of a tube containing an expandable structure as described herein, wherein the sharp edge may be used to penetrate tissue between a coronary sinus and a heart chamber and create an aperture therein. An example of the resulting aperture is shown as hole 1318 between a coronary sinus 1304 and a heart chamber 1302 in FIG. 13.

At step 1504, method 1500 may involve delivering, from a first direction, a tube to the coronary sinus, the tube having an expandable retrograde blood flow device therein, the retrograde blood flow device including a scaffold portion and a flow deflector portion. Delivering the tube may involve moving the tube to the coronary sinus from a first direction, as described herein. For example, step 1504 may involve sliding tube 1306 into coronary sinus 1304, as shown in FIG. 13. As shown in FIG. 12, an exemplary tube 1202 having an expandable retrograde blood flow device 1204 therein including a scaffold portion 1206 and a flow deflector portion 1208 may be slid into the coronary sinus.

At step 1506, method 1500 may involve partially ejecting the retrograde blood flow device from the tube to cause the scaffold portion to transform from a compressed state within the tube to an expanded state outside the tube and such that the flow deflector portion is maintained in a partially expanded state outside the tube. Partially ejection and expansion may involve a limited, controlled, local, restricted, or otherwise incomplete opening or largening of a portion of the retrograde blood flow device. It may be desirable to maintain the flow deflector portion in a partially expanded state to properly align or position the scaffold portion or the flow deflector portion before the flow deflector portion is fully expanded such that it contacts wall tissue in the coronary sinus. For example, step 1506 may involve pushing only the scaffold portion of the retrograde blood flow device out of the tube to cause the scaffold portion to expand from a crimped shape within the tube to an uncrimped or expanded shape outside the tube and such that the flow deflector portion is maintained in a compressed or the folded shape outside the tube.

At step 1508, method 1500 may involve maintaining, using the scaffold portion, the orifice between the coronary sinus and the heart chamber. Such maintaining may involve causing or enabling an orifice between a coronary sinus and a heart chamber to continue, as described herein. For example, FIG. 13 shows that maintaining an opening 1318 between heart chamber 1302 and coronary sinus 1304 by expanding scaffold portion 1314 within opening 1318 such that opening 1318 remains open to blood flow between heart chamber 1302 and coronary sinus 1304.

At step 1510, method 1500 may involve withdrawing the tube towards the first direction. Withdrawing the tube may involve removing the tube towards the first direction, as described herein. For example, FIG. 13 shows an example of withdrawing tube 1306 towards the first direction 1308 by pulling tube 1306 through coronary sinus 1304.

At step 1512, method 1500 may involve further expanding the flow-deflector portion towards a second direction other than the first direction. Further expanding the flow-deflector portion may involve additionally largening the flow-deflector portion. This further expansion may be achieved in the same manner as the partial expansion or by another manner different from the partial expansion. As an example, further expanding the flow-deflector portion may involve expanding flow-deflector portion 1208 by pulling trigger wire 1210 attached to catch 1214 after withdrawing tube 1202 in the first direction to cause flow deflector to sweep towards a second direction opposite the first direction.

At step 1514, method 1500 may involve causing retrograde flow in the coronary sinus using the flow-deflector portion. Causing retrograde flow may involve creating, generating, inducing, producing, or otherwise giving rise to retrograde flow in the coronary sinus using the flow-deflector portion. The flow-deflector may be used to cause the retrograde for by blocking or diverting a normal flow of blood by physically obstructing the normal flow, thereby enabling flow of blood in another direction, such as a retrograde direction of blood flow. For example, method 1500 may involve blocking flow of blood in a first direction 1308 between heart chamber 1302 and coronary sinus 1304 by blocking that flow using flow deflector 1310, which causes the blood flow to be redirected to retrograde flow in second direction 1312. As another example, flow deflector portion 1310 may be curved to further direct retrograde flow in coronary sinus 1304 by providing a curved surface or scoop that directs blood flow in direction 1312.

Disclosed embodiments may involve devices and methods for causing intravascular retrograde blood flow. In some embodiments, the devices and methods are configured to enable retrograde blood flow by maintaining a passage to connect two organs with a pressure gradient therebetween and simultaneously blocking natural blood flow in the second organ. The term "intravascular" refers to within a vessel. Such vessels may include veins, arteries, capillaries, or and other biological duct in which blood. Retrograde blood flow may include flow or movement of blood in a direction opposite to the natural flow direction in a blood vessel. For example, blood flowing in the opposite direction as the natural flow of blood in arteries or veins, including the coronary sinus, is considered retrograde blood flow. Some embodiments may involve a tubular shunt portion. In some embodiments, a shunt is a device that redirects the flow of bodily fluids. A shunt portion includes a complete shunt or any portion of a shunt. For example, a shunt portion may redirect blood flow between two adjacent organs. Adjacent organs may be any two biological structures that lie next to each other. Examples of organs may include blood vessels, anatomical cavities, and anatomical chambers. In some embodiments, a tubular shunt portion may include a tubular or annular passageway forming a central opening adapted to permit fluid flow. For example, a tubular portion may enable fluid flow, including blood flow. In some embodiments, a shunt portion may be tubular in shape and may include side walls. A structure may be considered tubular, within the meaning of this disclosure, if it has an outer wall or walls that define an intermediate channel, regardless of the contour of the intermediate channel. The walls may be imperforate or perforate. For example, a series of wire struts or thin wire-like structures may make up a scaffold generally in the shape of a tube to the extent that the outer structure bounds an intermediate channel. Even when the channel is deformed, for purposes of this disclosure, the structure is still considered tubular.

In some embodiments, a tubular shunt portion may be configured for deployment in a passageway between an organ and an adjacent blood vessel. A shunt portion may be configured for deployment in a passageway if it is constructed in a manner (with features and at an appropriate size and shape) enabling it to be located in the passageway. The passageway may be pre-existing, or it may be surgically formed in connection with the deployment. In some embodiments, surgically formed may involve a puncturing device to form a surgical hole prior to deployment. In some embodiments, a shunt portion may be configured for deployment through association with a delivery apparatus configured to deploy the shunt portion in the passageway. In some embodiments, the delivery apparatus may be configured to maintain an altered shape or orientation of the shunt portion to enable delivery to the passageway. For example, a shunt portion may be configured to be compressed or collapsed within the delivery apparatus to enable percutaneous delivery, after which the shunt portion may be expanded. Passageways may include channels, surgical or naturally formed orifice, or other openings that permit the flow of fluids between an organ and vessel. Examples of organs may include blood vessels, anatomical cavities, and/or anatomical chambers, including heart chambers. Adjacent blood vessels may include veins, arteries, capillaries, arterioles, and venules disposed next to another organ or blood vessel. Blood vessels may include the coronary sinus. In one example, the passageway may be formed between the coronary sinus and the left atrium or left ventricle. In another example, the device is configured for deployment specifically in a passageway between the coronary sinus and the left atrium. Bridging may occur with an interior of a blood vessel or cavity, meaning the inside or inner-side of a blood vessel or cavity. For example, an interior of a blood vessel may be the channel of the blood vessel in which blood flows. Bridging a cavity and blood vessel may involve linking, interfacing, or connecting. Such bridging may occur by forming a hole, cutout, channel or gap, or may occur using a preexisting hole, cutout, channel or gap. For example, bridging a cavity in the organ and an interior of the blood vessel may involve connecting the cavity in the organ to the interior of the blood vessel, and in some embodiments, permitting the flow of fluid or transport of materials between the organ and the vessel.

FIG. 16 illustrates an exemplary embodiment of components of the heart. Heart 1600 may include various chambers, cavities, veins, arteries, and passageways. For example, heart 1600 may include left atrium 1610, right atrium 1612, left ventricle 1616, coronary sinus 1614 and posterior interventricular vein (PIVV) 1620. Passageways may include openings in heart 1600 that may be adjacent to blood vessels, such as coronary sinus 1614. In some embodiments, passageways may include openings in heart 1600 that may be adjacent to coronary sinus 1614 at a distance from PIVV 1620 such that the flow deflector does not contact the coronary sinus wall in the area of the PIVV. In some embodiments, a tubular shunt portion 1618 may bridge a passageway between left atrium 1610 and coronary sinus 1614.

Disclosed embodiments may include a stabilizer configured to fixate the tubular shunt portion in the passageway. A stabilizer may include any structure that, anchors, supports, attaches, fastens, fixates, and/or prevents movement or migration. In some embodiments, stabilizers may include flanges or projections. A stabilizer may be configured to fixate the tubular shunt portion in the passageway. For example, fixating may involve fastening, joining, anchoring, or retaining to prevent or resist movement. A stabilizer may fixate a tubular shunt portion in a passageway, such as a vein or other blood vessel, such that the tubular shunt portion resists moving away from the passageway. In some embodiments, a stabilizer may include a flange on a distal end of the tubular shunt portion. A flange may include a lip, rim, brim, protrusion, projection, or other extension. A flange on a distal end of a the tubular shunt portion is a region of the shunt that is furthest from the direction of implantation, if the device is implanted from a blood vessel into a cavity, or which is the end region of the device in the cavity. In some embodiments, the flange may be configured to engage an interior wall of the cavity in the organ. Engaging an interior wall may include having at least a portion that contacts an inside wall of a cavity (e.g., the inner wall of a heart chamber). In some embodiments, engaging may also involve anchoring, fastening, joining, or otherwise forming a connection with an interior of an organ, such as an inner wall of a heart chamber. Alternatively, or additionally, stabilizing may occur through contact or engagement with walls of the passageway. For example, a stabilizer may exert a restraining force on the surface of the atrium inner wall or alternatively or additionally on the wall of the passageway, resisting migration of the shunt portion out of the passageway. Thus, the stabilizer may be configured to ensure the shunt portion and/or flow deflector portion does not migrate despite pressure applied.

Figure 17:
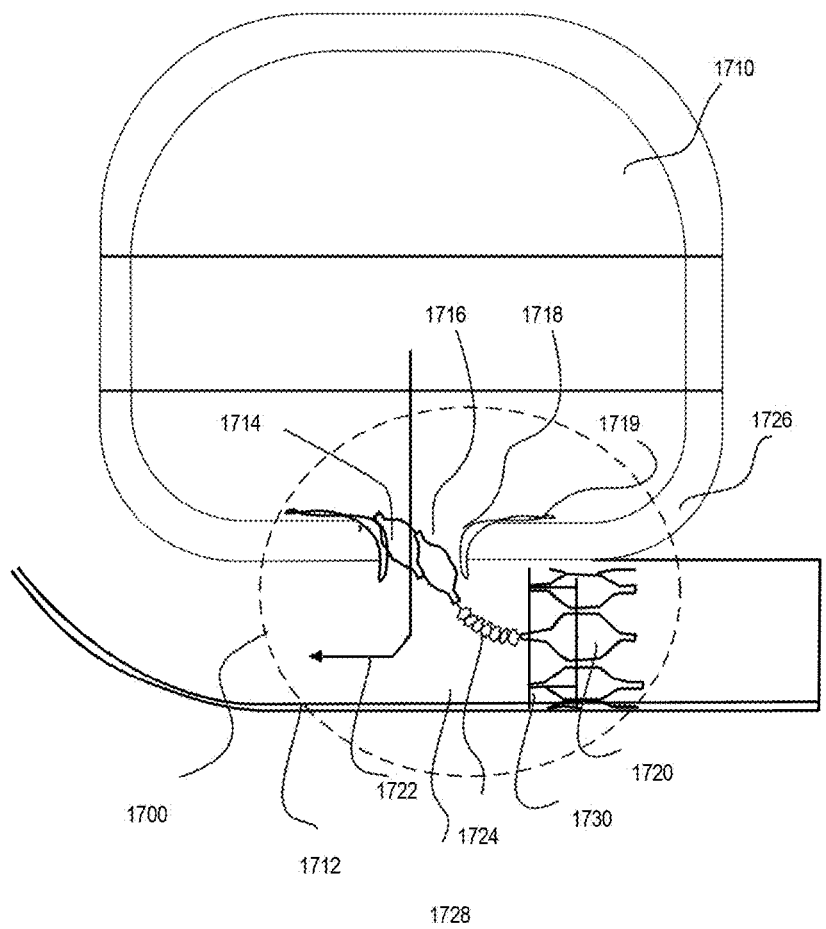
FIG. 17 is a schematic drawing of an exemplary intravascular retrograde blood flow device deployed between a heart chamber and a coronary sinus, consistent with some embodiments of the present disclosure

FIG. 17 illustrates an exemplary embodiment of the location of deployment of an intravascular retrograde blood flow device, consistent with embodiments of the present disclosure. Retrograde blood flow device 1700 may be deployed in a passageway 1716, and may include a tubular shunt portion 1714, a stabilizer 1718, and a flow deflector portion 1720, as described herein. Retrograde blood flow device 1700 may be deployed between a cavity and a blood vessel, such as between a cavity 1710 and a coronary sinus 1712. In some embodiments, cavity 1710 may be a heart chamber. Tubular shunt portion 1714 may bridge cavity 1710 and interior 1728 of coronary sinus 1712. The stabilizer 1718, including its associated flange 1719 may fixate tubular shunt portion 1714 in the passageway 1716. Flange 1719, may engage interior wall 1726 of the cavity 1710. For example, flange 1719 may exert stabilizing pressure on interior wall 1726 or may, in some embodiments, pierce interior wall 1726, which may be an interior wall of a cavity such as a chamber of the heart. A series of stabilizers 1718 and associated flanges 1719 may be arranged on the distal end of tubular shunt portion 1714 for cooperating to stabilize the shunt portion 1714 in the passageway 1716.

Disclosed embodiments may involve a flow deflector portion connected to a proximal end of the tubular shunt portion. A flow deflector portion includes any structure that deflects, diverts, occludes, blocks, obstructs, slows, or inhibits fluid flow. In some embodiments, a flow deflector portion may partially block or partially impede the flow of blood in a blood vessel. A flow deflector portion may include any temporary or permanent, static, expandable, inflatable, or otherwise adjustable plug, disc, patch, or other mechanism for achieving deflection, as described above. In some embodiments, the flow deflector portion may be connected to a proximal end of the tubular shunt portion. A proximal end refers to a region opposite the distal end of the tubular shunt portion, as described earlier. The region may be a part of the tubular shunt portion or may be an extension of the tubular shunt portion. For example, in some embodiments, the flow deflector portion may be completely connected to the proximal end of the tubular shunt portion, while in other embodiments, the flow deflector portion may be partially connected to or integrally connected with the proximal end of the tubular shunt portion. For example, the flow deflector portion may be partially connected to a perimeter edge opening on the proximal end of the tubular shunt portion, such as to a metal frame of the tubular shunt portion. In some embodiments, the flow deflector portion may be configured to only partially occlude natural flow in the vessel.

In some embodiments, the flow deflector portion is a plug configured to substantially prevent passage of blood flow in the blood vessel. A plug may include a stopper, drum, clot, seal, or any other mass that causes at least partial blockage. A plug may substantially prevent blood passage if a majority of blood is prevented from passing. Thus, some embodiments configured to substantially prevent passage may involve blocking or occluding most of an amount of fluid, such as blood, from moving, passing, or traveling beyond the plug. For example, the plug may block and obstruct blood flowing past the plug in a blood vessel such as a coronary sinus. In some embodiments, the plug includes a covered expandable frame. An expandable frame may include a casing, shell, scaffolding, wall with holes, or other support fixture that may increase in diameter, widen, stretch, or otherwise enlarge. For example, a series of struts may form an expandable frame. Such a frame, or any other frame, may be covered at least partially. The covering may include a pliable material, fabric or other material that cooperates with the frame to substantially prevent fluid passage. For example, the covering may encase, coat, wrap, or otherwise fit over at least a portion of the frame. In some embodiments, non-limiting examples of pliable material may include fabric covers or sheets, polymer-based coating, or dense nitinol structures.

In some embodiments, an organ, blood vessel, or passageway may have an associated natural flow. The natural flow may be determined by the function of the organ or the blood vessel or by the direction the heart pumps. For example, a vein may direct venous (deoxygenated or oxygen-poor) blood to the right atrium of the heart. As an example, the coronary sinus may direct venous blood from the vasculature of heart tissue into the right atrium, so the coronary sinus may have a natural flow of blood that is towards the right atrium of the heart. Disclosed embodiments may involve the flow deflector portion being configured to direct retrograde blood flow. Retrograde blood flow may involve flow or movement in a direction that is reverse, backward, inverse, or opposite to the direction of natural flow in an organ, passageway, or blood vessel. In some embodiments, the flow deflector portion may be configured to direct retrograde blood flow. Directing retrograde blood flow may involve guiding, routing, regulating, influencing, or controlling retrograde blood flow against a natural direction of blood flow. In some embodiments, directing retrograde blood flow may involve reversing or redirecting the natural flow. For example, an intravascular medical device may include a shunt portion for bridging a heart chamber and the coronary sinus to cause retrograde oxygen-rich blood flow in the coronary sinus. The deflector portion may direct retrograde, oxygenated blood to flow backwards in the coronary sinus (against the direction of natural flow). As a result, heart tissue that may otherwise receive insufficient blood flow may be oxygenated by the retrograde flow. In some embodiments, the flow deflector portion may be configured to enable both retrograde flow and natural flow in a vein. In some embodiments, the flow deflector portion may be perforated to permit a natural flow of blood. In some embodiments, the retrograde blood flow may additionally permit at least some non-retrograde (natural) blood flow in the vein or coronary sinus.

As an example, retrograde blood flow device 1700 in FIG. 17 may include a flow deflector portion 1720. Flow deflector portion 1720 may be connected to tubular shunt portion 1714. In some embodiments, flow deflector portion 1720 may be a plug, and the plug may include a covered expandable frame 1730. The plug may block blood in coronary sinus 1712 from passing through the flow deflector portion 1720, and the covered expandable frame may enlarge to fit the diameter of coronary sinus 1712. In some embodiments, flow deflector portion 1720 may direct retrograde blood flow 1722 in a blood vessel such as coronary sinus 1712. Coronary sinus 1712 may have blood flowing in a natural direction, and retrograde blood flow 1722 may move against the natural flow in the blood vessel. For example, blood flow in the coronary sinus 1712 may have a natural flow counter to the retrograde flow 1722 of blood leaving cavity 1710 via passageway 1716. Flow deflector portion 1720 may be configured to direct blood leaving cavity 1710 to retrograde blood flow 1722, such that the retrograde blood flow 1722 travels right to left in coronary sinus 1712 as illustrated in FIG. 17 (a direction opposite to the natural flow in the blood vessel).

Disclosed embodiments may involve a tether interconnecting the flow deflector portion and the tubular shunt portion. A tether may include one or more of a leash, strap, wire, link, tie, strut or other means of associating the flow deflector portion with the tubular shunt portion. The tether may interconnect the flow deflector portion and the tubular shunt portion through connections to the flow deflector portion and the tubular shunt portion. The interconnection may be formed integrally, or may occur through bonding or welding. In some embodiments, the tether may include at least one of cloth, metal, or wire. For example, the tether may be comprised of cloth, metal, wire, or any combination of cloth, metal, and wire. The wire may be bent in the form of undulations, or metal may be formed in a spring-like configuration. In some embodiments, a tether may include a partial connection to the perimeter edge opening on the proximal end of a tubular shunt portion in the blood vessel. For example, a tether may at least partially interconnect a perimeter of a tubular shunt portion to a perimeter of a flow deflector portion in a vein. In some embodiments, the tether has a thickness less than a width of the blood vessel to thereby permit blood flow between the tubular shunt portion and the flow deflector portion. The thickness of a tether may include the width, girth, expanse, or diameter of the tether. A thickness less than a width of the blood vessel may involve the width or diameter of the tether being less than the width or diameter of a blood vessel the tether is disposed in, such as a coronary sinus. Thus, blood flow is permitted between the tubular shunt portion and the flow deflector portion due to the fact that the tether does not have a thickness that fully obstructs blood flow.

Disclosed embodiments may involve permitting the flow deflector portion to be positioned a predetermined distance from the tubular shunt portion in the blood vessel. This may occur, at least in part as the result of properties of the tether. For example, a length of the tether may determine a distance between the flow deflector portion and the tubular shunt portion. If the tether has a spring-like or undulating construction, the tether might be enabled to stretch, and the amount of stretch in the tether might define the predetermined distance. The distance may also be a function of other properties of the tether such as rigidity and elasticity. In some embodiments, the predetermined distance may be between 2 millimeters and 40 millimeters. In this context, the predetermined distance is measured in its natural, bent or undulated state. In some embodiments, the predetermined distance may be less than 50 mm, less than 40 mm, less than 30 mm, less than 20 mm or less than 10 mm. In some embodiments, the predetermined distance within the coronary sinus may be within a range of between 2 and 30 mm, 2 and 20 mm, 2 and 10 mm, 2 and 8 mm or 2 and 6 mm. The predetermined distance may involve the span, separation, or length along the coronary sinus between the center of the tubular shunt portion and the distal end of the deflector (e.g., of the flow deflector portion closest to the passageway). In some embodiments, the predetermined distance may be determined such that it reduces risks associated with shunting. For example, the predetermined distance of 2 millimeters to 40 millimeters may reduce the risk of blocking the shunt or inner surface of the coronary sinus with another vein, and the predetermined distance may also provide proximity to the shunt to minimize the risk of blood clots.

In some embodiments, the tether is configured to exhibit a rigid state for preventing the flow deflector portion from migrating within the blood vessel. Exhibiting a rigid state may involve demonstrating stiff, firm, or inelastic characteristics or conditions. In some embodiments, preventing the flow deflector portion from migrating within the blood vessel may involve hindering or impeding the flow deflector portion from moving, drifting, or shifting within the blood vessel. For example, a tether connected to a flow deflector portion and a tubular shunt portion may not stretch, such that the flow deflector portion is unable to move within the blood vessel. The tether may prevent the flow deflector portion from migrating within a blood vessel, such as a coronary sinus, such that the flow deflector portion may be prevented from moving beyond a predetermined distance from the tubular shunt portion. In some embodiments, the tether may prevent the flow deflector portion from migrating away from the tubular shunt portion when deployed in the blood vessel, which may reduce the risk of shunt blockage. In some embodiments, the tether may prevent the flow deflector portion from migrating towards the tubular shunt portion, which may reduce the risk of blood clot buildup.

In some embodiments, an operable length or degree of bending of the tether is adjustable to selectively position the flow deflector portion within the blood vessel. An operable length may include a length, span, extent, or distance suitable for a particular purpose. For example, an operable length of a tether may include the measurement from a proximal end to a distal end of a tether appropriate for maintaining a desired distance between a flow deflector portion and a tubular shunt portion. A degree of bending of a tether may involve a range, level, or amount of curvature, twist, arc, or angle of a tether. In some embodiments, the tether may be adjustable to selectively position, in that the tether is flexible to adapt to the anatomy of the patient. In some embodiments, an operable length of the tether or a degree of bending of the tether may be adjustable to selectively position the flow deflector portion. In some embodiments, an operable length of the tether and the degree of bending of the tether may be adjustable to selectively position the flow deflector portion. For example, the operable length or degree of bending of the tether may be adjustable to position the flow deflector portion at the predetermined distance within the blood vessel, including a coronary sinus.

Retrograde blood flow device 1700, as illustrated in FIG. 17, may include a tether 1724. Tether 1724 may interconnect flow deflector portion 1720 and tubular shunt portion 1714. Tether 1724 may permit flow deflector portion 1720 to be positioned at a predetermined distance from the tubular shunt portion 1714. For example, as blood flow exerts a force on flow deflector portion 1720 in coronary sinus 1712, tether 1724 will retain the position of flow deflector portion 1720 a predetermined distance from tubular shunt portion 1714. In some embodiments, as discussed previously, the predetermined distance from tubular shunt portion 1714 to flow deflector portion 1720 may be between 2 millimeters and 40 millimeters. For example, tether 1724 may exhibit a rigid state which may prevent flow deflector portion 1720 from moving within coronary sinus 1712. In some embodiments, an operable length of tether 1724 is adjustable. In some embodiments, the thickness of tether 1724 is less than the width of coronary sinus 1712, to permit blood flow between tubular shunt portion 1714 and flow deflector portion 1720. For example, the thickness or diameter of tether 1724 may be less than the width of the blood vessel such that it may not block blood from flowing in passageway 1716 or may not prevent blood from moving between tubular shunt portion 1714 and flow deflector portion 1720.

Figure 20:
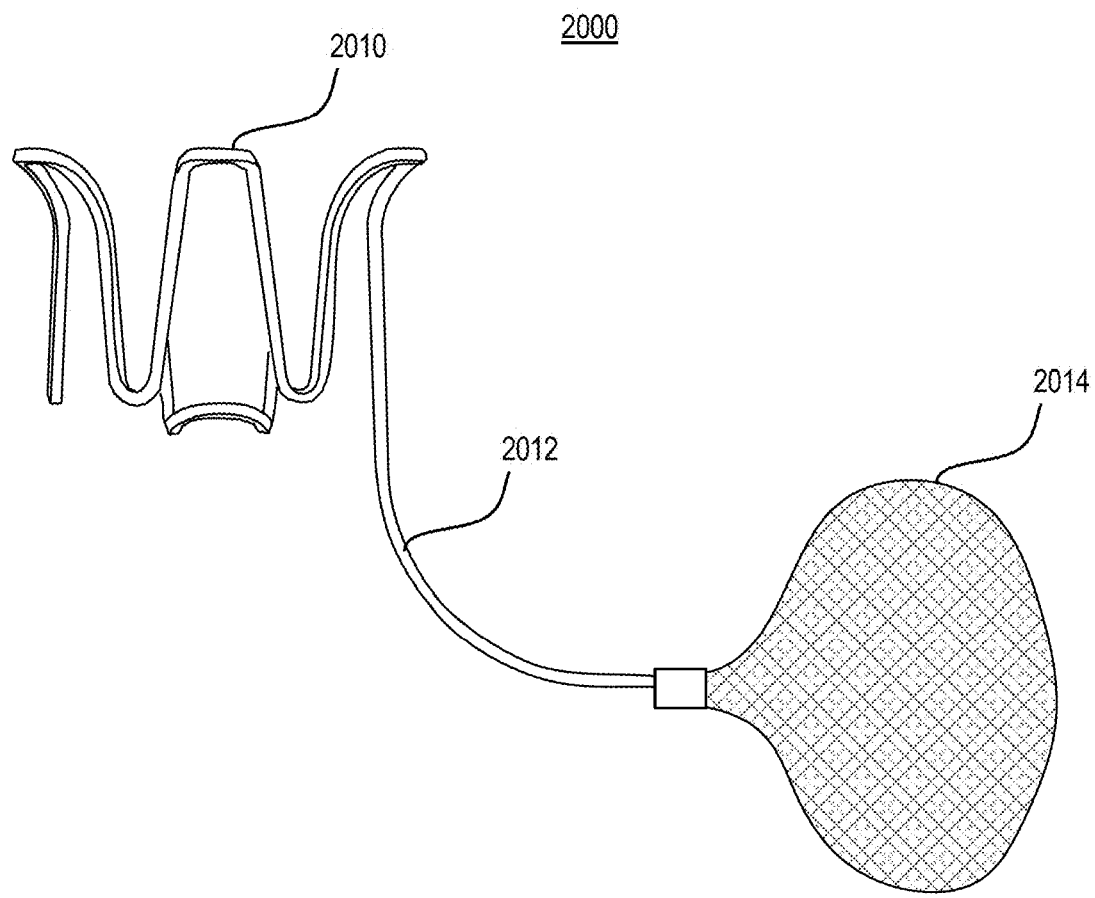
FIG. 20 is a perspective side view of a further exemplary embodiment of an intravascular retrograde blood flow device, consistent with some embodiments of the present disclosure.

FIG. 20 illustrates an exemplary embodiment of a front view of an intravascular retrograde blood flow device, consistent with embodiments of the present disclosure. Retrograde blood flow device 2000 may include tubular shunt portion 2010, tether 2012, and flow deflector portion 2014. In some embodiments, flow deflector portion 2014 may be a plug configured to prevent the flow of blood in a blood vessel. Tether 2012 may be connected to the center of flow deflector portion 2014 and may be connected to a perimeter edge of tubular shunt portion 2010.

In some disclosed embodiments, the tether hinges the flow deflector portion to the tubular shunt portion. Sizes and shapes of organs and blood vessels may vary depending on an individual, and a retrograde blood flow device may accommodate such differing anatomies. For example, a coronary sinus may have a smaller or larger diameter, and the tether may hinge to form an angle between the flow deflector portion and the shunt portion. In some embodiments, hinges may include bendable constructions such as one or more wires, springs, undulating struts, or another other joints or attachments permitting adaption of an orientation of one or more connected components. For example, a hinge may connect one or more objects to allow a limited angle of movement within the blood vessel. In some embodiments, the tether may hinge the flow deflector portion and the tubular shunt portion such that the flow deflector portion or the tubular shunt portion may be oriented at an angle to each another, or to have a limited range of movement about the hinge relative to each another.

Figure 18:
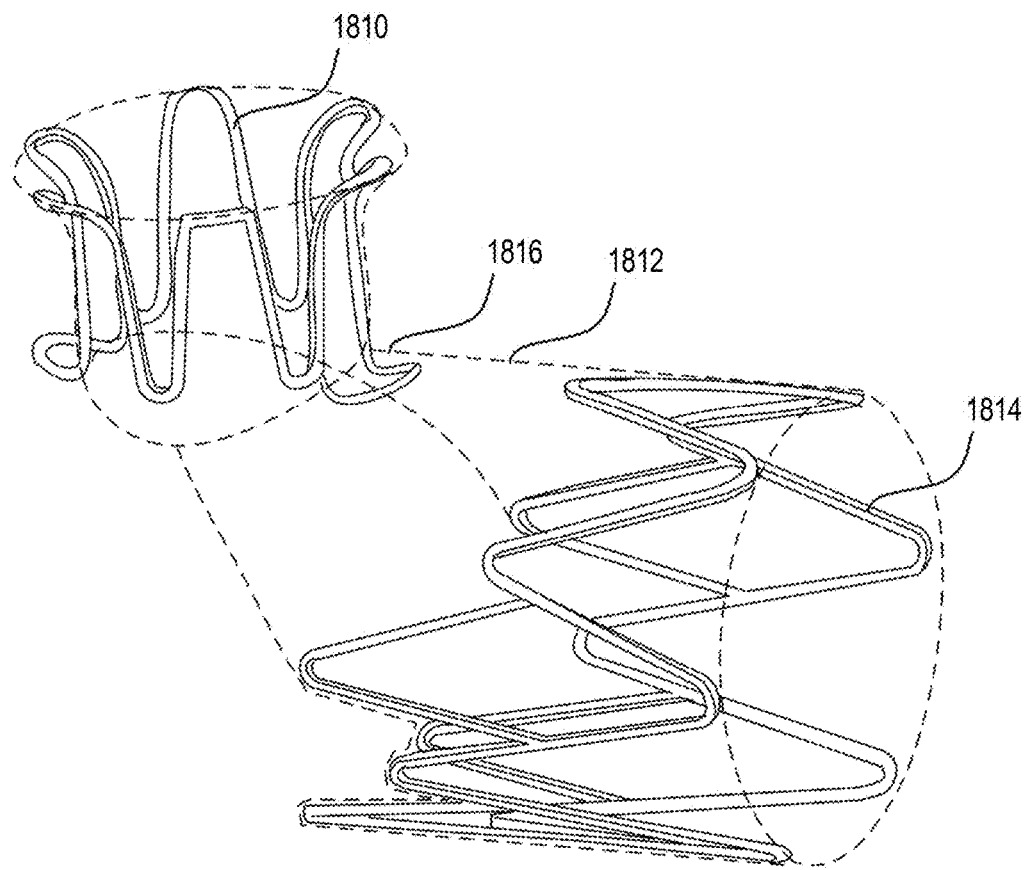
FIG. 18 is a perspective view of another exemplary intravascular retrograde blood flow device, consistent with some embodiments of the present disclosure.

FIG. 18 illustrates an exemplary embodiment of portions of an intravascular retrograde blood flow device, consistent with embodiments of the present disclosure, where wire frames are interconnected by a common piece of a material. The material is illustrated in FIG. 18 with dashed lines. In some embodiments, tether 1812 (formed of the interconnecting material) joins tubular shunt portion 1810 and flow deflector portion 1814. In this example, the material (which may include a fabric) only partially interconnects the components. For example, tether 1812 may be connected to a certain portion or part of perimeter edge opening 1816 on the proximal edge of tubular shunt portion 1810. In some embodiments, tether 1812 may hinge the flow deflector portion 1814, having both a flow deflector frame and a cover, to the tubular shunt portion 1810, enabling flow deflector portion 1814 to be oriented at an angle with respect to tubular shunt portion 1810. (E.g., an angle may exist between axes of each component.)

Disclosed embodiments may involve at least one additional tether interconnecting the flow deflector portion and the tubular shunt portion. For example, a retrograde blood flow device may have multiple tethers positioned at different intervals of distance from one another along a perimeter of a shunt portion or flow deflector portion. Different configurations of the number of tethers and the distance between each tether along the perimeter may provide certain advantages without detracting from the function of the tethers. For example, two tethers may be positioned on opposing ends of a perimeter of the tubular shunt portion or the flow deflector portion, which may provide increased strength and flexibility. In some embodiments, tether 1724 (FIG. 17), interconnecting tubular shunt portion 1714 and flow deflector portion 1720, may include multiple tethers.

In some embodiments, the tether includes a distal end connected to the tubular shunt portion and a proximal end connected to the flow deflector portion, the distal end of the tether being connected to a perimeter edge of the tubular shunt portion. A distal end may involve a segment of the tether that is on the opposite side of, or situated away from, the point of attachment of the tubular shunt portion to the passageway. A proximal end may involve a portion, segment, or perimeter that is on the same side as, or situated close to, the point of attachment of the tubular shunt portion. In some embodiments, the distal end of the tether may be connected to a perimeter edge of the flow deflector portion or perimeter edge of a flow deflector stabilizer. A perimeter edge may include an ending, boundary, border, margin, circumference or other periphery of a component. For example, the distal end of the tether may be connected to the periphery of the flow deflector portion. In some embodiments, the distal end of the tether may be connected to the edge of a flow deflector stabilizer. A flow deflector stabilizer may include a flow deflector having a stabilizing portion to retain, anchor, or fixate the flow deflector in the blood vessel.

FIG. 19 illustrates an exemplary embodiment of an intravascular retrograde blood flow device, consistent with embodiments of the present disclosure. Retrograde blood flow device 1900 may include a tubular shunt portion 1910, tether 1914, and flow deflector portion 1916. In some embodiments, a distal end of tether 1914 may be connected to a perimeter edge 1920 of tubular shunt portion 1910, and a distal end of tether 1914 may be connected to perimeter edge 1918 of flow deflector portion 1916.

Disclosed embodiments may involve the tubular shunt portion, the stabilizer, and the flow deflector portion sized and configured for deployment via a coronary sinus. The components may be sized and configured for deployment such that their dimensions, shapes, and structures enable them to be delivered via the coronary sinus. Thus, for example, the components may be configured such that they can be compressed within a delivery mechanism (e.g., a tube or catheter) for delivery to the coronary sinus. In addition, the diameter of the flow deflector, the stabilizer, or the tubular shunt portion may, when compressed, be smaller than the diameter of the coronary sinus, such that the components may move within the coronary sinus for deployment purposes. In some embodiments, the tubular shunt portion may be configured for deployment in at least one of a left atrium or a left ventricle. For example, the tubular shunt portion may be sized to terminate in a region of a boundary between an opening or passageway and the blood vessel (such as a coronary sinus) on one end and sized to terminate in a region of a boundary between the central opening or passageway and the left atrium or left ventricle on the other. In some embodiments, the flow deflector portion and the tether are configured for deployment in the coronary sinus to block blood flow in a direction from a left atrium toward the right atrium. Blocking blood flow may involve obstructing, inhibiting, preventing, or slowing the movement, travel or motion of blood within an organ or vessel. In some embodiments, blood flow blocked in a direction from a left atrium toward the right atrium may involve the flow deflector portion and the tether preventing blood from traveling from the left atrium to the right atrium. For example, the flow deflector may prevent blood flow from the left atrium to the right atrium and enable retrograde blood flow in the coronary sinus.

For example, the tubular shunt portion, stabilizer, and flow deflector portion may be configured for deployment via a coronary sinus 1614, as referenced in FIG. 16. The tubular shunt portion may be configured for deployment in a left atrium 1610 or a left ventricle 1616. A flow deflector portion and a tether may be configured for deployment in coronary sinus 1614 to block blood flow from left atrium 1610 toward right atrium 1612.

In some embodiments, the intravascular blood flow device is configured for delivery through a catheter. Delivery through a catheter may involve distribution through balloon catheters, overtubes, Mullins catheter, pipes or any other tubes for deployment in blood vessels, including the coronary sinus. Configured for delivery through a catheter may involve a catheter housing a compressed tubular shunt at a distal position longitudinally relative to a compressed flow deflector portion such that the shunt is configured to exit the catheter first. Components of the device, including the tubular shunt portion and the flow deflector portion, may be compressed into the catheter for delivery. In some embodiments, at least the tubular shunt portion is configured to expand after release from the catheter. Configured to expand after release may involve components or material which increase in diameter, enlarging, or widening upon release or ejection. This may occur when the device is at least partially constructed of a shape memory alloy, such as Nitinol. Expansion may occur any moment in time after the blood flow device is released from the catheter. For example, as the tubular shunt portion is ejected or otherwise exits the catheter, expansion may occur. Additionally, or alternatively, a trigger may be activated after release to enable expansion. In either instance, the tubular shunt portion may expand and increase in diameter. In some embodiments, the flow deflector portion is configured to expand after release from the catheter. For example, after release from the constraint of the catheter, the flow deflector portion may expand. Or, a trigger mechanism may be included which enables expansion of some or all of the flow deflector portion only after the triggering. In either instance, the flow deflector portion may then expand and increase in diameter. In some embodiments, the tubular shunt portion is configured for deployment from the catheter prior to deployment of the flow deflector portion. Prior to the deployment of the flow deflector portion may include any moment of time before the release of the flow deflector portion. Disclosed embodiments may include enabling the tubular shunt portion to expand prior to expansion of the flow deflector portion. Enabling the tubular shunt portion to expand may involve increasing the diameter of the tubular shunt portion, as described herein. Expansion of the flow deflector portion may involve the increase in diameter of the flow deflector portion after release from the catheter.

For example, the tubular shunt portion may be released from the catheter first, and then expand in the blood vessel. Then, the flow deflector portion may release from the catheter and expand in the blood vessel. For example, tubular shunt portion 1714 may be released from a catheter and expand in the passageway 1716. Next, the flow deflector portion 1720 may be released from a catheter and expand in the coronary sinus 1712. In some embodiments, when expanded, tubular shunt portion 1714 may have a girth or diameter that is smaller than the diameter of coronary sinus 1712. Expansion of the described components may occur as the result of relative movement between the components and the catheter, such as when the components are pushed out of the catheter or when the catheter is withdrawn.

In some embodiments, the tubular shunt portion includes a first frame structure and the flow deflector portion includes a second frame structure. A frame structure may include a casing, shell, series of interconnected structs, scaffolding, perforated walls, or any other support fixture. In some embodiments, a frame structure may allow transition between a collapsed state, such when compressed within a catheter, and an expanded state, such as during deployment in a blood vessel. Frame structures may interconnect with stabilizer portions, tubular shunt portions, and flow deflector portions. In some embodiments, the frame structure may be a biocompatible, flexible material. Relevant flexible materials may be recognized by those skilled in the art. Such materials may include those which provide strength to resist deformation over time, have ability to expand due to pressure decrease on outer circumference and can be flexible for tolerance of a range of anatomy variance. Non-limiting examples may include a super elastic alloy, and/or a shape memory material, such as a shape memory alloy (SMA) such as a nickel-titanium alloy otherwise known as nitinol or NiTiCu (nickel titan copper), and/or CuAlNi (copper zinc nickel). Other suitable materials may include other metals or stainless steels. A first frame structure may include a scaffolding forming the tubular shunt portion. A second frame structure may include a separate scaffolding (or an interconnected scaffolding) connected to the flow deflector portion. In some embodiments, the second frame structure is suitable to function as a fixation element for the flow deflector portion or for the tubular shunt portion. For example, the second frame structure may fixate, retain, or fasten the flow deflector portion within the blood vessel, or the second frame structure may also fixate the tubular shunt portion in the cavity or passageway. In some embodiments, the flow deflector portion may have a bowed frame or surface. In some embodiments, the bowed frame or surface has a scoop configuration. A bow or a scoop may facilitate the retrograde flow described earlier, eliminating stagnant or low flow areas. In some embodiments, at least one of the first frame structure and the second frame structure is at least partially covered with a pliable material. Partially covered may involve frame structures coated, encased, wrapped, or otherwise enclosed with or by a material. In some embodiments, partially covered may involve a fractional or incomplete encasing of a frame structure. In some embodiments, the pliable material forms a bow or a scoop surface which for example may facilitate the retrograde flow described earlier, eliminating stagnant or low flow areas. In some embodiments, non-limiting examples of pliable material may include fabric covers or sheets, polymer-based coating, or nitinol structures. The pliable material may have flexibility in addition to the flexibility of the scaffold of a frame. In some embodiments, the pliable material may be substantially impermeable to blood and blood flow. In some embodiments, the pliable material may be configured to become impermeable over time. For example, the pliable cover may be configured to allow blood clotting, which may create an impermeable layer on the cover.

FIG. 19 illustrates an exemplary embodiment of an intravascular retrograde blood flow device, consistent with embodiments of the present disclosure. Retrograde blood flow device 1900 may include a tubular shunt portion 1910, tether 1914, and flow deflector portion 1916. The frame structure of tubular shunt portion 1910 may be covered by pliable material 1912. In some embodiments, pliable material 1912 may be configured to redirect blood. For example, pliable material 1912 may be substantially impermeable to blood or blood flow, and as a result, some blood may be redirected around the pliable material as it may not penetrate the pliable material.

In some embodiments, the tether may include a proximal end connected to a center of the first frame structure. A center of the first frame structure may be the midpoint or other intermediate location of the first frame structure on the tubular shunt portion. In some embodiments, the tether may include a distal end connected to a center of the second frame structure. A center of the second frame structure may involve the midpoint or other intermediate location of the second frame structure on the flow deflector portion. For example, tether 1724 (as referenced in FIG. 17) may be connected to a center on a frame of tubular shunt portion 1714, and tether 1724 may also be connected to a center on a frame of flow deflector portion 1720. As an additional example, tubular shunt portion 1810 (as referenced in FIG. 18) may include a first frame structure, and flow deflector portion 1814 may include a second frame structure. Tether 1812 may be connected to the center of the first frame on tubular shunt portion 1810 as well as connected to the center of the second frame on flow deflector portion 1814.

Figure 21:
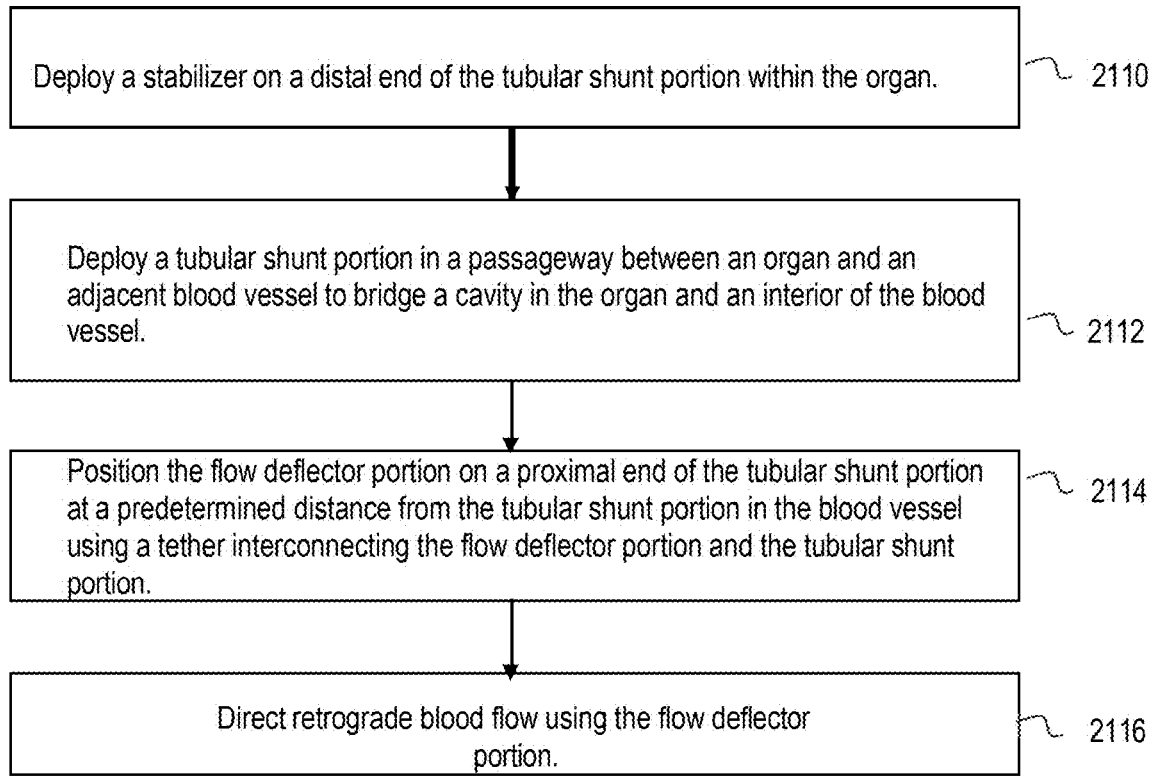
FIG. 21 is a flowchart of an exemplary method for directing intravascular retrograde blood flow, consistent with some embodiments of the present disclosure.

FIG. 21 illustrates a flowchart of an exemplary method for directing intravascular retrograde blood flow. FIG. 21 includes steps 2110 to 2116. At step 2110, a method may involve deploying a stabilizer on a distal end of the tubular shunt portion within the organ. This may be accomplished, for example, via a catheter as discussed earlier. At step 2112, a method may involve deploying a tubular shunt portion in a passageway between an organ and an adjacent blood vessel to bridge a cavity in the organ and an interior of the blood vessel. At step 2114, a method may involve positioning the flow deflector portion on a proximal end of the tubular shunt portion at a predetermined distance from the tubular shunt portion in the blood vessel using a tether interconnecting the flow deflector portion and the tubular shunt portion. Because the tether of predetermined length interconnects the components, by releasing the flow deflector portion from a catheter, the distance between the components will be positioned a distance corresponding to the predetermined length. At step 2116, a method may involve directing retrograde blood flow using the flow deflector portion. Thus, when blood begins to flow, the flow deflector portion will cause retrograde flow, as discussed earlier.

Also disclosed herein are following clauses.

Clause 1. An intravascular medical device for shunting and selectively regulating anatomical fluid flow, the device comprising:
   a tubular shunt configured for deployment in a passageway between a first organ and a second adjacent organ and to bridge a first cavity in the first organ and a second cavity in the second organ;
   a stabilizer configured to stabilize the tubular shunt in the passageway; and a flow deflector extending from the tubular shunt and having a surface for deflecting flow in the second cavity; wherein the flow deflector is configured to extend from less than an entirety of a perimeter edge of the tubular shunt.

Clause 2. The device of the preceding clause, wherein the tubular shunt, the stabilizer, and the flow deflector are integrally connected and expandable upon deployment through a delivery catheter.

Clause 3. The device of any of the preceding clauses, wherein the second organ is a blood vessel and wherein the tubular shunt and the flow deflector are integrally connected in a manner such that a rotational orientation of the tubular shunt in the passageway defines an extent of flow deflection in the blood vessel.

Clause 4. The device of any of the preceding clauses, wherein the second organ is a blood vessel and wherein in a first rotational orientation of the tubular shunt, the flow deflector is configured to span a width of the blood vessel to cause a first flow deflection, and in a second rotational orientation of the tubular shunt, the flow deflector is configured to span less than the width of the blood vessel to cause a second flow deflection, the first flow deflection being greater than the second flow deflection.

Clause 5. The device of any of the preceding clauses, wherein the second organ is a blood vessel, and the flow deflector is configured to enable both natural flow and retrograde flow in the blood vessel.

Clause 6. The device of any of the preceding clauses, wherein the flow deflector further includes a tool passage therethrough.

Clause 7. The device of any of the preceding clauses, further comprising a sheath configured to contain the tubular shunt and the flow deflector in a compressed configuration.

Clause 8. The device of any of the preceding clauses, wherein when ejected from the sheath, the tubular shunt is configured to expand into a tubular shape and the flow deflector is configured to expand into a bowed form.

Clause 9. The device of any of the preceding clauses, wherein in the compressed configuration, the flow deflector is configured to nest within the tubular shunt.

Clause 10. The device of any of the preceding clauses, wherein the stabilizer includes a first flange region connected to the tubular shunt, the first flange region being located on a side of the tubular shunt opposite the flow deflector, and wherein the first flange region is configured to seal against a wall of the first cavity upon deployment.

Clause 11. The device of any of the preceding clauses, wherein the stabilizer includes a pliable covering and a plurality of arms configured to establish, upon deployment, a fluid seal between a first side of the pliable covering and a wall of the first cavity.

Clause 12. The device any of the preceding clauses, wherein the pliable covering is at least partially impermeable to fluid.

Clause 13. The device of any of the preceding clauses, wherein the pliable covering extends over the tubular shunt and forms part of the flow deflector.

Clause 14. The device of any of the preceding clauses, wherein the tubular shunt includes a second flange region extending into the second cavity and configured to secure the tubular shunt within the passageway.

Clause 15. The device of any of the preceding clauses, wherein the tubular shunt includes a tubular wall with at least one opening therein.

Clause 16. The device of any of the preceding clauses, wherein the tubular shunt is sized to distally terminate at a perimeter edge of the passageway proximate the first cavity, and wherein the flow deflector is sized to terminate against a wall of the second cavity opposite the passageway.

Clause 17. The device of any of the preceding clauses, wherein the stabilizer is configured to extend beyond a perimeter edge of a distal end of the tubular shunt and into the first cavity of the first organ.

Clause 18. The device of any of the preceding clauses, wherein the flow deflector includes a non-tubular concavity configured to deflect flow in the second cavity.

Clause 19. The device of any of the preceding clauses, wherein the flow deflector further includes a tether configured to connect the flow deflector to the perimeter edge of the tubular shunt.

Clause 20. The device of any of the preceding clauses, further comprising at least one undulating flexible wire tethering the tubular shunt to the flow deflector.

Clause 21. A method for shunting and deflecting blood flow between biological organs, the method comprising:
  puncturing an opening in a first organ having a first cavity and a second organ having a second cavity;
  deploying a tubular shunt through the opening in the first cavity and the second cavity to enable blood passage from the first cavity to the second cavity;
  deploying a flow deflector that extends from less than an entirety of a perimeter edge of the tubular shunt in the second cavity; and
  deflecting blood flow in the second cavity using the flow deflector.

Clause 22. The method of any of the preceding clauses, wherein the first organ is a heart chamber and the second organ is a blood vessel, and wherein the flow deflector is configured to cause at least partial retrograde blood flow in the blood vessel.

Clause 23. An intravascular retrograde blood flow device, comprising:
  a catheter;
  an expandable shunt compressed within the catheter and configured to bridge an opening between a first cavity of a first organ and a second cavity of a second organ;
  an expandable flow deflector compressed within the catheter and configured to deflect flow in the second cavity; and
  a flexible hinge interconnecting the expandable shunt and the expandable flow deflector, wherein the flexible hinge is configured to bend such that when the expandable shunt is positioned along a first axis of the opening and the expandable flow deflector is positioned along a second axis transverse to the first axis within the second cavity, the flexible hinge is bendable to enable transverse axial positioning of the expandable shunt and the expandable flow deflector while maintaining an interconnection between the expandable shunt and the expandable flow deflector.

Clause 24. The device of any of the preceding clauses, wherein the expandable flow deflector includes an expandable frame covered by a flexible flow-deflecting cover, and wherein the expandable frame is configured to fixate, upon expansion, against a wall of the second cavity, such that the fixation aids in stabilizing the expandable shunt in the opening.

Clause 25. The device of any of the preceding clauses, wherein in an expanded configuration, the expandable frame includes a cylindrical portion and wherein the flow deflecting cover extends over the cylindrical portion in a manner forming a drum-like planar flow deflecting surface.

Clause 26. The device of any of the preceding clauses, wherein in an expanded configuration, the expandable frame includes a deflector support and wherein the flow deflecting cover extends over the deflector support in a manner forming a concave flow deflecting surface.

Clause 27. The device of any of the preceding clauses, wherein in an expanded configuration, the expandable frame includes a concave portion and wherein the flow-deflecting cover extends over the concave portion in a manner forming a scoop-shaped flow deflecting surface.

Clause 28. The device of any of the preceding clauses, wherein in an expanded configuration, the expandable frame includes an extension extending from the expandable frame beyond an intersection of the first axis with a wall of the second cavity, and wherein the extension engages the wall of the second cavity.

Clause 29. The device of any of the preceding clauses, wherein the extension extends in a direction contrary to a normal direction of fluid flow.

Clause 30. The device of any of the preceding clauses, wherein the flexible flow-deflecting cover is substantially impermeable to blood.

Clause 31. The device of any of the preceding clauses, wherein the flexible flow-deflecting cover includes a tool passage configured to minimize blood flow therethrough.

Clause 32. The device of any of the preceding clauses, wherein the flexible flow-deflecting cover includes at least one of a mesh, a fabric, a polymer coating, or a synthetic material coating.

Clause 33. The device of any of the preceding clauses, further including a first stabilizer extending from a distal end of the expandable shunt, opposite the hinge, for engaging with an inner wall of the first cavity to maintain the expandable shunt in the opening.

Clause 34. The device of any of the preceding clauses, further including a second stabilizer comprising a flange region extending from a proximal end of the expandable shunt into the second cavity for engaging with an inner wall of the second cavity to maintain the expandable shunt in the opening.

Clause 35. The device of any of the preceding clauses, wherein at least one of the first stabilizer and the second stabilizer comprises a plurality of prongs having inequivalent lengths.

Clause 36. The device of any of the preceding clauses, wherein the first stabilizer includes a plurality of outwardly extending prongs, each prong having a distal end curved in a direction facing an inner wall of the first cavity.

Clause 37. The device of any of the preceding clauses, wherein the expandable shunt includes a tubular scaffold, and wherein the flexible flow-deflecting cover extends over the tubular scaffold.

Clause 38. The device of any of the preceding clauses, wherein the flexible flow-deflecting cover is further configured to permit at least some non-retrograde blood flow in the second cavity.

Clause 39. The device of any of the preceding clauses, wherein the expandable flow deflector includes a lip for engaging with a wall of the second cavity to aid in forming a seal against the wall of the second cavity.

Clause 40. The device of any of the preceding clauses, wherein the expandable flow deflector includes a frame configured to initially maintain a compressed form following ejection from the catheter, and wherein the device further comprises a release mechanism for enabling selective expansion of the expandable flow deflector following expansion of the expandable shunt.

Clause 41. The device of any of the preceding clauses, wherein the expandable flow deflector is partially connected to a perimeter edge of the expandable shunt via the flexible hinge.

Clause 42. The device of any of the preceding clauses, wherein the flexible hinge includes a tether.

Clause 43. The device of any of the preceding clauses, wherein the tether has an undulating shape.

Clause 44. The device of any of the preceding clauses, wherein the expandable frame is configured such that when the catheter is removed in a first direction to cause release of the expandable flow deflector, the expandable frame is configured to expand in a second direction different from the first direction.

Clause 45. The device of any of the preceding clauses, wherein the one or more flexible hinges include two flexible hinges extending from opposing sides of the shunt circumference.

Clause 46. A method for directing intravascular retrograde blood flow, the method comprising:
puncturing an opening between a first cavity and a second cavity;
advancing a catheter into the opening between the first cavity and the second cavity;
expelling, from the catheter in the opening, an expandable shunt compressed within the catheter;
expelling from the catheter an expandable flow deflector connected to the expandable shunt by a flexible hinge configured to bend such that when the expandable shunt is positioned along a first axis of the opening and the expandable flow deflector is positioned along a second axis transverse to the first axis within the second cavity, the flexible hinge is bendable to enable transverse axial positioning of the expandable shunt and the expandable flow deflector while maintaining an interconnection between the expandable shunt and the expandable flow deflector; and
fixating the expandable flow deflector in the second cavity.

Clause 47. A medical device for directing retrograde blood flow, the medical device comprising:
a tube for delivery to a coronary sinus from a first direction; and
an expandable structure, compressed within the tube, the expandable structure including:
a scaffold portion for maintaining an orifice between a coronary sinus and a heart chamber, and
a flow-deflector portion configured to cause retrograde blood flow in the coronary sinus, wherein the flow-deflector portion is configured such that the tube is withdrawn towards the first direction while the flow-deflector portion is enabled to deploy towards a second direction, other than the first direction.

Clause 48. The device of any of the preceding clauses, wherein the flow-deflector portion is configured to expand in the second direction in a manner sweeping away from the first direction.

Clause 49. The device of any of the preceding clauses, wherein the flow-deflector portion is arc-shaped, and a concavity of the arc-shape is configured to sweep away in the second direction.

Clause 50. The device of any of the preceding clauses, wherein, upon ejection from the tube, the flow-deflector portion is configured to partially expand.

Clause 51. The device of any of the preceding clauses, further comprising a trigger wire configured such that when pulled following partial expansion, the flow-deflector portion further expands.

Clause 52. The device of any of the preceding clauses, further comprising an inner tube disposed within the expandable structure, wherein the trigger wire is connected on one end to the flow-deflector portion and on another end to the inner tube.

Clause 53. The device of any of the preceding clauses, wherein the trigger wire is configured to release the flow-deflector portion for expansion into an expanded state when the inner tube is retracted from within the expandable structure.

Clause 54. The device of any of the preceding clauses, wherein a distal edge of the flow-deflector portion is biased to conform to a curvature of the coronary sinus.

Clause 55. The device of any of the preceding clauses, further comprising a catch for maintaining the flow-deflector portion in at least a partially non-expanded configuration upon ejection from the tube, and a trigger wire connected to the catch and extending through the tube in the first direction, wherein the trigger wire is configured such that when pulled from the first direction, the flow-deflector portion expands in the second direction.

Clause 56. The device of any of the preceding clauses, wherein the second direction is opposite to the first direction.

Clause 57. The device of any of the preceding clauses, further comprising a mechanism for delaying deployment of the flow-deflector portion until the tube is removed.

Clause 58. The device of any of the preceding clauses, further comprising a controller configured to control a timing of expansion of the flow-deflector portion.

Clause 59. The device of any of the preceding clauses, wherein the expandable structure further comprises a stabilizer portion on a side of the scaffold portion opposite the flow-deflector portion.

Clause 60. The device of any of the preceding clauses, wherein the stabilizer portion includes a plurality of outwardly extending prongs, each prong having a distal end curved such that upon expansion the plurality of outwardly extending prongs face in a direction of an inner wall of the heart chamber.

Clause 61. The device of any of the preceding clauses, wherein the scaffold portion and the flow-deflector portion are configured to be expanded following expansion of the stabilizer portion.

Clause 62. The device of any of the preceding clauses, further comprising at least one extension on the same side of the scaffold portion as the flow-deflector portion for contacting an inner wall of the coronary sinus to aid in stabilization.

Clause 63. The device of any of the preceding clauses, wherein the extension is located on a distal end of the flow deflector portion and is configured such that after the tube is withdrawn towards the first direction, the extension is enabled to project in the second direction.

Clause 64. The device of any of the preceding clauses, wherein the at least one extension is located on a perimeter edge of the scaffold portion and is configured to expand fully before the flow-deflector portion expands fully in the coronary sinus.

Clause 65. The device of any of the preceding clauses, further comprising a pliable, fluid-impermeable covering disposed over the expandable structure.

Clause 66. A method for directing retrograde blood flow, the method comprising:
  puncturing an orifice between a coronary sinus and a heart chamber;
  delivering, from a first direction, a tube to the coronary sinus, the tube having an expandable retrograde blood flow device therein, the retrograde blood flow device including a scaffold portion and a flow deflector portion;
  partially ejecting the retrograde blood flow device from the tube to cause the scaffold portion to transform from a compressed state within the tube to an expanded state outside the tube and such that the flow deflector portion is maintained in a partially expanded state outside the tube;
  maintaining, using the scaffold portion, the orifice between the coronary sinus and the heart chamber;
  withdrawing the tube towards the first direction;
  further expanding the flow-deflector portion towards a second direction other than the first direction; and
  causing retrograde flow in the coronary sinus using the flow-deflector portion.

Clause 67. An intravascular retrograde blood flow device, comprising:
  a tubular shunt portion configured for deployment in a passageway between an organ and an adjacent blood vessel for bridging a cavity in the organ and an interior of the blood vessel;
  a stabilizer configured to fixate the tubular shunt portion in the passageway;
  a flow deflector portion connected to a proximal end of the tubular shunt portion, the flow deflector portion being configured to direct retrograde blood flow; and
  a tether interconnecting the flow deflector portion and the tubular shunt portion in a manner permitting the flow deflector portion to be positioned a predetermined distance from the tubular shunt portion in the blood vessel.

Clause 68. The device of any of the preceding clauses, wherein the tubular shunt portion, the stabilizer, and the flow deflector portion are sized and configured for deployment via a coronary sinus, with the tubular shunt portion configured for deployment in at least one of a left atrium or a left ventricle and the flow deflector portion and the tether configured for deployment in the coronary sinus to block blood flow in a direction from a left atrium toward the right atrium.

Clause 69. The device of any of the preceding clauses, wherein the predetermined distance is between 2 mm and 40 mm.

Clause 70. The device of any of the preceding clauses, wherein the stabilizer includes a flange on a distal end of the tubular shunt portion, the flange being configured to engage an interior wall of the cavity in the organ.

Clause 71. The device of any of the preceding clauses, wherein the tether includes at least one of cloth, metal, or wire.

Clause 72. The device of any of the preceding clauses, wherein the tether hinges the flow deflector portion to the tubular shunt portion.

Clause 73. The device of any of the preceding clauses, configured for delivery through a catheter, and wherein at least the tubular shunt portion is configured to expand after release from the catheter.

Clause 74. The device of any of the preceding clauses, wherein the flow deflector portion is configured to expand after release from the catheter.

Clause 75. The device of any of the preceding clauses, wherein the tubular shunt portion is configured for deployment from the catheter prior to deployment of the flow deflector portion, to thereby enable the tubular shunt portion to expand prior to expansion of the flow deflector portion.

Clause 76. The device of any of the preceding clauses, wherein the flow deflector portion is a plug configured to substantially prevent passage of blood flow in the blood vessel.

Clause 77. The device of any of the preceding clauses, wherein the plug includes a covered expandable frame.

Clause 78. The device of any of the preceding clauses, wherein an operable length or degree of bending of the tether is adjustable to selectively position the flow deflector portion within the blood vessel.

Clause 79. The device of any of the preceding clauses, wherein the tether is configured to exhibit a rigid state for preventing the flow deflector portion from migrating within the blood vessel.

Clause 80. The device of any of the preceding clauses, further comprising at least one additional tether interconnecting the flow deflector portion and the tubular shunt portion.

Clause 81. The device of any of the preceding clauses, wherein the tether includes a distal end connected to the tubular shunt portion and a proximal end connected to the flow deflector portion, the distal end of the tether being connected to a perimeter edge of the tubular shunt portion, and the distal end of the tether being connected to a perimeter edge of the flow deflector portion or perimeter edge of a flow deflector stabilizer.

Clause 82. The device of any of the preceding clauses, wherein the tubular shunt portion includes a first frame structure and the flow deflector portion includes a second frame structure.

Clause 83. The device of any of the preceding clauses, wherein at least one of the first frame structure and the second frame structure is at least partially covered with a pliable material.

Clause 84. The device of any of the preceding clauses, wherein the tether includes a proximal end connected to a center of the first frame structure and a distal end connected to a center of the second frame structure.

Clause 85. The device of any of the preceding clauses, wherein the tether has a thickness less than a width of the blood vessel to thereby permit blood flow between the tubular shunt portion and the flow deflector portion.

Clause 86. A method for directing intravascular retrograde blood flow, the method comprising:
deploying a tubular shunt portion in a passageway between an organ and an adjacent blood vessel to bridge a cavity in the organ and an interior of the blood vessel;
deploying a stabilizer on a distal end of the tubular shunt portion within the organ;
deploying a flow deflector portion connected to a proximal end of the tubular shunt portion within the blood vessel;
positioning the flow deflector portion at a predetermined distance from the tubular shunt portion in the blood vessel using a tether interconnecting the flow deflector portion and the tubular shunt portion; and
directing retrograde blood flow using the flow deflector portion.

Disclosed embodiments may include any one of the following bullet-pointed features alone or in combination with one or more other bullet-pointed features, whether implemented as a system, device, and/or method.

- an intravascular medical device
- shunting and selectively regulating anatomical fluid flow
- a tubular shunt
- a tubular shunt configured for deployment in a passageway between a first organ and a second adjacent organ
- the second organ is a blood vessel
- a tubular shunt configured to bridge a first cavity in the first organ and a second cavity in the second organ
- a stabilizer
- a stabilizer configured to stabilize the tubular shunt in the passageway
- a flow deflector
- a flow deflector extending from the tubular shunt
- a flow deflector having a surface for deflecting flow in the second cavity
- a flow deflector configured to extend from less than an entirety of a perimeter edge of a tubular shunt
- a tubular shunt, a stabilizer, and a flow deflector integrally connected
- a tubular shunt, a stabilizer, and a flow deflector expandable upon deployment through a delivery catheter
- a tubular shunt and a flow deflector integrally connected
- a tubular shunt and a flow deflector integrally connected in a manner such that a rotational orientation of the tubular shunt in a passageway defines an extent of flow deflection in a blood vessel
- in a first rotational orientation of a tubular shunt, a flow deflector is configured to span a width of a blood vessel to cause a first flow deflection
- in a second rotational orientation of a tubular shunt, a flow deflector is configured to span less than a width of a blood vessel to cause a second flow deflection
- the first flow deflection being greater than the second flow deflection
- a flow deflector configured to enable both natural flow and retrograde flow in a blood vessel
- a flow deflector that includes a tool passage therethrough
- a sheath configured to contain a tubular shunt and a flow deflector in a compressed configuration.
- when ejected from a sheath, a tubular shunt is configured to expand into a tubular shape
- when ejected from the sheath, a flow deflector is configured to expand into a bowed form
- in a compressed configuration, a flow deflector is configured to nest within a tubular shunt
- a stabilizer includes a first flange region connected to a tubular shunt
- a first flange region located on a side of a tubular shunt opposite the flow deflector
- a first flange region configured to seal against a wall of a first cavity upon deployment
- a stabilizer including a pliable covering
- a stabilizer including a plurality of arms
- a plurality of arms configured to establish, upon deployment, a fluid seal between a first side of a pliable covering and a wall of a first cavity
- a pliable covering at least partially impermeable to fluid
- a pliable covering extends over a tubular shunt
- a pliable covering forms part of a flow deflector
- a tubular shunt includes a second flange region
- a second flange region extends into a second cavity
- a second flange region configured to secure a tubular shunt within a passageway
- a tubular shunt includes a tubular wall with at least one opening therein a tubular shunt is sized to distally terminate at a perimeter edge of a passageway proximate a first cavity a flow deflector is sized to terminate against a wall of a second cavity opposite a passageway a stabilizer is configured to extend beyond a perimeter edge of a distal end of a tubular shunt a stabilizer is configured to extend into a first cavity of a first organ a flow deflector includes a non-tubular concavity a non-tubular concavity configured to deflect flow in a second cavity a flow deflector further includes a tether a tether configured to connect a flow deflector to a perimeter edge of a tubular shunt at least one undulating flexible wire at least one undulating flexible wire tethering a tubular shunt to a flow deflector a method for shunting and deflecting blood flow between biological organs puncturing an opening in a first organ having a first cavity and a second organ having a second cavity deploying a tubular shunt through an opening in a first cavity and a second cavity to enable blood passage from the first cavity to the second cavity deploying a flow deflector that extends from less than an entirety of a perimeter edge of a tubular shunt in a second cavity deflecting blood flow in a second cavity using a flow deflector when a first organ referred to in this section is a heart chamber when the second organ referred to in this section is a blood vessel a flow deflector is configured to cause at least partial retrograde blood flow in a blood vessel an intravascular retrograde blood flow device a catheter an expandable shunt an expandable shunt compressed within a catheter an expandable shunt configured to bridge an opening between a first cavity of a first organ and a second cavity of a second organ an expandable flow deflector compressed within a catheter an expandable flow deflector configured to deflect flow in a second cavity a flexible hinge a flexible hinge interconnecting an expandable shunt and an expandable flow deflector the flexible hinge is configured to bend when an expandable shunt is positioned along a first axis of an opening and an expandable flow deflector is positioned along a second axis transverse to a first axis within the second cavity, a flexible hinge is bendable to enable transverse axial positioning of the expandable shunt and the expandable flow deflector while maintaining an interconnection between the expandable shunt and the expandable flow deflector an expandable flow deflector includes an expandable frame covered by a flexible flow-deflecting cover an expandable frame is configured to fixate, upon expansion, against a wall of a second cavity fixation aids in stabilizing an expandable shunt in the opening in an expanded configuration, an expandable frame includes a cylindrical portion a flow deflecting cover extends over a cylindrical portion in a manner forming a drum-like planar flow deflecting surface in an expanded configuration, an expandable frame includes a deflector support a flow deflecting cover extends over a deflector support in a manner forming a concave flow deflecting surface in an expanded configuration, an expandable frame includes a concave portion a flow-deflecting cover extends over a concave portion in a manner forming a scoop-shaped flow deflecting surface in an expanded configuration, an expandable frame includes an extension extending from the expandable frame beyond an intersection of a first axis with a wall of a second cavity an extension engages a wall of a second cavity an extension extends in a direction contrary to a normal direction of fluid flow a flexible flow-deflecting cover is substantially impermeable to blood a flexible flow-deflecting cover includes a tool passage a tool passage configured to minimize blood flow therethrough a flexible flow-deflecting cover includes at least one of a mesh, a fabric, a polymer coating, or a synthetic material coating a first stabilizer extending from a distal end of the expandable shunt a first stabilizer opposite a hinge a first stabilizer for engaging with an inner wall of a first cavity to maintain an expandable shunt in the opening a second stabilizer a second stabilizer having a flange region extending from a proximal end of an expandable shunt into a second cavity a second stabilizer for engaging with an inner wall of a second cavity to maintain an expandable shunt in an opening at least one of a first stabilizer and a second stabilizer includes a plurality of prongs having inequivalent lengths a first stabilizer includes a plurality of outwardly extending prongs prongs with distal ends curved in a direction facing an inner wall of a first cavity an expandable shunt includes a tubular scaffold a flexible flow-deflecting cover extends over the tubular scaffold a flexible flow-deflecting cover configured to permit at least some non-retrograde blood flow in a second cavity an expandable flow deflector includes a lip for engaging with a wall of a second cavity to aid in forming a seal against a wall of the second cavity an expandable flow deflector includes a frame a frame configured to initially maintain a compressed form following ejection from a catheter a release mechanism for enabling selective expansion of an expandable flow deflector following expansion of an expandable shunt an expandable flow deflector is partially connected to a perimeter edge of an expandable shunt via the flexible hinge a flexible hinge includes a tether a tether has an undulating shape.

an expandable frame is configured such that when a catheter is removed in a first direction to cause release of an expandable flow deflector, the expandable frame is configured to expand in a second direction a second direction different from the first direction one or more flexible hinges include two flexible hinges extending from opposing sides of a shunt circumference a method for directing intravascular retrograde blood flow puncturing an opening between a first cavity and a second cavity advancing a catheter into an opening between a first cavity and a second cavity expelling, from a catheter in the opening, an expandable shunt compressed within the catheter expelling from a catheter an expandable flow deflector connected to an expandable shunt by a flexible hinge configured to bend such that when the expandable shunt is positioned along a first axis of an opening and the expandable flow deflector is positioned along a second axis transverse to a first axis within the second cavity, the flexible hinge is bendable to enable transverse axial positioning of the expandable shunt and the expandable flow deflector while maintaining an interconnection between the expandable shunt and the expandable flow deflector fixating the expandable flow deflector in a second cavity a medical device for directing retrograde blood flow a tube for delivery to a coronary sinus from a first direction an expandable structure, compressed within a tube a scaffold portion for maintaining an orifice between a coronary sinus and a heart chamber a flow-deflector portion configured to cause retrograde blood flow in a coronary sinus a flow-deflector portion configured such that when a tube is withdrawn towards a first direction, the flow-deflector portion is enabled to deploy towards a second direction, other than the first direction a flow-deflector portion is configured to expand in a second direction in a manner sweeping away from a first direction a flow-deflector portion is arc-shaped a concavity of an arc-shape is configured to sweep away in a second direction upon ejection from a tube, a flow-deflector portion is configured to partially expand a trigger wire configured such that when pulled following partial expansion, a flow-deflector portion further expands an inner tube disposed within an expandable structure the trigger wire is connected on one end to a flow-deflector portion the trigger wire is connected on another end to an inner tube a trigger wire is configured to release a flow-deflector portion for expansion into an expanded state when an inner tube is retracted from within an expandable structure a distal edge of a flow-deflector portion is biased to conform to a curvature of a coronary sinus a catch for maintaining a flow-deflector portion in at least a partially non-expanded configuration upon ejection from a tube a trigger wire connected to a catch and extending through a tube a trigger wire is configured such that when pulled from a first direction, the flow-deflector portion expands in a second direction the second direction is opposite to the first direction a mechanism for delaying deployment of a flow-deflector portion until a tube is removed a controller configured to control a timing of expansion of a flow-deflector portion a stabilizer portion on a side of a scaffold portion opposite a flow-deflector portion a stabilizer portion includes a plurality of outwardly extending prongs prongs having distal ends curved such that upon expansion they face in a direction of an inner wall of a heart chamber a scaffold portion and a flow-deflector portion are configured to be expanded following expansion of a stabilizer portion at least one extension on a same side of a scaffold portion as a flow-deflector portion for contacting an inner wall of a coronary sinus to aid in stabilization an extension is located on a distal end of a flow deflector portion an extension configured such that after the tube is withdrawn towards the first direction, the extension is enabled to project in a second direction at least one extension is located on a perimeter edge of a scaffold portion at least one extension is configured to expand fully before a flow-deflector portion expands fully in a coronary sinus a pliable, fluid-impermeable covering disposed over an expandable structure puncturing an orifice between a coronary sinus and a heart chamber delivering, from a first direction, a tube to the coronary sinus, the tube having an expandable retrograde blood flow device therein a retrograde blood flow device including a scaffold portion and a flow deflector portion partially ejecting a retrograde blood flow device from a tube to cause a scaffold portion to transform from a compressed state within the tube to an expanded state outside the tube and such that the flow deflector portion is maintained in a partially expanded state outside the tube maintaining, using the scaffold portion, an orifice between a coronary sinus and a heart chamber expanding a flow-deflector portion towards a second direction other than a first direction causing retrograde flow in a coronary sinus using a flow-deflector portion an intravascular retrograde blood flow device a tubular shunt portion configured for deployment in a passageway between an organ and an adjacent blood vessel for bridging a cavity in the organ and an interior of the blood vessel a stabilizer configured to fixate a tubular shunt portion in a passageway a flow deflector portion connected to a proximal end of a tubular shunt portion a flow deflector portion being configured to direct retrograde blood flow a tether interconnecting a flow deflector portion and a tubular shunt portion a tether interconnecting a flow deflector portion and a tubular shunt portion in a manner permitting the flow deflector portion to be positioned a predetermined distance from the tubular shunt portion in a blood vessel a tubular shunt portion, a stabilizer, and a flow deflector portion are sized and configured for deployment via a coronary sinus a tubular shunt portion configured for deployment in at least one of a left atrium or a left ventricle a flow deflector portion and a tether configured for deployment in a coronary sinus to block blood flow in a direction from a left atrium toward a right atrium the predetermined distance between a shunt and a flow deflector is between 2 mm and 40 mm a stabilizer includes a flange on a distal end of a tubular shunt portion a flange being configured to engage an interior wall of a cavity in an organ a tether includes at least one of cloth, metal, or wire a tether hinges a flow deflector portion to a tubular shunt portion configured for delivery through a catheter a tubular shunt portion is configured to expand after release from a catheter a flow deflector portion is configured to expand after release from a catheter a tubular shunt portion is configured for deployment from a catheter prior to deployment of the flow deflector portion a tubular shunt portion is configured for deployment from a catheter to thereby enable the tubular shunt portion to expand prior to expansion of a flow deflector portion a flow deflector portion is a plug a plug configured to substantially prevent passage of blood flow in a blood vessel the plug includes a covered expandable frame an operable length or degree of bending of a tether is adjustable to selectively position a flow deflector portion within a blood vessel a tether is configured to exhibit a rigid state for preventing a flow deflector portion from migrating within a blood vessel at least one additional tether interconnecting a flow deflector portion and a tubular shunt portion a tether includes a distal end connected to a tubular shunt portion a tether includes a proximal end connected to a flow deflector portion a distal end of a tether being connected to a perimeter edge of a tubular shunt portion a distal end of a tether being connected to a perimeter edge of a flow deflector portion or perimeter edge of a flow deflector stabilizer a tubular shunt portion includes a first frame structure a flow deflector portion includes a second frame structure at least one of a first frame structure and a second frame structure is at least partially covered with a pliable material a tether includes a proximal end connected to a center of a first frame structure the tether includes a distal end connected to a center of a second frame structure a tether has a thickness less than a width of a blood vessel to thereby permit blood flow between a tubular shunt portion and a flow deflector portion a method for directing intravascular retrograde blood flow deploying a tubular shunt portion in a passageway between an organ and an adjacent blood vessel to bridge a cavity in an organ and an interior of a blood vessel deploying a stabilizer on a distal end of a tubular shunt portion within an organ deploying a flow deflector portion connected to a proximal end of a tubular shunt portion within a blood vessel positioning a flow deflector portion at a predetermined distance from a tubular shunt portion in a blood vessel using a tether interconnecting a flow deflector portion and a tubular shunt portion directing retrograde blood flow using a flow deflector portion Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An intravascular retrograde blood flow device, comprising:
    a catheter;
    an expandable shunt compressed within the catheter and configured to bridge an opening between a first cavity of a first organ and a second cavity of a second organ;
    an expandable flow deflector compressed within the catheter and configured to:
        deflect flow in a first direction in the second cavity; and
        at least partially occlude flow in a second direction in the second cavity; and
    a flexible hinge interconnecting the expandable shunt and the expandable flow deflector, wherein the flexible hinge is configured to bend such that when the expandable shunt is positioned in the opening and the expandable flow deflector is positioned in the second cavity, the flexible hinge is bendable such that the expandable flow deflector is movable relative to the expandable shunt.

2. The device of claim 1, wherein the expandable flow deflector includes an expandable frame covered by a flexible flow-deflecting cover, and wherein the expandable frame is configured to fixate, upon expansion, against a wall of the second cavity, such that the fixation aids in stabilizing the expandable shunt in the opening.

3. The device of claim 2, wherein in an expanded configuration, the expandable frame includes a cylindrical portion and wherein the flow deflecting cover extends over the cylindrical portion in a manner forming a drum-like planar flow deflecting surface.

4. The device of claim 2, wherein in an expanded configuration, the expandable frame includes a deflector support and wherein the flow deflecting cover extends over the deflector support in a manner forming a concave flow deflecting surface.

5. The device of claim 2, wherein in an expanded configuration, the expandable frame includes a concave portion and wherein the flow-deflecting cover extends over the concave portion in a manner forming a scoop-shaped flow deflecting surface.

6. The device of claim 2, wherein in an expanded configuration, the expandable frame includes an extension extending from the expandable frame beyond an intersection of a first axis with a wall of the second cavity, and wherein the extension engages the wall of the second cavity.

7. The device of claim 6, wherein the extension extends in a direction contrary to a normal direction of fluid flow.

8. The device of claim 2, wherein the flexible flow-deflecting cover is substantially impermeable to blood.

9. The device of claim 2, wherein the flexible flow-deflecting cover includes a tool passage configured to minimize blood flow therethrough.

10. The device of claim 2, wherein the flexible flow-deflecting cover includes at least one of a mesh, a fabric, a polymer coating, or a synthetic material coating.

11. The device of claim 1, further including a first stabilizer extending from a distal end of the expandable shunt, opposite the hinge, for engaging with an inner wall of the first cavity to maintain the expandable shunt in the opening.

12. The device of claim 11, further including a second stabilizer comprising a flange region extending from a proximal end of the expandable shunt into the second cavity for engaging with an inner wall of the second cavity to maintain the expandable shunt in the opening.

13. The device of claim 12, wherein at least one of the first stabilizer and the second stabilizer comprises a plurality of prongs having inequivalent lengths.

14. The device of claim 11, wherein the first stabilizer includes a plurality of outwardly extending prongs, each prong having a distal end curved in a direction facing an inner wall of the first cavity.

15. The device of claim 1, wherein the expandable shunt includes a tubular scaffold, and wherein the flexible flow-deflecting cover extends over the tubular scaffold.

16. The device of claim 2, wherein the flexible flow-deflecting cover is further configured to permit at least some non-retrograde blood flow in the second cavity.

17. The device of claim 1, wherein the expandable flow deflector includes a lip for engaging with a wall of the second cavity to aid in forming a seal against the wall of the second cavity.

18. The device of claim 1, wherein the expandable flow deflector includes a frame configured to initially maintain a compressed form following ejection from the catheter, and wherein the device further comprises a release mechanism for enabling selective expansion of the expandable flow deflector following expansion of the expandable shunt.

19. The device of claim 1, wherein the expandable flow deflector is partially connected to a perimeter edge of the expandable shunt via the flexible hinge.

20. The device of claim 1, wherein the flexible hinge includes a tether.

21. The device of claim 20, wherein the tether has an undulating shape.

22. The device of claim 2, wherein the expandable frame is configured such that when the catheter is removed in a first direction to cause release of the expandable flow deflector, the expandable frame is configured to expand in a second direction different from the first direction.

23. The device of claim 2, wherein the one or more flexible hinges include two flexible hinges extending from opposing sides of the shunt circumference.

24. A method for directing intravascular retrograde blood flow, the method comprising:
   puncturing an opening between a first cavity and a second cavity;
   advancing a catheter into the opening between the first cavity and the second cavity;
   expelling, from the catheter in the opening, an expandable shunt compressed within the catheter;
   expelling from the catheter an expandable flow deflector connected to the expandable shunt by a flexible hinge configured to bend such that when the expandable shunt is positioned in the opening and the expandable flow deflector is positioned in the second cavity, the flexible hinge is bendable such that the expandable flow deflector is movable relative to the expandable shunt; and
   fixating the expandable flow deflector in the second cavity,
   wherein the expandable flow deflector is configured to:
      deflect flow in a first direction in the second cavity; and
      at least partially occlude flow in a second direction in the second cavity.

* * * * *